United States Patent
Takenaka et al.

(10) Patent No.: US 7,765,030 B2
(45) Date of Patent: Jul. 27, 2010

(54) GAIT GENERATOR FOR MOBILE ROBOT

(75) Inventors: Toru Takenaka, Wako (JP); Takashi Matsumoto, Wako (JP); Takahide Yoshiike, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 799 days.

(21) Appl. No.: 10/597,653

(22) PCT Filed: Feb. 16, 2005

(86) PCT No.: PCT/JP2005/002353

§ 371 (c)(1),
(2), (4) Date: Aug. 2, 2006

(87) PCT Pub. No.: WO2005/077610

PCT Pub. Date: Aug. 25, 2005

(65) Prior Publication Data

US 2008/0147237 A1    Jun. 19, 2008

(30) Foreign Application Priority Data

Feb. 16, 2004  (JP) .............................. 2004-038961

(51) Int. Cl.
*G05B 19/18* (2006.01)
*B25J 5/00* (2006.01)
*B25J 13/04* (2006.01)

(52) U.S. Cl. ................. 700/254; 700/245; 700/253; 700/260; 318/568.1; 318/568.12; 180/8.1; 180/8.6

(58) Field of Classification Search ................. 700/254; 318/568.12; 901/1
See application file for complete search history.

(56) References Cited

U.S. PATENT DOCUMENTS

| 2002/0024312 A1* | 2/2002 | Takagi ................. 318/568.12 |
| 2004/0176875 A1* | 9/2004 | Iribe et al. ................. 700/245 |
| 2005/0001575 A1* | 1/2005 | Furuta et al. ............ 318/568.12 |

FOREIGN PATENT DOCUMENTS

EP    1 475 198    11/2004

(Continued)

*Primary Examiner*—Khoi Tran
*Assistant Examiner*—Rodney King
(74) *Attorney, Agent, or Firm*—Rankin, Hill & Clark LLP

(57) ABSTRACT

A gait generating system for a mobile robot determines a gait parameter that defines a gait of a mobile robot 1 to be generated by updating a value of a priority parameter of the gait parameter such that it approaches in steps to an original required value from a value of a priority gait parameter of a predetermined base gait parameter until it agrees with the original required value. Each time the value is updated, a search object parameter among non-priority parameters other than the priority parameter is determined in an exploratory manner such that a boundary condition of a gait is satisfied on a dynamic model of the robot 1, and a gait parameter that includes the determined search object parameter and the updated priority parameter is newly determined. The gait of the mobile robot 1 is generated using a gait parameter newly determined when the priority parameter is finally made to agree with the required value, and the dynamic model.

13 Claims, 20 Drawing Sheets

FOREIGN PATENT DOCUMENTS

| | | |
|---|---|---|
| JP | 10-217161 | 8/1998 |
| JP | 2002-326173 | 11/2002 |
| JP | 2004-142095 | 5/2004 |
| WO | 03/057427 | 7/2003 |
| WO | 03/057429 | 7/2003 |

* cited by examiner

BODY INCLINATION RESTORING MOMENT ZMP-CONVERTED VALUE OF NORMAL GAIT (ZMPrec)

BODY INCLINATION RESTORING MOMENT
ZMP-CONVERTED VALUE OF CURRENT TIME GAIT (ZMPrec)

GAIT GENERATOR FOR MOBILE ROBOT

TECHNICAL FIELD

The present invention relates to a system for generating gaits of a mobile robot, such as a bipedal mobile robot.

BACKGROUND ART

As techniques for generating desired gaits of a mobile robot, such as a bipedal mobile robot, one disclosed in, for example, Japanese Unexamined Patent Application Publication No. 2002-326173 (patent document 1) and one disclosed in PCT international publication WO/03/057427/A1 (patent document 2) have been proposed by the present applicant. According to the techniques disclosed in these documents, an instantaneous desired gait composed of an instantaneous value of a desired motion (instantaneous desired motion) of a robot and an instantaneous value of a desired floor reaction force (instantaneous desired floor reaction force) is sequentially created using a first dynamic model (simplified model), which represents a relationship between motions of the robot (the positions and postures of individual portions) and floor reaction forces, such that a dynamic balance condition (a condition, such as the one in which a translational force component of a floor reaction force takes a desired value or floor reaction force moment about a certain point takes a desired value) on the first dynamic model is satisfied. Then, the instantaneous desired gait is input to a second dynamic model (full model) wherein a part of the instantaneous desired motion (desired body position/posture, a desired moment about a desired ZMP, or the like) is corrected so as to generate a final instantaneous desired gait in a time series manner. According to the technologies disclosed in documents 1 and 2, a desired gait is generated for each step, a gait for the period of one step of a bipedal mobile robot being the unit. In this case, to generate an instantaneous value of a desired gait for each step of the robot, the gait parameter (composed of the parameters defining the position/posture trajectory of each foot, the parameters defining a desired ZMP trajectory, etc.) that specifies a normal gait, which is a virtual cyclic gait that follows the desired gait, is first determined by using the gait parameter and the aforesaid first dynamic model such that a predetermined boundary condition (a condition in that the gait states at the starting end and the terminating end, respectively, of one cycle of a normal gait coincide with each other) is satisfied. Further, the gait parameter defining a desired gait is determined such that a gait generated by using the gait parameter and the aforesaid first dynamic model satisfies a predetermined boundary condition (a condition in that the desired gait approaches the normal gait at the end side thereof). Then, the gait parameter of the desired gait determined as described above and the first dynamic model are used to generate the time series of the instantaneous values of the desired gait.

According to the technologies for generating desired gaits as described above, a model having high linearity is generally used as the first dynamic model (simplified model). Creating instantaneous desired gaits by using a dynamic model with high linearity makes it possible to efficiently and promptly create a gait that connects to or gradually approximates a normal gait, which is a virtual cyclic gait (a gait that enables the robot to continue stable motions). As a result, instantaneous desired gaits of the robot can be sequentially generated in real time while performing actual motions of the actual robot. Moreover, when determining the gait parameter of a normal gait, it is possible to efficiently and promptly determine the gait parameter that allows the boundary condition of the normal gait to be satisfied.

However, a dynamic model with high linearity generally tends to have relatively low dynamic accuracy in a variety of operations of a robot. More specifically, the kinetics of a robot on its dynamic model is prone to errors relative to the actual kinetics of an actual robot. For this reason, if an instantaneous desired gait created using the first dynamic model is directly applied to the actual robot to make the actual robot operate, then a dynamic balance condition guaranteed on the first dynamic model will not be satisfied on the actual robot, frequently causing the operations of the actual robot to lack in stability.

Hence, in the technologies disclosed in the aforesaid patent documents 1 and 2, a part of the instantaneous desired gait created using the first dynamic model is further subjected to a correction by using a second dynamic model. In this case, a model whose dynamic accuracy is higher than that of the first dynamic model is used as the second dynamic model. This makes it possible to generate gaits of higher dynamic accuracy (closer to the kinetics of an actual robot) than that of gaits created using the first dynamic model.

However, in the technologies disclosed in the aforesaid patent documents 1 and 2, gaits created using the second dynamic model tend to diverge, so that it has been necessary to correct a desired ZMP trajectory or generate a floor reaction force moment about a desired ZMP so as to restrain a desired motion trajectory of a robot from deviating from a gait created using the first dynamic model. And, in this case, the correction amount of the desired ZMP trajectory or the floor reaction force moment about the desired ZMP occasionally becomes relatively large, and in such a case, it has become difficult to maintain an ample stability margin from time to time. Conversely, if the correction amount of the desired ZMP trajectory or the permissible range of the floor reaction force moment about the desired ZMP is set to be smaller in order to maintain an ample stability margin, then the likelihood of the divergence of a gait has inconveniently increased.

Further, when determining the gait parameter of a normal gait, if the dynamic accuracy of the first dynamic model is set to be high, then the linearity of the first dynamic model deteriorates, making it difficult to efficiently and promptly find a normal gait parameter that is capable of satisfying the boundary condition of the normal gait. Hence, it has been difficult to determine an appropriate normal gait parameter that is resistant to the divergence of a gait in the aforesaid second dynamic model. As a result, there has been an inconvenience in that maintaining an ample stability margin is difficult or gaits generated using the second dynamic model are apt to diverge, as described above.

The present invention has been made with a view of the above background, and it is an object thereof to provide a gait generating system for a mobile robot that is capable of efficiently generating desired gaits that allow a predetermined boundary condition to be satisfied, while preventing the desired gaits from diverging. Another object of the present invention is to provide a gait generating system for a mobile robot that is, when determining a gait parameter defining a normal gait, capable of efficiently determining a normal gait parameter that allows the normal gait to satisfy a predetermined boundary condition and also of preventing a desired gait from diverging.

DISCLOSURE OF INVENTION

To fulfill the aforesaid objects, according to a first invention of a gait generating system for a mobile robot, there is provided a gait generating system determining a gait parameter, which is composed of a set of a plurality of parameters defining a gait of a mobile robot in a predetermined period, and generating a desired gait of the mobile robot in the predetermined period by using the determined gait parameter and a dynamic model of the aforesaid mobile robot, comprising:

a priority parameter required value determining means for determining a priority parameter required value, which is the value of a priority parameter to satisfy a requirement when the requirement related to the desired gait is given and a predetermined parameter out of the gait parameter is defined as the priority parameter while parameters except for the priority parameter are defined as non-priority parameters;

a base gait parameter setting means for setting, as a base gait parameter, either a gait parameter defining a reference gait of the mobile robot that is prepared beforehand or a gait parameter determined in the past so as to satisfy a predetermined boundary condition;

a priority parameter asymptotic means for updating the value of a priority parameter of the base gait parameter so as to cause the value of the priority parameter to gradually approach the priority parameter required value in steps until the value agrees with the priority parameter required value; and a new gait parameter determining means for determining in an exploratory manner a new gait parameter each time the value of the priority parameter is updated by the priority parameter asymptotic means, the new gait parameter being a gait parameter that has a priority parameter of the updated value and that allows a gait satisfying the predetermined boundary condition to be generated by using the dynamic model, wherein if the number of updates of the value of a priority parameter by the priority parameter asymptotic means when the new gait parameter is newly determined is denoted by n (n: integer satisfying n≧1), the value of the priority parameter obtained by the n-th update processing is denoted by an n-th priority parameter updated value, a new gait parameter to be newly determined is denoted by the n-th new gait parameter, and the base gait parameter is denoted by a 0-th new gait parameter, then the new gait parameter determining means is a means that sets the value of a non-priority parameter to the value of the non-priority parameter of an (n−1)th new gait parameter, defines a gait parameter, in which the value of a priority parameter has been set to an n-th priority parameter updated value, as an initial search candidate gait parameter, and searches for the value of the search object parameter, which is a predetermined parameter among non-priority parameters of the initial search candidate gait parameter, such that the value satisfies the predetermined boundary condition, thereby determining an n-th new gait parameter, and the new gait parameter determined at the last update of the value of a priority parameter by the priority parameter asymptotic means is defined as the gait parameter defining the desired gait, and the desired gait is generated by using the new gait parameter and the dynamic model.

Incidentally, in the inventions of the present application, including the first invention, a desired gait is composed of the time series of the desired instantaneous values of motions of a robot (the position/posture of each portion or the displacement amount of each joint) or it is composed of the time series of the desired instantaneous values of the motions and the time series of the desired instantaneous values of floor reaction forces (at least one of translational forces, moments, and points of action) acting on the robot. A dynamic model of the robot is a model that includes at least a motion/floor reaction force model (a dynamic equation of the robot) that expresses a relationship between motions of the robot and floor reaction forces acting on the robot. A restrictive condition related to motions of the robot (e.g., a range in which a certain portion of the robot may move or a geometric restrictive condition on link mechanisms) or a restrictive condition related to floor reaction forces (a permissible range of a predetermined component of a floor reaction force, a range in which the point of action of the floor reaction force may exist, etc.) may be added to the above dynamic model. In such a case, the dynamic model combines the restrictive conditions and the aforesaid motion/floor reaction force model. Generating a gait by using a gait parameter and a dynamic model means determining the amount of input to the dynamic model or the state amount of the dynamic model on the basis of a gait parameter and then generating a gait that satisfies the dynamics on the dynamic model (the relationship of the motion/floor reaction force model or the relationship and the added restrictive conditions).

According to the aforesaid first invention, each time the value of a priority parameter is updated by the aforesaid priority parameter asymptotic means, the value of the priority parameter of the aforesaid new gait parameter newly determined by the aforesaid new gait parameter determining means agrees with the value of the priority parameter after the updating by the priority parameter asymptotic means. Hence, the value of the priority parameter of the new gait parameter approaches in steps a priority parameter required value, i.e., the value of the priority parameter for satisfying a requirement related to the aforesaid desired gait, from the aforesaid base gait parameter (=the 0-th new gait parameter) until it is updated to finally agree with the priority parameter required value.

An n-th new gait parameter determined at an arbitrary n-th update of the value of a priority parameter is determined by setting a gait parameter, which is obtained by setting the value of a non-priority parameter to the value of a non-priority parameter of an (n−1)th new gait parameter, and by setting the value of a priority parameter to the value after the n-th update (the n-th priority parameter updated value), (a gait parameter whose parameters except for a priority gait parameter are the same as those of the (n−1)th new gait parameter) and defining the gait parameter as an initial search candidate gait parameter, and by searching for the value of the search object parameter, which is a predetermined parameter among non-priority parameters of the initial search candidate gait parameter, such that the value satisfies the aforesaid predetermined boundary condition. The boundary condition is, for example, a condition in that a predetermined state amount (e.g., the position or the posture of a certain portion of a robot or a changing velocity thereof, or a floor reaction force) of the gait (instantaneous value) at one end (the time of the starting end or the terminating end) of the aforesaid predetermined period agrees or substantially agrees with a predetermined value.

In this case, the parameters of the initial search candidate gait parameter except for the search parameter are the same as those of the n-th new gait parameter to be determined. And, the difference between a value of a priority parameter of the initial search candidate gait parameter and that of the (n−1)th new gait parameter previously determined can be sufficiently reduced, so that an appropriate search object parameter value of the n-th new gait parameter to be newly determined that will satisfy the aforesaid predetermined boundary condition will not considerably deviate from the value of the search object parameter of the (n−1)th new gait parameter. This makes it possible to easily and promptly search for a search object parameter of the n-th new gait parameter that can satisfy the aforesaid boundary condition.

Then, the aforesaid desired gait is generated by using the new gait parameter that has been determined at the last update of the value of a priority parameter, that is, when the value of the priority parameter finally agreed with the aforesaid priority parameter required value, and the aforesaid dynamic model.

Thus, according to the first invention, the value of the priority parameter of the gait parameter that defines the aforesaid desired gait to be generated is determined by adjusting the value of a search object parameter that is not a priority parameter in an exploratory manner while gradually (in steps) bringing the value of a priority parameter thereof close to a priority parameter required value, which is a proper required value, from the value of a priority parameter of the base gait parameter until it can finally satisfy the aforesaid boundary condition. In other words, a base gait parameter set as a starting point is changed to gradually satisfy the requirement and the boundary condition related to the aforesaid desired gait, thereby determining the gait parameter that defines the desired gait. In this case, the base gait parameter is either the gait parameter defining a reference gait prepared in advance or the gait parameter determined in the past such that it satisfies a predetermined boundary condition, so that it is a gait parameter (appropriate as a gait parameter) that will not lead to or will be resistant to the occurrence of an inconvenience, such as divergence of a gait, when a gait is generated using the gait parameter and a dynamic model. Hence, in the first invention, a gait parameter finally determined as the one that defines a desired gait allows a gait generated using the gait parameter and the dynamic model to be divergence-proof or resistant to divergence. As described above, a search object parameter of a proper new gait parameter can be easily and promptly searched for at each update of a priority parameter. As a result, a final gait parameter that defines the aforesaid desired gait can be efficiently determined.

Thus, the first invention makes it possible to efficiently determine a normal gait parameter that enables a normal gait to satisfy a predetermined boundary condition and consequently makes it possible to efficiently generate a desired gait that is capable of satisfying a predetermined boundary condition while preventing the desired gait, which is capable of preventing the divergence of a desired gait, from diverging. Furthermore, since a desired gait that does not diverge or that is resistant to divergence can be generated, it is no longer necessary to significantly correct a desired ZMP or a desired floor reaction force moment in a desired gait to prevent divergence, making it possible to increase a stability margin of a mobile robot.

Further, to fulfill the objects described above, according to a second invention of a gait generating system of a mobile robot, there is provided a gait generating system of a mobile robot, when generating a desired gait of a mobile robot in a predetermined period, the system determining a normal gait parameter, which is composed of a set of a plurality of parameters defining a normal gait, which is a virtual cyclic gait following the desired gait, and generating the desired gait such that the desired gait approximates a normal gait to be generated by using the determined normal gait parameter and a dynamic model of the mobile robot, comprising:

a priority parameter required value determining means for determining a priority parameter required value, which is the value of a priority parameter to satisfy a requirement, when the requirement related to a normal gait for the desired gait is input and a predetermined parameter out of the normal gait parameter is defined as the priority parameter while parameters except for the priority parameter are defined as non-priority parameters;

a base normal gait parameter setting means for setting, as a base normal gait parameter, either a normal gait parameter defining a reference normal gait of the mobile robot that is prepared beforehand or a normal gait parameter determined in the past so as to satisfy a predetermined boundary condition;

a priority parameter asymptotic means for updating the value of a priority parameter of the base normal gait parameter so as to cause the value to gradually approach the priority parameter required value in steps until the value agrees with the priority parameter required value; and a new normal gait parameter searching means for determining in an exploratory manner, each time a value of a priority parameter is updated by the priority parameter asymptotic means, a new normal gait parameter, which is a normal gait parameter that has a priority parameter of the updated value and that allows a gait satisfying the predetermined boundary condition to be generated by using the dynamic model, wherein if the number of updates of the value of a priority parameter by the priority parameter asymptotic means when the new normal gait parameter is newly determined is denoted by n (n: an integer satisfying n≧1), the value of the priority parameter obtained by the n-th update is denoted by an n-th priority parameter updated value, a new normal gait parameter to be newly determined is denoted by an n-th new normal gait parameter, and the base normal gait parameter is denoted by a 0-th new normal gait parameter, then the new normal gait parameter searching means sets the value of a non-priority parameter to the value of the non-priority parameter of an (n−1)th new normal gait parameter, and defines a gait parameter, in which the value of a priority parameter has been set to an n-th priority parameter updated value, as an initial search candidate gait parameter, and searches for the value of the search object parameter, which is a predetermined parameter among non-priority parameters of the initial search candidate gait parameter, such that the value satisfies the predetermined boundary condition, thereby determining an n-th new normal gait parameter, and the new normal gait parameter determined at the last update of the value of a priority parameter by the priority parameter asymptotic means is defined as the normal gait parameter of a normal gait for the desired gait, and the desired gait is generated such that the desired gait approximates a normal gait to be generated by using the normal gait parameter and the dynamic model.

According to the second invention, each time the value of a priority parameter is updated by the priority parameter asymptotic means, the value of the priority parameter of the new normal gait parameter newly determined by the new normal gait parameter determining means coincides with the value of a priority parameter updated by the priority parameter asymptotic means. Hence, the value of a priority parameter of the new normal gait parameter is updated such that it approaches in steps a priority parameter required value, i.e., the value of a priority parameter for satisfying a requirement related to the normal gait, from the base normal gait parameter (=a 0-th new normal gait parameter), until it finally agrees with the priority parameter required value.

The n-th new normal gait parameter determined at an arbitrary n-th update of the value of a priority parameter is determined by setting the value of a non-priority parameter to the value of a non-priority parameter of an (n−1)th new normal gait parameter, defining a gait parameter (a gait parameter in which parameters except for a priority gait parameter are the same as the (n−1)th new normal gait parameter) obtained by setting the value of a priority parameter to a value after an n-th update (an n-th priority parameter updated value) as an initial search candidate gait parameter, and searching for the value of a search object parameter, which is a predetermined parameter out of non-priority parameters of the initial search candidate gait parameter such that the predetermined boundary condition is satisfied. The boundary condition is, for example, a condition in that the predetermined state amounts (the positions or the postures of a certain portion of a robot or changing velocities thereof, or floor reaction forces) of a normal gait at both ends of one cycle of the normal gait (the starting end and the terminating end of the period) coincide with each other.

In this case, the parameters other than the search parameter of the initial search candidate gait parameter are the same as those of an n-th new normal gait parameter to be determined. Further, the difference between a priority parameter of the initial search candidate gait parameter and that of the (n−1)th new normal gait parameter previously determined can be sufficiently reduced, so that an appropriate search object parameter value of the n-th new normal gait parameter to be newly determined that will satisfy the aforesaid predetermined boundary condition will not considerably deviate from the value of the search object parameter of the (n−1)th new normal gait parameter. This makes it possible to easily and promptly search for a search object parameter of the n-th new normal gait parameter that can satisfy the aforesaid boundary condition.

Thus, according to the second invention, a normal gait parameter that defines a normal gait for the desired gait to be generated is determined by adjusting the value of a search object parameter that is not a priority parameter in an exploratory manner while gradually (in steps) bringing the value of a priority parameter thereof close to a priority parameter required value, which is a proper required value, from the value of a priority parameter of the base gait parameter until it can finally satisfy the aforesaid boundary condition. In other words, a base gait parameter set as a starting point is changed to gradually satisfy the requirement and the boundary condition related to the aforesaid normal gait, thereby determining the normal gait parameter that defines the normal gait. In this case, the base gait parameter is either a gait parameter that defines a reference normal gait prepared in advance or a normal gait parameter determined in the past such that it satisfies a predetermined boundary condition, so that it is a proper gait parameter that can satisfy the aforesaid boundary condition when a normal gait is generated using either of the above gait parameters and a dynamic model. Therefore, the normal gait parameter finally determined as the one that defines the normal gait for the aforesaid desired gait in the second invention allows a normal gait generated using it and a dynamic model to properly satisfy the boundary condition. Moreover, as described above, a search object parameter of a proper new normal gait parameter can be easily and promptly searched for at each update of a priority parameter. As a result, a final normal gait parameter that defines a normal gait for the aforesaid desired gait can be efficiently determined.

Furthermore, according to the second invention, the aforesaid desired gait is generated such that it approximates a normal gait that is generated using a new normal gait parameter determined at the last update of the value of a priority parameter, that is, a new normal gait parameter determined when the value of a priority parameter finally agrees with the aforesaid priority parameter required value and the aforesaid dynamic model; therefore, the desired gait will be a gait capable of properly enhancing continued stability of a robot on an n-th dynamic model, making it possible to prevent the desired gait from diverging. In addition, since a desired gait that does not diverge or that is resistant to divergence can be generated, it is no longer necessary to significantly correct a desired ZMP or a desired floor reaction force moment in a desired gait to prevent divergence, making it possible to increase a stability margin of a mobile robot.

The first invention and the second invention may be combined. More specifically, in the first invention, a desired gait in a predetermined period is generated such that it approximates a normal gait in the second invention, and at this time, the normal gait parameter defining the normal gait is determined as in the second invention. In this case, the dynamic model in the first invention and the dynamic model in the second invention may be of course the same; however, they may alternatively be different.

In the aforesaid first invention, preferably, the total number of updates of the value of a priority parameter by the priority parameter asymptotic means is set on the basis of the difference between the value of a priority parameter of the aforesaid base gait parameter and the aforesaid priority parameter required value (a third invention).

Similarly, in the second invention, preferably, the total number of updates of the value of a priority parameter by the priority parameter asymptotic means is set on the basis of the difference between the value of a priority parameter of the aforesaid base normal gait parameter and the aforesaid priority parameter required value (a fourth invention).

The third invention or the fourth invention described above makes it possible to obtain an appropriate update amount such that the update amount at each update of the value of a priority parameter is not excessively large or small, allowing efficient search processing of a search object parameter of each n-th new gait parameter or each n-th new normal gait parameter to be carried out.

Further, in the aforesaid first invention, preferably, the aforesaid gait parameter includes a parameter that defines a desired ZMP trajectory out of the desired gait as the search object parameter (a fifth invention).

According to the fifth invention, a desired gait that allows the boundary condition to be satisfied can be generated, while preventing a desired ZMP trajectory from significantly deviating from a trajectory suited for securing a stability margin for a robot.

According to the aforesaid second invention, the aforesaid normal gait parameter preferably includes, as the aforesaid search object parameter, a parameter that defines a predetermined state amount of a motion of a mobile robot at one end of the period of one cycle of the aforesaid normal gait (a sixth invention).

According to the sixth invention, a normal gait parameter that satisfies a boundary condition of a normal gait is determined by adjusting a predetermined state amount of a motion of a mobile robot at one end of the period of one cycle of a normal gait, thus making it possible to determine a normal gait parameter that defines a normal gait having a high stability margin. Incidentally, a normal gait is a cyclic gait, so that adjusting a predetermined state amount of a motion of a robot at one end of one cycle thereof means adjusting the predetermined state amount of the motion of the robot at the other end of the one cycle.

Further, in the first invention described above, the aforesaid predetermined boundary condition includes a condition in that a predetermined state amount of a motion of a mobile robot at a gait boundary in the aforesaid predetermined period agrees with the predetermined state amount of the motion of the mobile robot in an adjoining gait at the boundary (a seventh invention).

More specifically, a desired gait must be continuous; therefore, when generating a desired gait in the predetermined period, a predetermined state amount of a motion of a gait of a mobile robot (e.g., the position or the posture of a certain portion of a certain mobile robot or a changing velocity thereof) preferably agrees with a predetermined state amount of the motion in a gait adjacent to the aforesaid gait at a boundary of a gait in the predetermined period (gait at the starting end or the terminating end of the predetermined period).

Further, in the first invention, if a normal gait (or a normal gait parameter defining the normal gait), which is a virtual cyclic gait connected to a desired gait in the predetermined period is determined and a desired gait is generated such that it approximates the aforesaid desired gait, then the aforesaid predetermined boundary condition preferably includes a condition in that a predetermined state amount of a motion of a mobile robot at the boundary on the terminating end of a gait in the predetermined period agrees with the predetermined state amount of the motion of the mobile robot in the normal gait determined as the virtual cyclic gait that is to follow the aforesaid gait (an eighth invention).

A gait parameter that makes it possible to generate a desired gait approximating a normal gait at the terminating end of the desired gait (the terminating end of the predetermined period) can be efficiently generated by determining a boundary condition for the aforesaid desired gait as described above. In the eighth invention, a normal gait parameter that defines a normal gait may be determined as in the second invention, although it does not necessarily have to be determined in steps as in the second invention.

Further, in the second invention, the predetermined boundary condition preferably includes a condition in that a predetermined state amount of a motion of a mobile robot at the starting end of one cycle of the normal gait and that at the terminating end thereof agree with each other (a ninth invention).

A normal gait is a cyclic gait, so that a normal gait parameter that allows a normal gait satisfying a periodicity condition to be generated can be properly determined by determining a boundary condition as described above. Incidentally, the starting end of one cycle of a normal gait in the ninth invention does not necessarily have to coincide with the terminating end of the aforesaid desired gait.

In the sixth to the ninth inventions described above, especially if the aforesaid mobile robot is a legged mobile robot equipped with a plurality of legs extended from its body, then the aforesaid predetermined state amount preferably includes at least one of the position of the body of the robot, the velocity of the body, the posture angle of the body, the angular velocity of the posture angle of the body, the weighted mean values of the position and the velocity of the body, the position of the total center-of-gravity of the robot, the velocity of the total center-of-gravity, the weighted mean values of the position and the velocity of the total center-of-gravity, and a divergence component (a tenth invention).

According to this, in the sixth invention, it is possible to efficiently determine a normal gait parameter that satisfies a boundary condition of a normal gait while at the same time reducing the aforesaid search object parameters. Further, especially in the eighth invention, it is possible to efficiently determine a gait parameter for bringing a desired gait in the aforesaid predetermined period close to a normal gait while at the same time reducing the search object parameters. In the eighth invention, the aforesaid predetermined state amount, in particular, is ideally the weighted mean values of the position and the velocity of the body of the body or the weighted mean values of the position and the velocity of the total center-of-gravity or a divergence component.

BEST MODE FOR CARRYING OUT THE INVENTION

The following will explain embodiments of the present invention with reference to the accompanying drawings. In the embodiments in the present description, as mobile robots, bipedal mobile robots will be used as examples of legged mobile robots.

FIG. 1 is a schematic diagram showing the outline of the entire construction of a bipedal mobile robot to which an embodiment of the present invention is applied.

As shown in the figure, a bipedal mobile robot (hereinafter referred to as "the robot") 1 is equipped with a pair of right and left leg bodies (leg links) 2, 2 extended downward from a body (a base body of the robot 1) 3. The two leg bodies 2, 2 share the same construction, each having six joints. The six joints are comprised of, in the following order from the body 3 side, joints 10R, 10L for turning (rotating) a hip (waist) (for rotation in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction. In the present description, the symbols R and L mean that they correspond to the right side and the left side, respectively, of the robot 1.

A foot (foot portion) 22R(L) constituting a distal portion of each leg body 2 is attached to the bottoms of the two joints 18R(L) and 20R(L) of the ankle of each leg body 2. The aforesaid body 3 is installed at the uppermost top of the two leg bodies 2, 2 through the intermediary of the three joints 10R(L), 12R(L) and 14R(L) of the hip of each leg body 2. A control unit 60 and the like, which will be discussed in detail hereinafter, is housed in the body 3. For convenience of illustration, the control unit 60 is shown outside the body 3 in FIG. 1.

In each leg body 2 having the aforesaid construction, a hip joint (or a waist joint) is formed of the joints 10R(L), 12R(L) and 14R(L), the knee joint is formed of the joint 16R(L), and the ankle joint is formed of the joints 18R(L) and 20R(L). The hip joint and the knee joint are connected by a thigh link 24R(L), and the knee joint and the ankle joint are connected by a crus link 26R(L).

A pair of right and left arm bodies 5, 5 is attached to both sides of an upper portion of the body 3, and a head 4 is disposed at a top end of the body 3. Each arm 5 is provided with a shoulder joint composed of three joints 30R(L), 32R(L), and 34R(L), an elbow joint composed of a joint 36 R(L), a wrist joint composed of a joint 38R(L), and a hand 40R(L) connected to the wrist joint. The links between shoulder joint and the elbow joint, and between the elbow joint and the wrist joint, respectively, are formed of rigid bodies.

The construction of the robot 1 described above imparts six degrees of freedom to the foot 22R(L) of each leg body 2 relative to the body 3. During a travel, such as walking, of the robot 1, desired motions of the two feet 22R and 22L can be accomplished by driving 6*2=12 joints of the two leg bodies 2, 2 together ("*" in this description denotes multiplication as scalar calculation, while it denotes an outer product in vector calculation) at appropriate angles. This arrangement enables the robot 1 to arbitrarily move in a three-dimensional space. Furthermore, each arm body 5 is capable of performing a motion, such as arm swinging, by rotating the shoulder joint, the elbow joint, and the wrist joint thereof.

As shown in FIG. 1, a publicly known six-axis force sensor 50 is provided under the ankle joints 18R(L), 20R(L) and between the ankle joints and the foot 22R(L) of each leg body 2. The six-axis force sensor 50 detects primarily whether the foot 22R(L) of each leg body 2 is in contact with the ground and also a floor reaction force (ground contact load) acting on each leg body 2, and it outputs detection signals of three-direction components Fx, Fy and Fz of a translational force of the floor reaction force and three-direction components Mx, My and Mz of a moment to the control unit 60. Furthermore, the body 3 is equipped with a posture sensor 54 for detecting an inclination angle (posture angle) of the body 3 relative to a Z-axis (vertical direction (gravitational direction)) and an angular velocity thereof, detection signals thereof being output from the posture sensor 54 to the control unit 60. The posture sensor 54 is provided with an accelerometer and a gyro sensor, which are not shown, and the detection signals of these sensors are used to detect inclination angles of the body 3 and angular velocities thereof. Although detailed structures are not shown, each joint of the robot 1 is provided with an electric motor 64 (refer to FIG. 3) for driving the joint and an encoder (rotary encoder) 65 (refer to FIG. 3) for detecting a rotational amount of the electric motor 64 (a rotational angle of each joint). Detection signals of the encoder 65 are output from the encoder 65 to the control unit 60.

Furthermore, although not shown in FIG. 1, a joystick (operating device) 73 (refer to FIG. 3) for manipulating the robot 1 is provided outside the robot 1. The joystick 73 is constructed in such a manner that a request or a restrictive condition on a gait of the robot 1, such as turning the robot 1 that is traveling straight, specifying the moving direction of the robot 1, or specifying the motion mode of the robot 1, e.g., walking or running, or the frictional condition of a floor surface (road surface condition), is input to the control unit 60 as necessary by operating the joystick 73. Communication between the joystick 73 and the control unit 60 is effected by a wire or wireless means.

FIG. 2 schematically shows the basic construction of the distal portion (including each foot 22R(L)) of each leg body 2 in the present embodiment. As shown in the figure, a spring mechanism 70 is installed between each foot 22R(L) and the aforesaid six-axis force sensor 50, and a foot sole elastic member 71 made of rubber or the like is bonded to a foot sole (the bottom surface of each foot 22R,L). These spring mechanism 70 and the foot sole elastic member 71 constitute a compliance mechanism 72. Although no detailed illustration is given, the spring mechanism 70 is constructed of a square guide member (not shown), which is installed on the upper surface of the foot 22R(L), and a piston-shaped member (not shown) that is installed adjacently to the ankle joint 18R(L) (the ankle joint 20R(L) being omitted in FIG. 2) and the six-axis force sensor 50 and housed in the guide member through the intermediary of an elastic member (rubber or spring) so that it is free to move extremely slightly.

The foot 22R(L) indicated by a solid line in FIG. 2 is in a state wherein it is being subjected to no floor reaction force. When each leg body 2 is subjected to a floor reaction force, the spring mechanism 70 and the foot sole elastic member 71 of the compliance mechanism 72 flex, causing the foot 22R(L) to shift to the position/posture illustrated by a dashed line in the figure. The structure of the compliance mechanism 72 is important not only to ease a landing impact but also to enhance controllability. The details thereof have been explained in, for example, Japanese Unexamined Patent Publication Application No. 5-305584 previously proposed by the present applicant, so that no further explanation will be given in the present description.

FIG. 3 is a block diagram showing a construction of the control unit 60. The control unit 60 is comprised of a microcomputer, and it includes a first calculator 90 and a second calculator 92 formed of CPUs, an A/D converter 80, a counter 86, a D/A converter 96, a RAM 84, a ROM 94, and a bus line 82 for transferring data among them. In the control unit 60, output signals of the six-axis force sensor 50 of each leg body 2, the posture sensor 54 (an accelerometer and a rate gyro sensor), the joystick 73, etc. are converted into digital values by the A/D converter 80 and sent to the RAM 84 via the bus line 82. Outputs of the encoder 65 (rotary encoder) of each joint of the robot 1 are input to the RAM 84 via the counter 86.

As will be discussed hereinafter, the first calculator 90 generates desired gaits, calculates a joint angle displacement command (a command value of a displacement angle of each joint or a rotational angle of each electric motor 64), and sends the calculation result to the RAM 84. The second calculator 92 reads the joint angle displacement command and an actual measurement value of a joint angle detected on the basis of an output signal of the encoder 65 from the RAM 84 to calculate a manipulated variable required for driving each joint and outputs the manipulated variable to the electric motor 64 for driving each joint through the intermediary of the D/A converter 96 and a servo amplifier 64a.

FIG. 4 is a block diagram showing major functional construction of the control unit 60 of the robot 1 in an embodiment in the present description. A portion except the "actual robot" in FIG. 4 is constituted of processing functions implemented by the control unit 60 (primarily the functions of the first calculator 90 and the second calculator 92). The processing function is implemented by programs or the like installed in the control unit 60. In the following explanation, the aforesaid symbols R and L will be omitted as long as it is not particularly necessary to discriminate right and left of each part of the robot 1 (the leg bodies 2, the arm bodies 5, etc.).

An explanation will now be given. The control unit 60 is equipped with a gait generating device 100 that generates and outputs desired gaits freely in real time, as it will be discussed later. The gait generating device 100 implements an embodiment of the present invention by its functions. A desired gait output by the gait generating device 100 is constituted of a corrected desired body posture trajectory (the trajectory of desired postures of the body 3), a corrected desired body position trajectory (the trajectory of desired positions of the body 3), a desired foot position/posture trajectory (the trajectories of desired positions and desired postures of each foot 22), a desired arm posture trajectory (the trajectory of desired postures of each arm body), a desired ZMP (desired total floor reaction force central point) trajectory, the trajectory of corrected desired floor reaction force moments about a desired ZMP, and a desired total floor reaction force trajectory. If a part (a head or the like) that can be moved relative to the body 3 is provided in addition to the leg bodies 2 and the arm bodies 5, then a desired position/posture trajectory of the movable part is added to a desired gait.

Here, the definitions and the like of basic terms related to gaits in the present description will be explained. The term "trajectory" in a gait means a temporal change pattern (time series pattern) and it may be referred to as "pattern" in place of "trajectory." Furthermore, a "posture" means a spatial orientation. For example, a body posture is represented by an inclination angle (posture angle) of the body 3 in the roll direction (about the X-axis) relative to the Z-axis (vertical axis) and an inclination angle (posture angle) of the body 3 in the pitch direction (about the Y-axis), and a foot posture is represented by means of a two-axis spatial azimuth fixedly set on each foot 22. In the present description, a body posture may be referred to as a body posture angle or a body inclination angle. A desired arm posture related to the arm bodies 5 is represented by means of a relative posture with respect to the body 3 in the embodiments of the present description.

The position of the body means the position of a predetermined representative point of the body 3 (a certain fixed point on a local coordinate system arbitrarily and fixedly set relative to the body 3). Similarly, the position of a foot means the position of a predetermined representative point of each foot 22 (a fixed point on a local coordinate system arbitrarily and fixedly set relative to each foot 22). For example, the representative point of each foot 22 is set on the bottom surface of each foot 22 (more specifically, for example, a point at which a perpendicular line from the center of the ankle joint of each leg body 2 to the bottom surface of each foot 22 intersects with the bottom surface).

The aforesaid corrected desired body posture and corrected desired body position related to the body 3 are obtained by correcting a certain desired body posture that provides a reference (provisional desired body posture) and a desired body position (provisional desired body position). In the embodiments in the present description, the desired body position/posture determined as discussed later (the desired body position/posture determined in S032 of FIG. 12, which will be discussed later) correspond to the desired body position/posture that provide the reference.

In the explanation hereinafter, the term "desired" will be frequently omitted if there is no danger of misunderstanding.

In a gait, the constituent elements except the constituent elements related to a floor reaction force, namely, the constituent elements related to the position/posture of each part of the robot 1, such as foot position/posture and body position/posture, are referred generically to "motions." Further, a floor reaction force acting on each foot 22 (a floor reaction force composed of a translational force and a moment) is referred to as "the each foot floor reaction force," and the resultant force of "the floor reaction forces of individual feet" related to all (two) feet 22R and 22L of the robot 1 is referred to as "the total floor reaction force." However, in the following explanation, the each foot floor reaction force will be hardly referred to, so that "the floor reaction force" will be handled as synonymous with "the total floor reaction force" unless otherwise specified.

A desired floor reaction force is generally represented in terms of a point of action and a translational force and moment acting on the point. The point of action can be set anywhere, so that innumerable expressions are conceivable for the same desired floor reaction force; if, however, a desired floor reaction force is represented using, in particular, a desired floor reaction force central point (the desired position of the central point of a total floor reaction force) as the point of action, then the moment component of the desired floor reaction force except for a vertical component (the moment component about a vertical axis (Z-axis)) will be zero. In other words, a horizontal component (the moment about horizontal axes (X-axis and Y-axis)) of the moment of the desired floor reaction force about the desired floor reaction force central point will be zero.

In a gait that satisfies a dynamic balance condition, the ZMP calculated from a desired motion trajectory of the robot 1 (the point at which a moment excluding its vertical component becomes zero, the moment acting about the point due to the resultant force of the inertial force calculated from the desired motion trajectory and the gravity) coincides with the desired floor reaction force central point. This is, therefore, equivalent to providing a desired ZMP trajectory in place of a desired floor reaction force central point trajectory.

Here, when walking of the robot 1 is performed, the vertical component of a translational floor reaction force is subordinately determined as the vertical position of the body 3 (body height) of the robot 1 is determined by the technique for determining a body height previously proposed in, for example, Japanese Unexamined Patent Application Publication No. 10-86080 by the present applicant. Furthermore, the horizontal component of the translational floor reaction force is also subordinately determined as the body horizontal position trajectory (or the positional trajectory of the total center-of-gravity) of the robot 1 is determined such that the horizontal component of the moment generated about a desired ZMP by the resultant force of an inertial force attributable to a motion of a desired gait and gravity becomes zero. For this reason, when performing the walking of the robot 1, only the desired ZMP may be set as the physical amount to be explicitly set in relation to the floor reaction force of the desired gait.

Meanwhile, if a travel of the robot 1, e.g., running of the robot 1, is performed with a gait that includes a period during which the floor reaction force becomes zero or substantially zero, then a translational floor reaction force vertical component is also important in controlling the operation of the robot 1. Hence, it is preferred to explicitly set the desired trajectory of the translational floor reaction force vertical component and then to determine the trajectory of a desired body vertical position or the like of the robot 1. Also, when the walking of the robot 1 is performed, if the robot 1 is to travel on a floor surface with a low friction coefficient (on a low-µ road), it is preferred to explicitly set the desired trajectory of the translational floor reaction force vertical component to prevent slippage or the like of the robot 1, because the translational floor reaction force vertical component (more precisely, the component of the translational floor reaction force that is perpendicular to the floor surface) influences a frictional force. Furthermore, according to the embodiments of the present invention, in a desired gait finally output by the gait generating device 100, a corrected desired floor reaction force moment (a moment whose horizontal component is not necessarily zero) is generated about a desired ZMP.

Thus, in the embodiments in the present description, the constituent elements related to the floor reaction forces of desired gaits output from the gait generating device 100 include a corrected desired floor reaction force moment about a desired ZMP and a desired translational floor reaction force vertical component in addition to a desired ZMP trajectory.

And, in the present description, a desired gait output by the gait generating device 100 is used to mean "a set of a desired motion trajectory and a desired floor reaction force trajectory in the period of one step or a plurality of steps" in a broad sense, and to mean "a set of a desired motion trajectory and a desired floor reaction force trajectory that includes a desired ZMP, a corrected desired floor reaction force moment and a desired translational floor reaction force vertical component in the period of one step" in a narrow sense.

However, according to the embodiments in the present description, in a desired gait (provisional desired gait) prepared in the process before a final desired gait (a desired gait output from the gait generating device 100) is determined, the horizontal component of a desired floor reaction force moment about a desired ZMP is set to zero as defined by an original desired ZMP. Accordingly, in a provisional desired gait other than a desired gait that is finally determined, a gait obtained by removing a corrected desired floor reaction force moment from the desired gait in the aforesaid narrow sense is used to mean a desired gait. Supplementally, according to the embodiments in the present description, a desired gait (a provisional desired gait) prepared in the process before a final desired gait (a desired gait output by the gait generating device 100) is determined is closely associated with the present invention. Hence, the majority of a desired gait appearing in the following explanation will be used to mean a gait (a gait that satisfies a desired ZMP) obtained by removing a corrected desired floor reaction force moment from a desired gait in the aforesaid narrow sense.

In the following explanation, "a floor reaction force vertical component" will mean "a translational floor reaction force vertical component," and the vertical component (a component about a vertical axis) of the moment in a floor reaction force will use the term "moment" to distinguish it from "a floor reaction force vertical component." Similarly, "a floor reaction force horizontal component" will mean "a translational floor reaction force horizontal component."

"One step" of a desired gait will be used to mean a period from the moment one leg body 2 of the robot 1 lands to the moment the other leg body 2 lands.

A two-leg supporting period in a gait refers to a period during which the robot 1 supports its own weight by the two leg bodies 2, 2, a one-leg supporting period refers to a period during which the robot 1 supports its own weight only by one leg body 2, and a floating period refers to a period during which both leg bodies 2, 2 are apart from a floor (floating in the air). In the one-leg supporting period, the leg body 2 not supporting the self-weight of the robot 1 is referred to as a free leg. A running gait of the robot 1, in which the one-leg supporting period and the floating period are alternately repeated, does not have the two-leg supporting period. In this case, during the floating period, both leg bodies 2, 2 do not support the self-weight of the robot 1; however, for the sake of convenience, the leg body 2 that was a free leg and the leg body 2 that was a supporting leg during a one-leg supporting period immediately before the floating period will be referred to as a free leg and a supporting leg, respectively, even in the floating period.

The trajectory of a desired gait is described using a global coordinate system (a coordinate system fixed to a floor). As a global coordinate system, a supporting leg coordinate system defined, for example, on the basis of landing position/posture of the supporting leg foot 22 is used. This supporting leg coordinate system is, for example, a coordinate system in which the point at which a perpendicular line extended to a floor surface from the center of the ankle joint to which the foot 22 is connected intersects with the floor, while substantially the entire bottom surface of the supporting leg foot 22 is in contact with the floor, is defined as the origin, and when the supporting leg foot 22 is projected onto a horizontal plane that passes the origin, the longitudinal direction of the foot 22 is defined as the X-axis direction and the lateral direction thereof is defined as the Y-axis direction (the Z-axis direction being the vertical direction). In the following explanation, the X, Y, Z coordinates will mean the coordinates in this supporting leg coordinate system unless otherwise specified.

FIG. 5 is a block diagram showing the details of the gait generating device 100. Referring to this FIG. 5, more specific overview of the processing of the gait generating device 100 will be explained below.

As illustrated, the gait generating device 100 is equipped with a gait parameter determiner 100a. The gait parameter determiner 100a determines the values of gait parameters that define a desired gait or a time series table. This gait parameter determiner 100a is responsible for the processing related to the core of the present invention.

According to the embodiments in the present description, a gait parameter determined by the gait parameter determiner 100a includes the parameters that define a desired foot position/posture trajectory, a desired arm posture trajectory, a desired ZMP trajectory, and a desired floor reaction force vertical component trajectory, respectively, of a desired gait.

When the gait generating device 100 generates a desired gait, estimated landing position/posture and estimated landing time of the free leg foot 22, or basic required values (required parameters) for generating a gait, such as the length of a step and moving velocity, are supplied to the gait generating device 100 from the aforesaid joystick 73 or an action planner (a device for preparing action plans of the robot 1), which is not shown. Alternatively, the gait generating device 100 reads the required parameters from a storage medium in which the aforesaid required parameters have been stored beforehand and retained. Then, the gait parameter determiner 100a of the gait generating device 100 determines a gait parameter on the basis of the required parameters.

In the embodiments in the present description, the gait parameter determined by the gait parameter determiner 100a also includes parameters that define a reference body posture trajectory, a ZMP permissible range, and a floor reaction force horizontal component permissible range, respectively.

Although the aforesaid reference body posture trajectory is not the one finally output from the gait generating device 100, it is referred to when determining a desired gait. The reference body posture trajectory is supplied in relation to the body posture of the robot 1 from the joystick 73 or the action planner, or it is a body posture trajectory generated directly on the basis of a requirement (a requirement for retaining a body posture at a vertical posture, or the like) that has been set in advance. A desired body posture (hereinafter, "body posture" with no "reference" attached thereto will indicate a desired body posture) is generated such that it follows a reference body posture for a long time or coincides therewith.

To add a supplemental explanation regarding the aforesaid ZMP permissible range, in the embodiments in the present description, a desired gait is corrected so as to generate a corrected desired floor reaction force moment (this generally being not zero) about a desired ZMP. Therefore, the desired ZMP will be a point having a different definition from an original definition (the definition in that it is a point at which a floor reaction force moment horizontal component is zero), and a ZMP that satisfies the original definition (hereinafter referred to as a true ZMP) moves to a position shifted from the desired ZMP by a value obtained by dividing the corrected desired floor reaction force moment by a desired floor reaction force vertical component.

The true ZMP of a corrected gait (the desired gait finally output from the gait generating device 100) must fall within at least a range wherein a ZMP can exist (a so-called supporting polygon: a range wherein a floor reaction force point of action (ZMP) can exist when it is assumed that no adhesive force acts between a floor and the bottom surface of the foot 22). Further, in order to secure a sufficient stability margin of the robot 1, the true ZMP of a corrected gait preferably falls within a range near the center in the range wherein the ZMP can exist. Hence, in the embodiments in the present description, a permissible range wherein a true ZMP of a corrected gait can exist is set. This range is called a ZMP permissible range. The ZMP permissible range is set to coincide with a range wherein a ZMP can exist or to be included in a range wherein a ZMP can exist.

As described above, the value obtained by dividing a corrected desired floor reaction force moment about a desired ZMP by a desired floor reaction force vertical component indicates the amount of positional deviation of a true ZMP from the desired ZMP; therefore, the amount of positional deviation of the true ZMP from the desired ZMP (a ZMP-converted value of a corrected desired floor reaction force moment) may be set instead of setting the corrected desired floor reaction force moment about the desired ZMP. Moreover, a ZMP permissible range can be converted into a permissible range of a corrected desired floor reaction force moment by multiplying the position of its boundary by a desired floor reaction force vertical component, and the permissible range of the corrected desired floor reaction force moment may be set in place of a ZMP permissible range.

The aforesaid floor reaction force horizontal component permissible range is the permissible range of a floor reaction force horizontal component that makes it possible to generate a frictional force having a magnitude that prevents the foot 22 from slipping on the surface of foot 22 of the robot 1 that is in contact with a floor. According to the embodiments in the present description, at least a motion (a desired motion) of a desired gait finally output from the gait generating device 100 is generated such that a floor reaction force horizontal component balancing out the horizontal component of an inertial force of the robot 1 that is produced thereby falls within a floor reaction force horizontal component permissible range.

The floor reaction force horizontal component permissible range set in the embodiments in the present description comes in one for normal gaits set by the processing of S022 to be discussed hereinafter, one for basic gaits set by the processing of S026, and one for gait corrections (for full-model corrections) set in S030. However, these floor reaction force horizontal component permissible ranges do not necessarily have to differ from each other; they may be the same. Meanwhile, the ZMP permissible range is only the one for gait corrections (for full-model corrections) set by the processing of S030.

Supplementally, a gait parameter for generating a desired gait includes parameters in addition to the aforesaid parameters. They are determined in the gait parameter determiner 100a such that they satisfy predetermined boundary conditions.

The gait parameter determined by the gait parameter determiner 100a is input to a desired instantaneous value generator 100b. Based on the input gait parameter, the desired instantaneous value generator 100b sequentially calculates (generates) the instantaneous values (values for each predetermined control processing cycle of the aforesaid control unit 60) of the constituent elements of a desired gait, such as desired body position/posture, desired foot position/posture, a desired ZMP, a desired floor reaction force vertical component, a ZMP permissible range, and floor reaction force horizontal component permissible range, by using a dynamic model. Incidentally, FIG. 5 shows only some of the desired instantaneous values as representative ones.

The desired instantaneous values calculated by the desired instantaneous value generator 100b are input to a full-model corrector 100c. The full-model corrector 100c calculates corrected desired body position/posture obtained by correcting the desired body position/posture, which have been determined by the desired instantaneous value generator 100b, by using a full model as a dynamic model with high dynamic accuracy, and also calculates a corrected desired floor reaction force moment, which is a desired value of the horizontal component of a floor reaction force moment about a desired ZMP.

More generally, the full-model corrector 100c carries out processing of E1 or E2 to satisfy the following conditions D1 to D3. Specifically, the full model corrector 100c:

E1) corrects the body position/posture of a gait generated by the desired instantaneous value generator 100b, or E2) corrects the body position/posture of a gait generated by the desired instantaneous value generator 100b and also outputs a corrected desired floor reaction force moment about a desired ZMP (corrects a desired floor reaction force) in order to satisfy the following conditions:

D1) A dynamic balance condition is satisfied with accuracy that is higher than a gait generated by the desired instantaneous value generator 100b;

D2) A true ZMP (a ZMP satisfying the original definition that has been corrected by generating a corrected desired floor reaction force moment about a desired ZMP) falls within a ZMP permissible range (a permissible range that allows a sufficient stability margin to be maintained); and D3) A floor reaction force horizontal component falls within a floor reaction force horizontal component permissible range.

In the embodiments in the present description, the processing of E2 is carried out to satisfy the conditions D1 to D3. The processing by the full-model corrector 100c in the embodiments in the present description is the same as that explained in detail in, for example, PCT international publication WO/03/057427/A1 previously proposed by the present applicant (specifically, the processing of S038 shown in FIG. 13 of the publication). Hence, detailed explanation of the processing by the full-model corrector 100c in the present description will be omitted.

Further, in the embodiments in the present description, corrections by the full-model corrector 100c are made. Alternatively, however, such correction may be omitted, and the instantaneous values of a desired gait determined by the desired instantaneous value generator 100b may be directly output from the gait generating device 100.

Referring back to FIG. 4, the instantaneous values of a desired gait, including the instantaneous values of corrected desired body position/posture, a corrected desired floor reaction force moment about a desired ZMP, and desired foot position/posture determined as described above, are supplied to a composite-compliance control unit 101 (the portion enclosed by the dashed line in FIG. 4). The composite-compliance control unit 101 controls a joint actuator (an electric motor 64) so as to follow a desired gait, while maintaining the balance of the robot 1. More specific processing of the composite-compliance control unit 101 will be discussed later.

This completes outlining the gait generating device 100.

The embodiment of the present invention will now be specifically explained. According to the present embodiment, for each control processing cycle of the aforesaid control unit 60, the gait parameter determiner 100a determines in steps a parameter for correcting a desired ZMP trajectory (more precisely, the parameter that defines a desired ZMP trajectory in a gait parameter) or determines in the exploratory manner parameters other than the aforesaid parameter, and uses the determined gait parameters and the aforesaid dynamic models so as to determine a time series of instantaneous values of a desired gait by the desired instantaneous value generator 100b. In this case, a gait parameter related to a gait that has already been prepared is used as an initial value, and some parameters in the gait parameter are brought close in steps to a gait parameter determined for the gait to be prepared, a predetermined parameter among the remaining parameters being determined in an exploratory manner.

A body motion mode and dynamic models used for generating gaits in the present embodiment will now be explained.

In a gait that includes a floating period, such as a running gait, or walking on a low-friction floor surface, there are cases where a dynamic balance condition cannot be satisfied while the floor reaction force horizontal component of a desired gait being within a permissible range (or within a friction limit) simply by adjusting a body horizontal acceleration. Hence, in the present embodiment, two motion modes (a body translation mode and a body rotation mode) of the body 3 explained below are compositively generated so as to satisfy the dynamic balance condition while the floor reaction force horizontal component of a desired gait remains within a permissible range (or within friction limits).

As shown in FIG. 6(a), if only a body horizontal acceleration is perturbed from a certain motion state, then the total center-of-gravity horizontal acceleration and the angular momentum about the total center-of-gravity are perturbed. More specifically, in the perturbation of the body horizontal acceleration, the floor reaction force moment about a desired ZMP (excluding the component about a vertical axis) and a floor reaction force horizontal component (to be precise, a translational floor reaction force horizontal component) are perturbed without perturbing a floor reaction force vertical component that dynamically balances out the resultant force of the inertial force generated thereby and gravity. This motion mode is referred to as the body translation mode.

In other words, a motion in which the horizontal component of a floor reaction force moment about a desired ZMP and a floor reaction force horizontal component (translational floor reaction force horizontal component) are changed without changing a floor reaction force vertical component is referred to as the body translation mode.

A change in the floor reaction force moment component per unit acceleration at that time is denoted by $\Delta Mp$ and a change in the floor reaction force horizontal component per unit acceleration is denoted by $\Delta Fp$. If the body 3 in the state shown in FIG. 6(a) is horizontally accelerated forward, then $\Delta Mp$ and $\Delta Fp$ act in the directions of the arrows shown in FIG. 6(a).

For the ease of sensory perception, a floor reaction force balancing out the resultant force of an inertial force generated by a motion and gravity has been used for the representation; however, a representation using the resultant force of the inertial force and gravity is theoretically accurate. Incidentally, the aforesaid resultant force and floor reaction force have the same magnitude but are in the opposite directions.

Meanwhile, if a body posture angular acceleration is perturbed about a certain point Pr from a certain motion state as shown in FIG. 6(b), then the angular momentum about the total center-of-gravity is perturbed without the total center-of-gravity being perturbed. This means that the body posture angular acceleration perturbation about the point Pr perturbs the horizontal component of the floor reaction force moment about a desired ZMP without causing a floor reaction force vertical component and a floor reaction force horizontal component (strictly speaking, a translational floor reaction force vertical component and a translational floor reaction force horizontal component) to be perturbed. This motion mode is referred to as the body rotation mode.

In other words, the motion in which the horizontal component of a floor reaction force moment about a desired ZMP is changed without causing a change in a floor reaction force vertical component and a floor reaction force horizontal component is referred to as the body rotation mode.

A change in the floor reaction force moment component per unit angular acceleration at that time is denoted by $\Delta Mr$ and a change in the floor reaction force horizontal component per unit angular acceleration is denoted by $\Delta Fr$. $\Delta Fr$ is zero. If an angular acceleration is applied such that the body inclines forward in the state shown in FIG. 6(b), then $\Delta Mr$ acts in the direction of an arrow shown in FIG. 6(b).

The motions of the body 3 include a body vertical movement mode in addition to the body translation mode and the body rotation mode. This is a motion for moving the body 3 in the vertical direction.

In the first embodiment, the desired instantaneous value generator 100b generates gaits by using dynamic models shown below. In the present embodiment, the dynamic models shown in, for example, FIG. 7 are used as the dynamic models.

Referring to FIG. 7, the dynamic model is a model composed of a total of three mass points, namely, two mass points (foot mass points) 2m, 2m corresponding to the individual leg bodies 2 of the robot 1 and a mass point corresponding to the body 3 (body mass point) 24m, and a flywheel FH that has inertia but no mass. The body mass point is a point that has a certain positional relationship with the representative point of the body 3 in a local coordinate system arbitrarily set fixedly on the body 3. Similarly, each foot mass point is a point that has a certain positional relationship with the representative point of the foot 22 in a local coordinate system arbitrarily set fixedly on the foot 22 corresponding thereto. This dynamic model is the dynamic model illustrated in PCT international publication WO/03/057427/A1 previously proposed by the present applicant. Hence, detailed explanation will be omitted in the present description. The dynamics of the dynamic model is represented by expressions 2a to 2c when variables are defined as follows. Here, for easy understanding of the present description, only the dynamic equations (expressions indicating the relationships between motions and floor reaction forces) on a sagittal plane (plane including a longitudinal axis (X axis) and a vertical axis (Z axis)) will be described, and the dynamic equations on a lateral plane (plane including a lateral axis (Y axis) and the vertical axis (Z axis)) will be omitted.

Zsup2: Vertical position of supporting leg mass point; Zswg2: Vertical position of free leg mass point; Zb2: Vertical position of body mass point; ZGtotal2: Vertical position of the total center-of-gravity; Xsup2: Horizontal position of supporting leg mass point; Xswg2: Horizontal position of free leg mass point; Xb2: Horizontal position of body mass point; XGtotal2: Horizontal position of total center-of-gravity; θby2: Body posture angle about Y-axis relative to vertical direction (inclination angle); mb2: Mass of body mass point; msup2: Mass of supporting leg mass point; mswg2: Mass of free leg mass point; mtotal: Total mass of robot (=mb2+msup2+mswg2); J: Body inertial moment (Equivalent inertial moment in the body rotation mode); Fx: Floor reaction force horizontal component (specifically, the component in the longitudinal direction (X axis) of a translational floor reaction force); Fz: Floor reaction force vertical component (specifically, the component in the vertical direction (Z axis) of a translational floor reaction force); and My: Floor reaction force moment about a desired ZMP (specifically, the component about a lateral axis (Y axis) of a floor reaction force moment).

$$Fz = mb2*(g+d2Zb2/dt2) + msup2*(g+d2Zsup2/dt2) + mswg2*(g+d2Zswg2/dt2) \quad \text{Expression 2a}$$

$$Fx = mb2*d2Xb/dt2 + msup2*d2Xsup2/dt2 + mswg2*d2Xswg2/dt2 \quad \text{Expression 2b}$$

$$My = -mb2*(Xb2-Xzmp)+(g+d2Zb2/dt2)+mb2*(Zb2-Zzmp)*d2Xb2/dt2-msup2*(Xsup2-Xzmp)*(g+$$

$$d2Zsup2/dt2) + msup2*(Zsup2-Zzmp)*d2Xsup2/dt2 - mswg2*(Xswg2-Xzmp)*(g+d2Zswg2/dt2) + mswg2*(Zswg2-Zzmp)*(d2Xswg2/dt2) + J*d2\theta by/dt2 \quad \text{Expression 2c}$$

The following relational expression holds for the position of the total center-of-gravity of a robot:

$$ZGtotal2=(mb2*Zb2+msup2*Zsup2+mswg2*Zswg2)/mtotal \quad \text{Expression 2d}$$

$$XGtotal2=(mb2*Xb2+msup2*Xsup2+mswg2*Xswg2)/mtotal \quad \text{Expression 2e}$$

The dynamic model is constructed such that the dynamics of the leg bodies 2, 2 (the dynamics of the mass points 2m, 2m) and the dynamics of the body 3 (the dynamics of the mass point 24m and the flywheel FH) do not interfere with each other, the dynamics of the entire robot 1 being expressed by the linear combinations thereof. Further, the relationship between the motions of the body 3 and floor reaction forces is divided into the relationship between the translational motions of the body 3 (the body translation mode) and floor reaction forces and the relationship between the rotational motions of the body 3 (the body rotation mode) and floor reaction forces. To be specific, a floor reaction force generated by a horizontal motion of the body mass point 24m corresponds to a floor reaction force generated by a horizontal translational motion of the body 3 (the body translation mode), and a floor reaction force generated by a rotational motion of the flywheel corresponds to a floor reaction force generated by a rotational motion of a posture angle of the body 3 (the body rotation mode).

The mass of the arm bodies of the robot 1 is included in the body mass point 24m, and the body mass point 24m has the mass that includes the mass of the arm bodies. In the present embodiment, as it will be discussed later, the motions of the arm bodies (arm swinging motion) in a desired gait are performed such that the relative position of the total center-of-gravity of both arm bodies in relation to the body 3 remains unchanged while canceling the moment of an inertial force about the vertical axis that is generated in the robot 1 by a motion other than the arm swinging of the robot 1; therefore, the influences on a floor reaction force moment exerted by the arm swinging motions of the arm bodies (excluding the component about the vertical axis) and the influences exerted on a floor reaction force horizontal component are ignored.

The full model used in the aforesaid full-model corrector 100c is a multi-mass-point model having a mass point in each link of the robot 1, as shown in, for example, FIG. 8. In this case, the each link of the robot 1 may have inertia about the mass point corresponding thereto.

The processing of the gait generating device 100 will now be explained in more detail.

The gait generating device 100 in the present embodiment defines, as the unit, the desired gait (the desired gait in the aforesaid narrow sense) for the period of one step from the moment one leg body 2 of the robot 1 lands to the moment the other leg body 2 lands, and generates desired gaits in order for the period of the one step. Here, the desired gait to be newly generated is referred to as "the current time's gait," the next desired gait is referred to as "the next time's gait," and the further next desired gait is referred to as "the next but one time's gait." Further, the desired gait generated immediately before "the current time's gait" is referred to as "the last time's gait." The "current time's gait" corresponds to "the desired gait in a predetermined period" in the present invention.

When the gait generating device 100 newly generates a current time's gait, the required values (requests) or the like of the estimated landing positions/postures and the estimated landing time of the free leg foot 22 of the robot 1 for two steps ahead are input as required parameters for the gait to the gait generating device 100 (or the gait generating device 100 reads the required parameters from storage). Then, based on these required parameters, the gait generating device 100 generates a corrected desired body position/posture trajectory, a desired foot position/posture trajectory, a desired ZMP trajectory, a desired floor reaction force vertical component trajectory, a desired arm posture trajectory, a corrected desired floor reaction force moment trajectory, and the like. In the present embodiment, required parameters include the parameters that specify the requirement on a reference body posture, the requirement on a relative arm posture in relation to a body posture, the requirement on the pattern of a desired floor reaction force vertical component, and the requirement on a floor friction force (or a friction coefficient) in addition to the required values of the estimated landing position/posture and the estimated landing time of the free leg foot 22 for two steps ahead. The requirement on the reference body posture is, for example, the requirement for maintaining the body posture at a vertical posture, and the requirement on an arm posture is, for example, the requirement for maintaining the arm posture at a predetermined posture relative to the body 3. Further, the requirement on the pattern of a desired floor reaction force vertical component is typically the requirement for setting a desired floor reaction force vertical component to zero in a floating period of the robot 1 and for changing the desired floor reaction force vertical component in the form of a trapezoidal pattern in a one-leg supporting period. Further, the requirement on the friction force of a floor is typically the requirement for setting a certain range of desired floor reaction force horizontal components in relation to the limit of friction forces determined by the product of a desired floor reaction force vertical component and a friction coefficient (required value).

The details of the gait generation processing of the gait generating device 100 will be given below with reference to FIG. 9 to FIG. 22. FIG. 9 is a flowchart (structured flowchart) showing the main routine of the gait generation processing executed by the gait generating device 100. The procedure of the main routine processing itself is the same as that in, for example, the aforesaid PCT international publication WO/03/057427/A1 (hereinafter referred to as "publication document 1") by the present applicant except for a part of its subroutine processing.

First, in S010, various types of initializations are performed, including the initialization of time t to zero. This processing is performed when the gait generating device 100 is started up or the like. Subsequently, the procedure advances to S014 via S012, and the gait generating device 100 waits for a timer interrupt for each control cycle (the calculation processing cycle in the flowchart in FIG. 9). The control cycle is denoted by Δt.

Subsequently, the procedure proceeds to S016 wherein it is determined whether the gait is changing, and if the gait is changing, then the procedure proceeds to S018, or if the gait is not changing, then the procedure proceeds to S030. Here, the aforesaid "the change of a gait" means the timing at which the generation of a current time's gait is begun after the generation of the last time's gait has been completed. For example, a control cycle following the control cycle in which the generation of the last time's gait has been completed is the timing of a gait change.

When the procedure proceeds to S018, time t is initialized to zero, then it proceeds to S020 wherein a next time's gait supporting leg coordinate system, a next but one time's gait supporting leg coordinate system, a current time's gait cycle, and a next time's gait cycle are read. These supporting leg coordinate systems and gait cycles are decided by the aforesaid required parameters. More specifically, in the present embodiment, the required parameters supplied from a joystick 44 or the like to the gait generating device 100 include the required values of the estimated landing positions/postures of the free leg foot 22 (the foot positions/postures in a state wherein, after landing, the foot 22 is rotated without a slippage such that substantially the entire foot sole thereof is in contact with a floor surface) and estimated landing time for two steps ahead. The required value for the first step and the required value for the second step are supplied as the ones corresponding to the current time's gait and the next time's gait, respectively, to the gait generating device 100 before the generation of the current time's gait begins (at the gait change timing of the aforesaid S016). Incidentally, these required values can be changed in the middle of the generation of the current time's gait.

Then, the next time's gait supporting leg coordinate system is decided on the basis of the required values of the estimated landing position/posture of the first-step free leg foot 22 (the free leg foot 22 in the current time's gait) in the aforesaid required parameters. Further, the next but one time's gait supporting leg coordinate system is decided on the basis of the required values of the estimated landing position/posture of the second-step free leg foot 22. Further, the current time's gait cycle is defined as the time from the estimated landing time (required value) of the supporting leg foot 22 of the current time's gait to the estimated landing time (required value) of the free leg foot 22 of the first step (the current time's gait), and the next time's gait cycle is defined as the time from the estimated landing time (required value) of the first-step free leg foot 22 to the estimated landing time (required value) of the second-step free leg foot 22.

The processing of S020 is the same as the processing of S020 of FIG. 13 in the aforesaid publication document 1, so that no further explanation will be given in the present description.

Subsequently, the procedure proceeds to S022 wherein the gait generating device 100 determines the gait parameters of a normal gait (normal gait parameter) as a virtual cyclic gait that follows the current time's gait. As the gait parameters determined here, there are a foot trajectory parameter that defines a desired foot position/posture trajectory of each foot 22 in the normal gait, a reference body posture trajectory parameter that defines the body posture trajectory providing a reference, an arm posture trajectory parameter that defines a desired arm posture trajectory, a ZMP trajectory parameter that defines a desired ZMP trajectory, a floor reaction force vertical component trajectory parameter that defines a desired floor reaction force vertical component trajectory, and a parameter that defines a desired floor reaction force horizontal component permissible range.

The "normal gait" in the present description is used to mean a cyclic gait that does not develop discontinuity in the motion states (the states of foot position/posture, body position/posture, and the like) of the robot 1 at the boundaries of gaits when the gait is repeated. The "normal gait" includes, of course, a cyclic gait for the robot 1 to advance straight and also includes a cyclic gait for the robot 1 to turn. In this case, setting the turning rate to zero means advancing straight; therefore, "turning" includes advancing straight in a broad sense. For this reason, the "normal gait" may be frequently referred to as "normal turning gait" in the embodiments in the present description.

The normal turning gait is explained in detail in, for example, the aforesaid publication document 1 and Japanese Patent Application No. 2000-352011, so that detailed explanation thereof in the present description will be omitted. The outline thereof being given below.

In the present embodiment, the normal turning gait, which is a cyclic gait, is the gait for two steps of the robot 1. In other words, a gait composed of the first turning gait following the current time's gait and the second turning gait following the first turning gait is defined as the gait for one cycle of the normal turning gait, and the gait for one cycle is repeated. If the current time's gait to be generated is, for example, a running gait for the robot 1 to run (gait having a one-leg supporting period and a floating period), then the first turning gait and the second turning gait of the normal turning gait are also running gaits, while if it is a walking gait for the robot 1 to walk (a gait having a one-leg supporting period and a two-leg supporting period), then the first turning gait and the second turning gait of the normal turning gait are also running gait. This means that the basic gait modes of the first turning gait and the second turning gait are the same as those of the current time's gaits.

In the following explanation, unless otherwise specified, running gaits will be taken as examples of the gaits to be generated.

Normal turning gaits are provisionally prepared to determine the state amounts of a motion of the robot 1, such as a divergence component, a body vertical position/velocity, a body posture angle, and the angular velocity thereof, at the terminating end of the current time's gait in the gait generating device 100, and they are not directly output from the gait generating device 100.

Incidentally, "divergence" means that the position of the body 3 of the robot 1 is undesirably shifted to a position that is far apart from the positions of both feet 22 and 22. The value of a divergence component is a numeric value that indicates how far the position of the body 3 of the robot 1 is apart from the positions of both feet 22 and 22 (more specifically, the origin of the global coordinate system (supporting leg coordinate system) set on the ground contact surface of the supporting leg foot 22). For instance, in the embodiments in the present description, a divergence component relative to each dynamic model described above is determined according to the following expression.

Divergence component=Body mass point horizontal position+Body mass point horizontal velocity/$\omega 0$    Expression 3

$\omega 0$ in this expression 3 denotes a predetermined value. For a divergence component in a gait, a body horizontal position and a body horizontal velocity are used in place of the body mass point horizontal position and the body mass point horizontal velocity in expression 3 to determine the divergence component.

In the embodiments in the present description, gaits (current time's gaits) are generated using divergence components as indicators such that desired gaits are continuously generated without causing the aforesaid divergence. More specifically, a current time's gait is generated such that a normal gait (more precisely, a normal gait parameter) following a current time's gait to be generated is determined on the basis of the required parameters or the like related to the aforesaid current time's gait, an initial divergence component of the normal gait is determined, and then the terminating divergence component of the current time's gait is made to agree with the initial divergence component of the normal gait (more generally, the current time's gait is made to follow or approximate the normal gait).

Returning to the main subject, in S022, the gait parameter of the normal gait is determined according to the flowchart of the subroutine processing shown in FIG. 10. More specifically, the parameters that define the foot trajectory parameter, the reference body posture trajectory parameter, the arm trajectory parameter, the ZMP trajectory parameter, the floor reaction force vertical component trajectory parameter, and the parameter defining the desired floor reaction force horizontal component permissible range related to a normal gait described above are individually determined by the processing of S100 to S110. Then, in S112, initial time Ts of the normal gait and a one-step period (the time for one cycle of the normal gait) Tcyc are redefined. The processing is the same as the processing of the flowchart of FIG. 15 in the aforesaid publication document 1, so that detailed explanation thereof will be omitted. The parameters of the normal gait determined in S100 to S110 are the parameters that are determined to preferentially satisfy the requirements related to the gait, which are represented by the required parameters described above, while the trajectories specified by the individual parameters satisfy the periodicity of the normal gait at the same time. For example, as explained with conjunction with the flowchart of FIG. 15 in the aforesaid publication document 1, the foot trajectory parameter of the normal gait is determined such that the estimated landing position/posture of the free leg foot 22 of the first turning gait following the current time's gait (the estimated landing position/posture observed in the aforesaid next time's gait supporting leg coordinate system) agree with the estimated landing position/posture (required values) of the second step described above, and the estimated landing position/posture of the free leg foot 22 of the second turning gait (the estimated landing position/posture observed in the aforesaid next but one time's gait supporting leg coordinate system) agree with the estimated landing position/posture (required values) of the free leg foot 22 of the current time's gait. The ZMP trajectory parameter is determined on the basis of a foot trajectory parameter such that a desired ZMP is positioned substantially near the center of the ground contact surface of the supporting leg foot 22 and continuously changes over the entire period of the normal gait.

The initial time Ts of the normal gait redefined in S112 of FIG. 10 means the time of the start point of one cycle when creating gaits for one cycle of the normal gait, as will be described later (this differs from the time of the terminating end of the current time's gait in the present embodiment), and it is the time immediately before the start of the floating period (the timing when a desired floor reaction force vertical component becomes zero) of the first turning gait. Further, the one-step period Tcyc of the normal gait is the period of the total time of the first turning gait and the second turning gait of the normal gait. The normal gait is a gait whose state at arbitrary time Tx (the state of the position/posture of each portion of the robot 1 and the changing velocities thereof) becomes the same as the state at time Tx+Tcyc because of the periodicity thereof. The normal gait is a cyclic gait having the gait for two steps as one cycle; therefore, in the present description, the one-cycle period (the total time of the first turning gait and the second turning gait) is regarded as one-step period of the normal gait.

Supplementally, the parameters of the normal gait determined by the processing of S100 to S110 are the parameters that are determined to preferentially satisfy the requirements related to the normal gait, so that they correspond to the priority parameters in the aforesaid second invention, and the determined values correspond to priority parameter required values. Thus, the processing of S100 to S110 corresponds to the priority parameter required value determining means in the second invention. Further, the parameters of the normal gait determined by the processing of S100 to S110 are not all the parameters constituting the normal gait parameter. In addition to these, a variety of parameters are included in the gait parameters of a normal gait. In the present embodiment, the parameters constituting a normal gait parameter include, for example, the position and velocity of the body 3 and the posture angle of the body 3 and the angular velocity thereof at the starting end (the start time of the period) or the terminating end (the end time of the period) of the one-cycle period of the normal gait and the peak value of a body inclination restoring moment ZMP-converted value, which will be discussed hereinafter, in addition to the parameters (priority parameters) determined in S100 to S110. Of these parameters, the horizontal position and horizontal velocity of the body 3, the angular velocity of a posture angle of the body 3, and the peak value of the body inclination restoring moment ZMP-converted value are determined in the exploratory manner by the processing of S024, which will be discussed hereinafter, such that the boundary condition of a normal gait (a condition in that the state at arbitrary time of the normal gait coincides or substantially coincides with the state at the time after one cycle) is satisfied. The normal gait parameter is a gait parameter that allows a normal gait to be uniquely generated using the values of the parameters constituting the normal gait parameter and the aforesaid dynamic models.

The parameters constituting normal gait parameters are roughly divided into the aforesaid priority parameters and the remaining non-priority parameters. The non-priority parameters include the parameters determined in the exploratory manner as described above (the search object parameters in the aforesaid second invention). The non-priority parameters of normal gait parameters include parameters fixedly determined without depending upon the requirements related to gaits or the boundary conditions related to gaits. For example, in the present embodiment, the lifting height of the free leg foot 22 of the robot 1 (the relative height in relation to the ground contact surface of the supporting leg foot 22) is a parameter that is fixedly set. It would be wasteful to set a parameter that is fixedly set in the processing of S100 to S110 for every control processing cycle; therefore, such a parameter may be stored in a ROM or set in various types of initialization processing (S010 in FIG. 9) carried out immediately after the power of the control unit 60 is turned on.

There are also lower parameters subordinately determined from a single or a plurality of upper parameters. For example, in the present embodiment, a body posture at the beginning (the aforesaid time Ts) of a normal gait is regarded as the same as a reference body posture and it is subordinately determined from a reference body posture trajectory parameter. In the present description, a parameter subordinately determined from one upper parameter is regarded as a parameter having the same attribute (the attribute indicating whether the parameter is a priority parameter, a non-priority parameter, a search object parameter, or a fixed parameter) as that of the upper parameter. Regarding a lower parameter determined on the basis of a plurality of upper parameters, if the upper parameters include a search object parameter, then the lower parameter is regarded also as a search object parameter, or if the upper parameters do not include any search object parameters but include a priority parameter, then the lower parameter is regarded as a priority parameter. In the present description, only typical parameters that are adequate for understanding the present invention will be exemplified rather than enumerating all constituent parameters of normal gait parameters.

Returning to the explanation of FIG. 9, the procedure then proceeds to S024 to calculate an initial state of the normal gait. The initial state calculated here includes the initial body horizontal position/velocity (the initial body position and the initial body velocity in the horizontal direction), the initial body vertical position/velocity (the initial body position and the initial body velocity in the vertical direction), an initial divergence component, and the initial body posture angle and the angular velocity thereof of the normal gait. The calculation of the initial state is carried out by search processing according to the flowchart of the subroutine processing shown in FIG. 11. The initial state of the normal gait finally determined by the processing of FIG. 11 is the state at the time of the terminating end of the current time's gait (the original initial time 0 of the normal gait); however, in the present embodiment, the state at the initial time Ts set in S112 of FIG. 10 is taken as the initial state of the normal gait until the processing of S2008 of FIG. 11 is completed.

The following will explain the subroutine processing of FIG. 11. First, in S2000, the parameter values of a second turning gait parameter (the gait parameter that specifies the second turning gait) that includes an initial (time Ts) body position Xs and a changing velocity Vxs thereof, an initial (time Ts) body posture angular velocity ωbs, and a body inclination restoring moment ZMP-converted value peak value ZMPrecpeak, which have been finally determined by the processing of S022 and S024 when the last time's gait (the gait that is one step before the current time's gait) was generated, are defined as the provisional values of the parameters of the first turning gait parameter of the normal turning gait associated with the current time's gait.

The aforesaid body inclination restoring moment ZMP-converted value peak value ZMPrecpeak indicates the peak value of the ZMP-converted value ZMPrec (the amount of deviation from a reference desired ZMP (the desired ZMP defined by the ZMP trajectory parameters determined in S022)) of the floor reaction force moment required for bringing the body posture close to a reference body posture in the one-leg supporting period of the robot 1 (more specifically, the period from the moment immediately after the one-leg supporting period begins to the moment immediately before it ends. Hereinafter, it will be referred to as the body inclination angle restoring period in some cases), an example thereof being shown in FIG. 20. As shown in the figure, ZMPrec is shown in the trapezoidal patterns, the peak values (the heights of the trapezoids) being denoted by ZMPrecpeak.

In S2000, the parameter values of the first turning gait parameter (the parameter specifying the first turning gait) finally determined by the processing of S022 and S024 when generating the last time's gait are defined as the provisional values of the parameters of the second turning gait parameter of the normal turning gait associated with the current time's gait. The initial state of the body 3 in the normal turning gait associated with the last time's gait has been included in the turning gait parameter because, in the present embodiment, the initial time Ts for generating the normal turning gait for one cycle differs from the original initial time 0, whereas the initial state of the body 3 at the original initial time 0 is the same as the state of the body 3 at time in the middle of the second turning gait. The above is the processing of S2000.

The processing of S2000 means that the candidates of the first turning gait parameter and the second turning gait parameter of the normal turning gait associated with the current time's gait are temporarily made to agree with the second turning gait parameter and the first turning gait parameter, respectively, of the normal turning gait associated with the last time's gait. If a normal turning gait is generated using the aforesaid dynamic models on the basis of the normal turning gait parameter composed of the first turning gait parameter and the second turning gait parameter associated with the current time's gait that has been set as described above, then the normal turning gait will satisfy the boundary condition of the normal turning gait. Incidentally, the normal turning gait parameter composed of the first turning gait parameter and the second turning gait parameter associated with the current time's gait set as described above corresponds to the base normal gait parameter in the second invention. Thus, the processing of S2000 corresponds to the base normal gait parameter setting means in the second invention.

Subsequently, in S2000-1, the values of the priority parameters of the normal gait parameter excluding the initial (Ts) body horizontal position Xs, the initial (Ts) body horizontal velocity, the initial (Ts) body posture angular velocity ωbs, and the body inclination restoring moment converted value ZMPrecpeak, which are search objects (search object parameters), (more specifically, the foot trajectory parameter, the reference body posture trajectory parameter, the arm posture trajectory parameter, the floor reaction force vertical component trajectory parameter, the parameter defining a floor reaction force horizontal component permissible range, and the ZMP trajectory parameter of the normal gait determined in S022), are updated to the values that have been brought closer, by predetermined amounts, to the values determined in the aforesaid S022 from current candidate values (the values set in S2000).

Subsequently, in S2004-1, the values of search objects Xs, Vxs, ωbs, and ZMPrecpeak that satisfy the boundary condition of a normal gait are determined in the exploratory manner on the basis of the normal gait parameters of the current candidates (the priority parameters of the normal gait parameter provisionally determined in S2000 that have been updated in S2002-1). This processing is carried out as shown by the flowchart shown in FIG. 12. In the following explanation of the processing (including the subroutine processing in the processing) of FIG. 12, "the current value" related to the value of each parameter of the gait parameter will be used to mean "the candidate value or the provisional value currently (at the point of time when the appropriate processing is being carried out) set" of an appropriate parameter. Further, "current xx" (xx denotes a parameter) will be used to mean "xx that is a current (at the point of time when the appropriate processing is being carried out) candidate."

The processing of FIG. 12 will now be explained. First, in S1200, the initial states (the states at the initial time Ts of the normal turning gait) of foot positions/postures, a body posture angle θbs, and the arm postures are determined on the basis of a current normal turning gait parameter. These initial states are the states observed in the supporting leg coordinate system (the aforesaid next time's gait supporting leg coordinate system) of the first turning gait. In this processing, the initial states of the foot positions/postures are determined to be the positions/postures of the feet 22 at time Ts in the foot position/posture trajectory calculated using a finite-duration setting filter on the basis of the foot trajectory parameter of a current normal gait parameter. The finite-duration setting filter is explained in the aforesaid publication document 1 and the like, so that the explanation thereof will be omitted herein. The initial state of the body posture angle θbs is determined to be identical to the reference body posture angle at time Ts decided from the reference body posture trajectory parameter of the current normal gait parameter, and the initial state of the arm postures are determined to be identical to the state at time Ts decided by the arm posture trajectory parameter of the current normal gait parameter.

Subsequently, in S1202, the current values of the initial (time Ts) body horizontal position, the initial body horizontal velocity, the initial body posture angular velocity, and the body inclination restoring moment ZMP-converted value peak value (Xs1, Vx1, ωbs1, and ZMPrecpeak1), which are search objects, are taken as the initial candidates of the search objects. The values of these search objects are the values observed in the supporting leg coordinate system (the aforesaid next time's gait supporting leg coordinate system) of the first turning gait.

Subsequently, the loop processing of S1206 to S1218 is carried out. To schematically explain the processing, a gait up to the terminating end (time Ts+Tcyc) of a normal gait is generated using the normal gait parameter including the initial candidates of the search objects set as described above and the aforesaid dynamic model. Then, it is determined whether the generated normal gait satisfies the boundary condition (the condition in that the states (the body horizontal position, the body horizontal velocity, the body posture angle, and the body posture angular velocity in the present embodiment) at the beginning and the end substantially agree), and if it does not satisfy the boundary condition, then the values of the search objects are changed. This is repeated so as to finally determine the initial states of the normal gait that can satisfy the boundary condition of the normal gait on the dynamic model.

The following will explain the processing of S1202 to S1218 more specifically. In S1202, the body vertical position and the body vertical velocity (Zs, Vzs) at the beginning (time Ts) of a normal gait on the dynamic model are determined. In this case, they are determined such that the resultant force of the inertial force in the vertical direction of the total center-of-gravity of the robot 1 and gravity on the dynamic model balances out a desired floor reaction force vertical component, and the vertical position of the total center-of-gravity satisfies the boundary condition of the normal gait. This processing is carried out in the same manner as that of the processing of S206 shown in FIG. 20 in the aforesaid publication document 1. Incidentally, (Zs, Vzs) depend upon Xs, Vxs, θbs, and ωs. Hence, (Zs, Vzs) have attributes as subordinate search object parameters.

Subsequently, in S1208, a normal gait is generated using a dynamic model up to the time Ts+Tcyc (the terminating end of the normal gait) on the basis of the normal gait parameter that includes the current values of the initial states (θbs, Xs, Vxs, ωbs, Zs, and Vzs) of the body 3 and the current value of ZMPrecpeak. This processing is executed by the subroutine processing shown by the flowchart of FIG. 13, and further, the processing of S304 of this FIG. 13 is executed by the subroutine processing shown by the flowchart of FIG. 14. Further, the processing of S412 of FIG. 14 is executed by the subroutine processing shown by the flowchart of FIG. 15. These processing will be described hereinafter.

Subsequently, in S1210, the body horizontal position, the body horizontal velocity, and the body posture angle and the angular velocity thereof at the terminating end of the normal gait generated in S1208 are converted into the values observed from the supporting leg coordinate system of the next one step of the normal gait (the supporting leg coordinate system of the first turning gait following the second turning gait of the normal gait), and the obtained values are denoted as (Xe1, Vxe1, θbe1, ωbe1).

Then, in S1212, the differences between the values of the current (Xs1, Vxs1, θbs1, ωbs1) and the values of (Xe1, Vxe1, θbe1, ωbe1) are determined as boundary condition errors (errx, errv, errθ, errω) of the normal gait. To satisfy the boundary condition of the normal gait, the boundary condition error must be substantially zero. The boundary condition error indicates the degree of deviation of the normal gait created in S1208 from the boundary condition.

Subsequently, in S1214, it is determined whether all of errx, errv, errθ, and errω fall within a sufficiently small (in the vicinity of zero) predetermined permissible range, and if the determination result is YES, then the loop processing of S1206 to S1218 is terminated. In this case, the normal gait parameter at the completion of the loop processing is obtained as the normal gait parameter that allows the boundary condition to be satisfied on the dynamic model.

Meanwhile, if the determination result of S1214 is NO, then the candidates of a plurality of (four in the present embodiment) search objects obtained by changing the values of the individual parameters by predetermined extremely small amounts ΔXs, ΔVx, Δωbs, and ΔZMPrecpeak are determined in the vicinity of the values of the current search objects (Xs, Vx, ωbs, ZMPrecpeak), and the same processing as that of S1206 to S1212 is carried out to determine the boundary condition errors corresponding to the candidates of the individual search objects on the basis of the normal gait parameter that includes the candidates of the individual search objects (the normal gait parameter having the search objects of the current normal gait parameter corrected to the newly determined candidates).

Subsequently, in S1218, the new candidates of the search objects (Xs, Vx, ωbs, ZMPrecpeak) are determined by a search technique, such as the steepest descent method or the simplex method, on the basis of the current (Xs, Vx, ωbs, ZMPrecpeak) and the boundary condition errors corresponding to the individual candidates of the search objects in the vicinity thereof. Then, the processing from S1206 is repeated again.

As described above, with the (Xs, Vx, ωbs, ZMPrecpeak) as the search objects, a normal gait parameter that satisfies the boundary condition of the normal gait is determined in the exploratory manner. Incidentally, in the processing of FIG. 12, the priority parameters (the foot trajectory parameter, the reference body posture trajectory parameter, and the like) out of the normal gait parameter are maintained at the values at the start of the processing shown in FIG. 12.

Supplementally, the basic concept (technique) of the processing of FIG. 12 is the same as that of the processing of FIG. 20 in the aforesaid publication document 1. However, in the embodiments in the present description, the aforesaid search objects include a body posture angular velocity and the peak value of a body inclination restoring moment ZMP-converted value, which is different from the processing of FIG. 20 of the aforesaid publication document 1. Further, a part of the detailed processing (subroutine processing) of the processing of S1208, which will be discussed later, is also different from the processing in the aforesaid publication document 1.

The subroutine processing of the aforesaid S1208 will be explained below.

The processing of FIG. 13, which is the subroutine processing of S1208, is, as shown in the figure, the processing in which the current values (the candidate values or the provisionally determined values) of (Xs, Vxs, θbs, ωbs, Zs, and Vzs) are defined as the initial state of a motion of the body 3 in a normal gait (S300) and the instantaneous values of the normal gait from the initial (time Ts) state to time Ts+Tcyc (to a terminating end state) are actually created in time series (S302 to S306). Incidentally, "k" in FIG. 13 denotes the time of the time series of the instantaneous values of the normal gait to be created.

The processing of FIG. 14, which is the subroutine processing of S304 in FIG. 13 (the subroutine processing for determining the instantaneous values of a normal gait), determines the instantaneous values of a desired floor reaction force vertical component, a desired ZMP, desired positions/postures of both feet, a reference body posture, a desired arm posture, a desired body vertical position, and a floor reaction force horizontal component permissible range by the processing of S400 to S410 on the basis of a current normal gait parameter (to be specific, priority parameters).

Further, the processing of S412 determines the instantaneous values of a body horizontal acceleration and a body posture angular acceleration by using a dynamic model such that the conditions described in the figure are satisfied. Then, the processing of S414 subjects the body horizontal acceleration and the body posture angular acceleration to the second-order integration so as to determine the instantaneous values of the body horizontal position and the body posture angle.

Supplementally, of the processing shown in FIG. 14, the processing other than S412 is the same as the processing of S400 to S410 and S414 of FIG. 22 in the aforesaid publication document 1. Hence, a detailed explanation of the processing shown in FIG. 13 except for the processing of S412 will be omitted.

In the processing of FIG. 15, which is the subroutine processing of S412 in FIG. 14, first, times Tm, Ts2, and Tm2 that define body inclination angle restoring periods of a normal gait are determined. These times individually define the period during which the aforesaid body inclination restoring moment ZMP-converted value ZMPrec is generated, as shown in FIG. 20. More specifically, the time immediately after a first one-leg supporting period begins following the initial time Ts of a normal gait is denoted by Tm, the time immediately before the one-leg supporting period ends is denoted by Ts2, and the time immediately after the next one-leg supporting period begins is denoted by Tm2 in determining the above times. And, a period [Tm,Ts2] and a period [Tm2,Te] are individually defined as the periods for generating ZMPrec (hereinafter referred to as the body inclination angle restoring period). This is the same as the processing of S500 in FIG. 23 in the aforesaid publication document 1.

Subsequently, in S502, it is determined whether current time k at which an instantaneous value of a normal gait is to be created (time within a normal gait that is being created) is within a body inclination angle restoring period. And, if the current time k is not time within the aforesaid body inclination angle restoring period, i.e., if the current time k is within the period from the moment immediately before the end of a one-leg supporting period to the moment immediately after the next one-leg supporting period begins (the period during which a desired floor reaction force vertical component is zero or close to zero), then the processing of S504 to S516 determines a body horizontal acceleration α of the body translational mode and a body angular acceleration β (the angular acceleration of a body posture angle) of the body rotation mode such that a desired ZMP is satisfied on the dynamic model and the floor reaction force horizontal component that balances out the inertial force attributable to a horizontal acceleration of the total center-of-gravity of the robot 1 on the dynamic model falls within an instantaneous value of a floor reaction force horizontal component permissible range at time k. The processing of S504 to S516 is the same as the processing of S504 to S516 in FIG. 19 in the aforesaid publication document 1.

Further, if the current time k (the time in a normal gait that is being created) is time within the aforesaid body inclination angle restoring period, then the body angular acceleration β is determined by the processing of S518 to S526 such that a floor reaction force moment based on the instantaneous value of a body inclination restoring moment ZMP-converted value pattern (This depends on a currently set body inclination restoring moment ZMP-converted value peak value (a candidate value determined immediately before the processing of S1208 of FIG. 12) and the current time k. Refer to FIG. 20) is generated about a desired ZMP on the dynamic model. Further, the body horizontal acceleration is determined as the difference between a body horizontal acceleration for the floor reaction force moment about a desired ZMP generated by the body translational mode to become zero and a body horizontal acceleration that generates a floor reaction force moment equivalent to the floor reaction force moment about a desired ZMP attributable to the body angular acceleration β on the dynamic model. Thus, the body angular acceleration β and the body horizontal acceleration α are determined such that a desired ZMP is satisfied while restoring a body posture toward the reference body posture in the body inclination angle restoring period.

Supplementally, the processing of S518 to S526 of FIG. 15 in the present embodiment is the same as the processing of S520 to S528 of FIG. 23 in the aforesaid publication document 1.

The processing of S2002-1 and 2004-1 of FIG. 11 explained above is briefly said to be the processing in which the value of a priority parameter (a foot trajectory parameter or the like) of a normal gait parameter is updated by bringing it closer, by a predetermined amount, to a value determined by the processing of S022 (specifically, the processing of S100 to S110 of FIG. 10) from a current value (a current candidate value), and a new normal gait parameter that includes the updated priority parameter and that is capable of satisfying a boundary condition of a normal gait on a dynamic model is searched for. And, in this processing, (Xs, Vx, ωbs, ZMPrecpeak) are set as the search objects. Incidentally, the current value (the candidate value before the update) of the priority parameter of the normal gait parameter in S2002-1 is the value of the priority parameter out of the provisional value of the normal gait parameter determined in S2000. Further, in the processing of S2004-1, the provisional values determined in S2000 are used as the initial candidate values of the search objects.

Returning to the explanation of FIG. 11, after the aforesaid processing of S2002-1 and S2004-1, the same processing (S2002-2 and S2004-2 in FIG. 11) as the processing of S2002-1 and S2004-1 is repeated. Then, lastly, in S2004-n (n denotes the total number of repetitions), the priority parameter of the normal gait parameter is made to agree with the value determined by the processing of S022. Further, in S2004-n, as with S2004-1, based on a current candidate normal gait parameter, the values of the search objects Xs, Vx, ωbs, and ZMPrecpeak that satisfy the boundary condition of the normal gait are determined in the exploratory manner on the dynamic model, thus determining a new normal gait parameter.

In the repeated processing, the value of a priority parameter before the priority parameter is updated in S2002-k (k=2, . . . , n) is the value of the priority parameter after the update in S2002-(k−1)(in S2002-1, the value of the priority parameter before an update is the provisional value determined in S2000, as described above). The processing of S2004-k (k=2, . . . , n) is the same as the processing of S2004-1. In S2004-*k*, however, the values that have been set at the start of the processing of S2004-*k*, i.e., the values of the search objects that have finally been searched for by the processing of S2004-(k−1), are used as the initial value candidates (the initial value candidates set in S1202 of FIG. 12) of the search objects Xs, Vx, ωbs, and ZMPrecpeak (in S2004-1, the initial value candidates of the search objects are the provisional values determined in S2000, as described above).

As described above, using the values (provisional values) of the priority parameters of the normal gait parameter determined in S2000 as initial values, the value of the priority parameter is updated in steps such that the value of the priority parameter approaches in steps the value determined by the processing of S022 (this is the value of the priority parameter for satisfying a requirement related to a current time's gait (the required value of the priority parameter)) until it finally made to agree with the value determined by the processing of S022 (S2002-1, S2002-2, . . . , and S2002-n). Accordingly, the processing of these S2002-1, S2002-2, . . . , and S2002-n corresponds to the priority parameter asymptotic means in the second invention. And, each time the priority parameter is updated, the values of the search objects of the normal gait parameter including the updated priority parameter are searched for, using the values determined immediately before the update as the initial value candidates, such that the boundary condition of the normal gait is satisfied, and a normal gait parameter that includes the search objects as the search result is newly determined (S2004-1, 2004-2, . . . , and S2004-n). Accordingly, the processing of these S2004-1, 2004-2, . . . , and S2004-n corresponds to the new normal gait parameter determining means in the second invention, and a normal gait parameter including search objects finally determined in each processing corresponds to the new normal gait parameter in the second invention. And, the new normal gait parameter finally determined in S2004-n will be the gait parameter of the normal gait to follow the current time's gait to be generated.

Supplementally, the total number n of repetitions of the aforesaid repetitive processing is determined on the basis of the difference between the value of the priority parameter of the normal gait parameter determined in S2000 and the value of the priority parameter determined in S022 (a priority parameter required value). Of the normal gait parameter, the parameters (fixed parameters) other than priority parameters and search object parameters are maintained at the values of the appropriate parameters of the normal gait parameter determined in S2000.

After the repetitive processing of S2002-1 to S2004-n is executed as described above, an initial body horizontal position X0, an initial body horizontal velocity Vx0, an initial body posture angle θb0 and the angular velocity ωb0 thereof, an initial body vertical position Z0, and an initial body vertical velocity Vz0, which constitute the motion state of the body 3 of the normal gait at the original initial time 0, are determined on the basis of a current candidate normal turning gait (the normal gait lastly created in the processing of S2004-n) in S2006. Further, in S2008, a normal turning initial divergence component q[0], which is a divergence component at the original initial time 0, of the normal turning gait is determined according to the definitional equation of the aforesaid initial divergence component q. The values determined in S2006 and S2008 are the values observed in the supporting leg coordinate system of the first turning gait of the normal turning gait following the current time's gait. Then, in S2010, q", which is the value of the normal turning initial divergence component q[0] observed from the supporting leg coordinate system of the current time's gait, and (Z0",Vz0"), which are the values of the initial body vertical position/velocity observed from the supporting leg coordinate system of the current time's gait, are determined.

The above is the detailed explanation of the processing of FIG. 11.

The processing of FIG. 11 explained above updates the values of the priority parameters of a provisional normal gait parameter (the normal gait parameter determined in the past such that a boundary condition of a normal gait is satisfied) determined in S2000 so as to gradually bring the values close to the values of the priority parameters determined in S022 (the priority parameters of a normal gait to follow a current time's gait to be generated), and each time the values are updated, a normal gait parameter that satisfies the boundary condition of the normal gait is newly determined. This makes it possible to efficiently and promptly create a normal gait that allows a boundary condition of a normal gait to be satisfied without causing body position/posture to develop divergences, thus permitting an initial state of a normal gait for a current time's gait to be properly determined.

Returning to the explanation of FIG. 9, after the processing of S024 is carried out as explained above, the gait parameter of the current time's gait is determined (some are provisionally determined) in S026. This processing is carried out according to the flowchart of FIG. 16. The gait parameter determined here includes the parameters that specify the foot position/posture trajectories (the position/posture trajectories of the feet 22), a reference body posture trajectory, an arm posture trajectory, a floor reaction force vertical component trajectory, a floor reaction force horizontal component permissible range, and a ZMP trajectory, respectively, in the current time's gait, these parameters being determined by the processing of S600 to S610. Then, in S612, the body inclination angle restoring period [Ta,Tb] in the current time's gait is set. These processing is the same as the processing of the flowchart of FIG. 33 in the aforesaid publication document 1, so that no detailed explanation will be given herein, but the parameters that define the trajectories are determined such that the aforesaid trajectories connect to a normal gait from the state at the terminating end of the last time's gait (=the initial state of the current time's gait) while satisfying the aforesaid requirements related to the current time's gait. For example, the foot trajectory parameter related to the free leg foot 22 of the current time's gait is determined such that the estimated landing position/posture and time of the free leg foot 22 of the current time's gait satisfy those required values and, at the terminating end of the current time's gait, the position/posture of the free leg foot 22 agree at the beginning of the normal gait (the time of the terminating end of the current time's gait).

Supplementally, the ZMP trajectory parameter determined in S610 is a parameter that defines the ZMP trajectory (a provisional desired ZMP trajectory) providing the reference for the current time's gait, an example of the provisional ZMP trajectory defined by the parameter (an example of the trajectory in the X-axis direction) being shown at the top in FIG. 22. The ZMP trajectory parameter is determined such that a desired ZMP is positioned near the substantially center of the ground contact surface of the supporting leg foot 22 in the one-leg supporting period of the current time's gait and the desired ZMP continuously changes up to the initial ZMP of the normal gait at the terminating end of the current time's gait in the floating period following the one-leg supporting period. The body inclination angle restoring period set in S612 of FIG. 16 is the period from time Ta to time Tb in FIG. 22, which is the period from the moment immediately after the start of the one-leg supporting period of the current time's gait to the moment immediately before the end thereof.

Supplementally, the parameters of the current time's gait determined by the processing from S600 to S610 are the parameters determined to preferentially satisfy the requirements related to the current time's gait, so that the parameters of the current time's gait determined by the processing of the aforesaid S600 to S610 correspond to the priority parameters in the aforesaid first invention, and the determined values correspond to priority parameter required values. Accordingly, the processing of S600 to S610 corresponds to the priority parameter required value determining means in the first invention. Further, the parameters of the current time's gait determined by the processing of S600 to S610 are not all parameters constituting the current time's gait parameter. As with the case of a normal gait parameter, the gait parameter of the current time's gait includes a variety of parameters in addition to the above parameters. In the present embodiment, the parameters constituting the current time's gait parameter include, for example, a ZMP correction parameter defining the ZMP correction amount for correcting a ZMP trajectory parameter and the peak value of a body inclination restoring moment ZMP-converted value (two types of peak values in this case) in addition to the parameters (priority parameters) determined in S600 to S610. These parameters are the parameters determined in an exploratory manner in the processing of S028 explained below such that the boundary condition of a current time's gait (a condition for approaching a normal gait) is satisfied.

As with the case of a normal gait parameter, the parameters constituting a current time's gait parameter are roughly divided into the aforesaid priority parameters and the remaining non-priority parameters. The non-priority parameters include the parameters determined in the exploratory manner as described above (the search object parameters in the aforesaid first invention). The non-priority parameters include fixed parameters not depending upon the requirements related to gaits or the boundary conditions related to gaits (e.g., the lifting height of the free leg foot 22 of the robot 1). Furthermore, there are lower parameters that are subordinately determined from a single or a plurality of upper parameters. In this case, the attributes of lower parameters are the same as in the case of normal gait parameters.

The procedure proceeds to S028 in FIG. 9 to correct the gait parameter (the ZMP trajectory parameter) of the current time's gait (to determine the final current time's gait parameter). In this processing, the gait parameter of the current time's gait is corrected such that the divergence component at the terminating end of the current time's gait agrees with the initial divergence component q" of the normal turning gait determined in S024 (more specifically, such that the body position/posture trajectory connects or approximates to the normal gait), thus determining the final current time's gait parameter (more specifically, the ZMP correction parameter and the two types of peak values of the body inclination restoring moment ZMP-converted values are determined). In the present embodiment, as described above, the boundary condition at the terminating end of the current time's gait is such that the divergence component at the terminating end of the current time's gait agrees (or substantially agrees) with the initial divergence component q" of the normal turning gait.

This processing is carried out by step-by-step exploratory processing that uses the subroutine processing indicated by the flowchart shown in FIG. 17.

The following will explain the subroutine processing of FIG. 17. First, in S2100, the parameter values of the current time's gait parameter that include the ZMP corrected parameter "a" finally determined by the processing of S026 and S028 when the last time's gait was generated and the first peak value ZMPrecpeaka and the second peak value ZMPrecpeakb, which are body inclination restoring moment converted values, are defined as the provisional values of the parameters of the current time's gait parameter to be generated. However, the gait parameter of the last time's gait is laterally reversed when taking the parameter values as the provisional values of the parameters of the current time's gait. For example, the provisional values of the foot trajectory parameter of a supporting leg, the foot trajectory parameter of a free leg, and a ZMP trajectory parameter of the current time's gait are set to be the ones obtained by laterally reversing these parameters of the last time's gait.

Here, the first peak value ZMPrecpeaka and the second peak value ZMPrecpeakb of a body inclination restoring moment ZMP-converted value obtained (searched for) in the processing of the flowchart of FIG. 17 are search object parameters indicating the two peak values of the pattern of the ZMP-converted value of a floor reaction force moment required to bring a body posture close to a reference body posture during the body inclination angle restoring period [Ta,Tb] of the current time's gait, an example thereof being shown in FIG. 21. The number of peak values of the body inclination restoring moment ZMP-converted value has been one in the case of a normal gait; in the present embodiment, however, the first peak value ZMPrecpeaka and the second peak value ZMPrecpeakb are used as the two adjustable parameters of a body inclination restoring moment ZMP-converted value so as to make the body posture angle and the angular velocity thereof at the terminating end of the current time's gait coincide with the initial body posture angle and the angular velocity thereof, respectively, of the normal gait. In the present embodiment, as shown in FIG. 21, the body inclination restoring moment ZMP-converted value in the current time's gait has a pattern combining a trapezoidal pattern in the first half and another trapezoidal pattern in the latter half of the one-leg supporting period. The peak value of the trapezoidal pattern in the first half is the first peak value ZMPrecpeaka, and the peak value of the trapezoidal pattern in the latter half is the second peak value ZMPrecpeakb.

Further, the ZMP correction parameter "a" determined in the processing of the flowchart shown in FIG. 17 is the parameter for specifying the correction amount of a desired ZMP to connect a current time's gait to a normal gait (to make the divergence component at the terminating end of a current time's gait substantially agree with the initial divergence component q" of a normal gait), an example thereof being shown at the middle in FIG. 22. As illustrated, the ZMP correction amount has a trapezoidal pattern generated from the moment immediately after the start to the moment immediately before the end of the one-leg supporting period, and the peak value "a" is used as the ZMP correction parameter that defines the pattern of the ZMP correction amount.

The processing of S2100 explained above means that the gait parameter obtained by laterally reversing the last time's gait (this has already been determined so as to satisfy the boundary condition of a gait) is set as the gait parameter of the current time's gait for the time being. If a current time's gait is generated using the aforesaid dynamic model on the basis of the current time's gait parameter thus set, the current time's gait will agree with the one obtained by laterally reversing the last time's gait already determined to satisfy the boundary condition of the gait. Incidentally, the current time's gait parameter set as described above corresponds to the base gait parameter in the first invention. Accordingly, the processing of S2100 corresponds to the base gait parameter setting means in the first invention.

Supplementally, if the current time's gait is composed of a gait for two steps of the robot 1, then the gait parameter of the last time's gait (the gait that is two steps before) may be directly set as the provisional value of the gait parameter of the current time's gait in S2100 without performing the lateral reversal. Alternatively, the provisional value of the gait parameter of the current time's gait may be set to the gait parameter of the last but one gait.

Subsequently, in S2102-1, the values of the priority parameters of the current time's gait parameter excluding the ZMP corrected parameter "a" and the first peak value ZMPrecpeaka and the second peak value ZMPrecpeakb of the body posture inclination restoring moment ZMP-converted value, which are search objects (search object parameters), (more specifically, the foot trajectory parameter, the reference body posture trajectory parameter, the arm posture trajectory parameter, the floor reaction force vertical component trajectory parameter, the parameter defining a floor reaction force horizontal component permissible range, and the ZMP trajectory parameter of the current time's gait determined in S026) are updated to the values that have been brought closer, by predetermined amounts, to the values determined in the aforesaid S026 from current candidate values (the values set in S2100).

Subsequently, in S2104-1, the values of search objects "a", ZMPrecpeaka, and ZMPrecpeakb that satisfy the aforesaid boundary condition (a condition in that the divergence component at the terminating end of a current time's gait agrees or substantially agrees with the divergence component at the beginning of a normal gait) of the current time's gait are determined in the exploratory manner on the basis of the current time's gait parameter of the current candidate (the priority parameters of the normal gait parameter provisionally determined in S2100 that have been updated in S2102-1). This processing is carried out as shown by the flowchart shown in FIG. 18. Incidentally, as in the case of the explanation of the processing of the aforesaid FIG. 12, the following explanation of the processing (including the subroutine processing in the processing) of FIG. 18, "the current value" related to the value of each parameter of the gait parameter will be used to mean "the candidate value or the provisional value currently (at the point of time when the appropriate processing is being carried out) set" of an appropriate parameter. Further, "current xx" (xx denoting a parameter) will be used to mean "xx that is a current (at the point of time when the appropriate processing is being carried out) candidate."

The processing of FIG. 18 will now be explained. First, in S1700, the current values of the ZMP correction parameter and the first peak value and the second peak value of the body inclination restoring moment ZMP-converted value ("a", ZMPrecpeaka, and ZMPrecpeakb), which are search objects, are set as the initial value candidates of these search objects.

Subsequently, the loop processing of S1704 to S1716 is carried out. The processing will be schematically explained. First, in S1704, a current time's gait (a provisional current time's gait) is calculated using the current values (current candidate values) of the "a", ZMPrecpeaka, and ZMPrecpeakb, which are the search objects, and the aforesaid dynamic model. More specifically, a provisional current time's gait is calculated using the current time's gait parameter that includes the current values of the search objects, namely, "a", ZMPrecpeaka, and ZMPrecpeakb, and the current values of priority parameters, and the dynamic model. More specific processing of S1704 will be discussed hereinafter.

Then, in S1706 to S1716, the difference between the divergence component at the terminating end of the provisional current time's gait (the estimated landing time of a free leg foot of the current time's gait) calculated in S1704 and the initial divergence component q" of the normal gait (lastly calculated in the aforesaid S024), the difference between the body posture angle at the terminating end of the provisional current time's gait and the initial body posture angle of the normal gait (lastly calculated in the aforesaid S024), and the difference between the angular velocity of the body posture angle at the terminating end of the provisional current time's gait and the initial body posture angular velocity of the normal gait (lastly calculated in the aforesaid S024) are determined. Then, it is determined whether all the values of these differences satisfy a condition in that they fall within permissible ranges (whether they approximate zero), and if they do not satisfy the condition, then the values of the search objects are changed. This is repeated to finally determine anew a current time's gait parameter that includes "a", ZMPrecpeaka, and ZMPrecpeakb as the corrected values of the parameters of the search objects that allows the provisional current time's gait to connect to the normal gait on the dynamic model.

The processing of S1706 to S1706 will be explained more specifically. In S1706, the divergence component q0[k] at the terminating end of the current time's gait is calculated from the body position/velocity (Xe, Ve) at the terminating end of the provisional current time's gait according to the definitional equation of divergence components described above.

Subsequently, in S1708, the difference between the divergence component q0[k] at the terminating end and the initial divergence component q" of the normal turning gait is determined as a terminal divergence component error errq.

Further, in S1710, the difference between the initial body posture angle of the normal gait and the terminal body posture angle of the current time's gait (provisional current time's gait) is determined as the terminal body posture angle error θberr, and the difference between the initial body posture angular velocity of the normal gait and the terminal body posture angular velocity of the current time's gait (provisional current time's gait) is determined as the terminal body posture angular velocity error ωberr.

The errors errq, θberr, and ωberr determined as described above indicate the degree of deviation of the provisional current time's gait created in S1704 from a boundary condition.

Subsequently, in S1712, it is determined whether all errq, θberr, and ωberr determined as described above fall within a predetermined permissible range in the vicinity of zero, and if the determination result is YES, then the loop processing of S1704 to S1716 is terminated. In this case, the current time's gait parameter that includes the search objects at the completion of the loop processing is obtained as the current time's gait parameter that can satisfy the boundary condition on the dynamic model.

Meanwhile, if the determination result of S1712 is NO, then the candidates of a plurality of (three in the present embodiment) search objects obtained by changing the values of the individual parameters by predetermined extremely small amounts Δa, ΔZMPrecpeaka, and ΔZMPrecpeakb are determined in the vicinity of the values of the current search objects ("a", ΔMPrecpeaka, and ZMPrecpeakb), and the same processing as that of S1704 to S1710 is carried out on the basis of the current time's gait parameter that includes the candidates of the individual search objects (the current time's gait parameter in which the search objects of the present current time's gait parameter have been corrected to newly determined candidates), thereby determining a set of errors (errq, θberr, and ωberr) corresponding to the candidate of each search object.

Subsequently, in S 1716, the new candidates of the search objects ("a", ZMPrecpeaka, and ZMPrecpeakb) are determined by an exploratory technique, such as the steepest descent method or the simplex method, on the basis of the current ("a", ZMPrecpeaka, and ZMPrecpeakb) and the sets of errors (errq, θberr, and ωberr) corresponding to the individual candidates of the search objects in the vicinity thereof. Then, the processing from S1704 is repeated again.

As described above, with the ("a", ZMPrecpeaka, and ZMPrecpeakb) being the search objects, the new current time's gait parameter that satisfies the boundary condition at the terminating end of the current time's gait is determined in the exploratory manner. In the processing of FIG. 18, the priority parameters (e.g., a foot trajectory parameter and a reference body posture trajectory parameter) in the current time's gait parameter are maintained at the values observed at the start of the processing of FIG. 18.

The processing of the aforesaid S1704 in the processing of FIG. 18 will be explained below. This processing is carried out by the subroutine processing shown by the flowchart of FIG. 19. As illustrated, the subroutine processing of FIG. 19 is the processing (S802 to S806) in which the state at the terminating end of the last time's gait (specifically, the terminal state of the last time's gait observed in the supporting leg coordinate system of the current time's gait) is taken as the initial state of the current time's gait (the provisional current time's gait)(S800) and the instantaneous values of the current time's gait are created in time series up to the terminating end time Tcurr of the current time's gait (the estimated landing time of the free leg foot 22 of the current time's gait) from the initial state. Incidentally, "k" in FIG. 19 denotes the time of the time series of the instantaneous values of the current time's gait to be created. And, the subroutine processing of S804 in FIG. 19 is carried out in the same manner as the processing of FIG. 14 previously explained in relation to the processing for creating a normal gait.

In the processing of FIG. 14 in this case, the processing of S400 and S404 to S410 determines the instantaneous values of a desired floor reaction force vertical component, desired positions/postures of both feet, a reference body posture, a desired arm posture, a desired body vertical position, and a floor reaction force horizontal component permissible range on the basis of the priority parameters of the present current time's gait parameter. Further, the processing of S402 in FIG. 14 carried out in S804 of FIG. 19 determines the instantaneous values of a ZMP trajectory (refer to the bottom diagram of FIG. 22) obtained by correcting the desired ZMP trajectory by adding the ZMP correction amount specified by the present value (candidate value) "a" of the ZMP correction parameter "a" (refer to the middle diagram in FIG. 22) to the desired ZMP trajectory specified by the ZMP trajectory parameter of the present current time's gait parameter (refer to the top diagram of FIG. 22).

Further, the processing of S412 determines, by using a dynamic model, the instantaneous values of a body horizontal acceleration and a body posture angular acceleration such that the conditions described in the figure are satisfied. Then, the processing of S414 subjects the body horizontal acceleration and the body posture angular acceleration to the second-order integration so as to determine the instantaneous values of the body horizontal position and the body posture angle.

Further, the processing in FIG. 15, which is the subroutine processing of S412 in creating a provisional current time's gait is also carried out in the same manner as that for normal gaits. More specifically, if the current time k at which a instantaneous value of a provisional current time's gait is to be created (time within the provisional current time's gait that is being created) is not time within the aforesaid body inclination angle restoring period, then the processing of S504 to S516 determines a body horizontal acceleration α of the body translational mode and a body angular acceleration β (the angular acceleration of a body posture angle) of the body rotation mode such that a desired ZMP (the desired ZMP corrected by a ZMP correction amount) is satisfied and the floor reaction force horizontal component that balances out the inertial force attributable to a horizontal acceleration of the total center-of-gravity falls within an instantaneous value of a floor reaction force horizontal component permissible range at time k on the dynamic model.

Further, if the current time k (the time in a provisional current time's gait that is being created) is time within the aforesaid body inclination angle restoring period, then the body angular acceleration β is determined by the processing of S518 to S526 such that a floor reaction force moment corresponding to the instantaneous value of a body inclination restoring moment ZMP-converted value pattern (this depends on the current values (candidate values) of the first peak value ZMPrecpeaka and the second peak value ZMPrecpeakb of the body inclination restoring moment ZMP-converted value and the current time k. Refer to FIG. 21) is generated on the dynamic model. Further, the body horizontal acceleration is determined as the difference between a body horizontal acceleration for the floor reaction force moment about a desired ZMP (the desired ZMP corrected by a ZMP correction amount) generated by the body translational mode to become zero and a body horizontal acceleration that generates a floor reaction force moment equivalent to the floor reaction force moment due to the body angular acceleration β on the dynamic model. Thus, the body angular acceleration β and the body horizontal acceleration α are determined such that a desired ZMP is satisfied while restoring a body posture toward the reference body posture.

The body inclination angle restoring period when a provisional current time's gait is generated is the period from time Ta to Tb determined in S612 of FIG. 16 described above; therefore, the processing of S500 of FIG. 15 is omitted.

The processing of S2102-1 and 2104-1 of FIG. 17 explained above is briefly said to be the processing in which the value of a priority parameter (a foot trajectory parameter or the like) of a normal gait parameter is updated by bringing it closer, by a predetermined amount, to a value determined by the processing of S026 (specifically, the processing of S600 to S610 of FIG. 16) from a current value (a current candidate value), and a new current gait parameter that includes the updated priority parameter and that is capable of satisfying a boundary condition of the current time's gait on a dynamic model is searched for. And, in this processing, ("a", ZMPrecpeaka, ZMPrecpeakb) are set as the search objects. Incidentally, the current value (the candidate value before the update) of the priority parameter of the current gait parameter in S2102-1 is the value of the priority parameter out of the provisional value of the current time's gait parameter determined in S2100. Further, in the processing of S2104-1, the provisional values determined in S2100 are used as the initial candidate values of the search objects.

Returning to the explanation of FIG. 17, after the aforesaid processing of S2102-1 and S2104-1, the same processing (S2102-2 and S2104-2 in FIG. 17) as the processing of S2102-1 and S2104-1 is repeated. Then, lastly, in S2104-$n$ ($n$ denotes the total number of repetitions), the priority parameter of the current time's gait parameter is made to agree with the value determined by the processing of S026. Further, in S2104-n, as with S2104-1, based on a current candidate current Time's gait parameter, the values of the search objects "a", ZMPrecpeaka, and ZMPrecpeakb that satisfy the boundary condition of the current time's gait are determined in the exploratory manner on the dynamic model, thus determining a new current time's gait parameter.

In the repeated processing, the value of a priority parameter before the priority parameter is updated in S2102-$k$ ($k$–2,..., n) is the value of the priority parameter after the update in S2102-($k$–1)(in S2102-1, the value of the priority parameter before an update is the provisional value determined in S2100, as described above). The processing of S2104-$k$($k$–2,..., n) is the same as the processing of S2104-1. In S2104-$k$, however, the values that have been set at the start of the processing of S2104-$k$, i.e., the values of the search objects that have finally been searched for by the processing of S2104-($k$–1), are used as the initial value candidates (the initial value candidates set in S1700 of FIG. 18) of the search objects "a", ZMPrecpeaka (in S2104-1, the initial value candidates of the search objects are the provisional values determined in S2100, as described above).

As described above, using the values (provisional values) of the priority parameters of the current time's gait parameter determined in S2100 as initial values, the values of the priority parameters are updated in steps such that the values of the priority parameters approach in steps the values determined by the processing of S026 (these are the values of the priority parameters for satisfying a requirement related to a current time's gait (the required values of the priority parameters)) until they are finally matched with the values determined by the processing of S026 (S2102-1, S2102-2, ..., and S2102-$n$). Accordingly, the processing of these S2102-1, S2102-2, ..., and S2102-$n$ corresponds to the priority parameter asymptotic means in the first invention. And, each time the priority parameters are updated, the values of the search objects of the current time's gait parameter including the updated priority parameters are searched for, using the values determined immediately before the update as the initial value candidates, such that the boundary condition of the current time's gait is satisfied, and a current time's gait parameter that includes the search objects as the search results is newly determined (S2104-1, 2104-2, ..., and S2104-n). Accordingly, the processing of these S2104-1, 2104-2, ..., and S2104-n corresponds to the new gait parameter determining means in the first invention, and a current time's gait parameter including search objects finally determined in each processing corresponds to a new gait parameter in the first invention. And, the new current time's gait parameter finally determined in S2104-n will be the gait parameter of the current time's gait to be generated.

Supplementally, the total number n of repetitions of the aforesaid repetitive processing is determined on the basis of the difference between the value of a priority parameter of the current time's gait parameter determined in S2100 and the value of the priority parameter determined in S026 (a priority parameter required value). Of the current time's gait parameter, the parameters (fixed parameters) other than priority parameters and search object parameters are maintained at the values of the appropriate parameters of the current time's gait parameter determined in S2100.

The processing of FIG. 17 explained above updates the values of the priority parameters of a provisional current time's gait parameter (the current time's gait parameter determined in the past such that a boundary condition of a current time's gait is satisfied) determined in S2100 so as to gradually bring the values close to the values of the priority parameters determined in S026 (the priority parameters of a current time's gait to be generated), and each time the values are updated, a current time's gait parameter that satisfies a boundary condition is newly determined. This makes it possible to efficiently and promptly create a current time's gait that satisfies the boundary condition without causing body position/posture to diverge.

Returning to the explanation of FIG. 12, after the processing of S028 is carried out as explained above, the procedure proceeds to S030 wherein the parameters that define a ZMP permissible range for full-model correction and a floor reaction force horizontal component permissible range are determined.

This processing is the same as the processing of S030 shown in FIG. 13 in the aforesaid publication document 1, so that the explanation herein will be omitted.

The processing of S018 to S030 explained above is the processing carried out by the aforesaid gait parameter determiner 100a shown in FIG. 5.

After the processing of S030 is carried out, or if the determination result of S016 is NO, then the procedure proceeds to S032 wherein the instantaneous values of the current time's gait are determined one after another. The subroutine processing of this processing is the same as the aforesaid processing of the flowchart of FIG. 19 explained in relation to generating a provisional current time's gait. In this case, as the ZMP parameter "a" and the first peak value ZMPrecpeaka and the second peak value ZMPrecpeakb of a body inclination restoring moment ZMP-converted value, the ones finally determined in S028 of FIG. 12 (the ones finally searched for in the processing of S2104-n of FIG. 17) are used.

Subsequently, the procedure proceeds to S034 wherein the operation of the arm bodies 5, 5 to cancel a spin (the rotation about a vertical axis) of the robot 1 is determined. This processing is for determining the postures of the arm bodies 5, 5 such that a floor reaction force moment in the opposite direction from the vertical component of the floor reaction force moment, which would be generated about a desired ZMP if the robot 1 were operated according to a desired gait without swinging the arms of the robot 1, is generated by the arm swings of the arm bodies 5, 5 (a motion of swinging the two arm bodies 5, 5 back and forth in the opposite directions from each other). This is performed in exactly the same manner as that in S034 of FIG. 13 in the aforesaid publication document 1. The details thereof are described in the publication document 1, so that no further explanation will be given.

Subsequently, the procedure proceeds to S036 wherein the instantaneous value of the ZMP permissible range and the instantaneous value of the floor reaction force horizontal component permissible range for full-model correction (for the processing of the aforesaid full-model corrector 100e) are determined. In this processing, they are determined on the basis of a gait parameter that defines the ZMP permissible range and the floor reaction force horizontal component permissible range determined in S030 described above.

The processing of S032 to S036 explained above is the detailed processing carried out by the aforesaid desired instantaneous value generator 100b in FIG. 5 described above.

Subsequently, the procedure proceeds to S038 wherein a corrected gait using a full model is generated. This processing is the processing carried out by the aforesaid full-model corrector 100c. In this case, the processing is the same as the processing of S038 of FIG. 13 in the aforesaid publication document 1, and it is carried out according as described in the publication document 1. Hence, detailed explanation thereof will be omitted in the present description. This processing determines a corrected desired body position/posture, which is obtained by further correcting the desired body position/posture (the body position/posture of the aforesaid displacement-dimension corrected gait), and a corrected desired floor reaction force moment.

The above is the gait generation processing of the gait generating device 100 in the present embodiment.

The operation of the composite-compliance control unit 101 will now be explained with reference to FIG. 4. Incidentally, the operation of the composite-compliance control unit 101 is described in detail in Japanese Unexamined Patent Application Publication No. H10-277969 and the like previously applied by the present applicant; therefore, only schematic explanation will be given in the present description. In the gait generating device 100, the corrected desired body position/posture (trajectory) and the desired arm posture (trajectory) out of the desired gait generated as described above are sent out to a robot geometric model (inverse kinematics calculator) 102.

Further, the desired foot position/posture (trajectory), the desired ZMP trajectory (the desired total floor reaction force central point trajectory), and the desired total floor reaction force (trajectory)(the corrected desired floor reaction force moment and the desired floor reaction force vertical component) are sent to the composite-compliance operation determiner 104 and also to a desired floor reaction force distributor 106. Then, in the desired floor reaction force distributor 106, the floor reaction force is distributed to each foot 22 and the desired each foot floor reaction force central point and the desired each foot floor reaction force are determined. The determined desired each foot floor reaction force central point and the desired each foot floor reaction force are sent to the composite-compliance operation determiner 104.

Corrected desired foot position/posture (trajectory) with deformation compensation is sent from the composite-compliance operation determiner 104 to the robot geometric model 102. Upon receipt of the desired body position/posture (trajectory) and the corrected desired foot position/posture (trajectory) with deformation compensation, the robot geometric model 102 calculates the joint displacement commands (values) of the twelve joints of the leg bodies 2, 2 that satisfy them and sends the calculated commands to a displacement controller 108. The displacement controller 108 carries out follow-up control of the displacements of the twelve joints of the robot 1, using the joint displacement commands (values) calculated by the robot geometric model 102 as the desired values. Further, the robot geometric model 102 calculates displacement commands (values) of arm joints that satisfy desired arm postures and sends them to the displacement controller 108. The displacement controller 108 carries out follow-up control of the displacements of the twelve joints of the arm bodies of the robot 1, using the joint displacement commands (values) calculated in the robot geometric model 102 as desired values.

The floor reaction forces (specifically, the actual each foot floor reaction force) generated in the robot 1 are detected by the six-axis force sensor 50. The detected values are sent to the aforesaid composite-compliance operation determiner 104. Further, posture inclination errors θerrx and θerry (specifically, the errors of actual posture angles relative to the desired body posture angle, the posture angle error in the roll direction (about the X-axis) being denoted by θerrx and the posture angle error in the pitch direction (about the Y-axis) being denoted by θerry) generated in the robot 1 are detected through the intermediary of a posture sensor 54, and the detected values are sent to a posture stabilization control calculator 112. The posture stabilization control calculator 112 calculates the compensating total floor reaction force's moment about the desired total floor reaction force central point (the desired ZMP) for restoring the body posture angle of the robot 1 to the desired body posture angle and sends the calculation result to the composite-compliance operation determiner 104. The composite-compliance operation determiner 104 corrects the desired floor reaction force on the basis of the input value. To be specific, the desired floor reaction force is corrected such that the compensating total floor reaction force's moment or the sum of the compensating total floor reaction force's moment and the corrected desired floor reaction force moment acts about the desired total floor reaction force central point (the desired ZMP).

The composite-compliance operation determiner 104 determines the aforesaid corrected desired foot position/posture (trajectory) with deformation compensation so as to make the states of the actual robot and the floor reaction force calculated from sensor-detected values or the like coincide with the desired floor reaction force that has been corrected. In this case, the corrected desired foot position/posture with deformation compensation considers the mechanical deformation of the aforesaid compliance mechanism 72 and the like. However, it is virtually impossible to make all states agree with desired values, so that a trade-off relationship is imparted among them to make them compromisingly agree as much as possible. More specifically, a control error for each desired value is weighted in conducting control so that the weighted average of the control error (or the square of the control error) is minimized. Thus, actual foot position/posture and total floor reaction force are controlled so as to approximately follow the desired foot position/posture and the desired total floor reaction force.

In the embodiment explained above, the gait parameters (a normal gait parameter and a current time's gait parameter) have been gradually updated, beginning with the ones associated with last time's gaits (the gaits determined in the past); alternatively, however, in either a normal gait or a current time's gait, a standard (reference) gait parameter that satisfies a boundary condition of the gait may be prepared (created) and retained in memory in advance, and then this may be used as a starting point to gradually update a gait parameter. For instance, the estimated landing position/posture of a free leg foot 22 related to a foot trajectory parameter of the current time's gait may be gradually updated from the position/posture at which the robot 1 steps at the same spot to the position/posture based on a required value, or the walking cycle thereof may be gradually updated.

In the embodiment described above, it has been the boundary condition on the current time's gait that the divergence component at the terminating end of the current time's gait substantially agrees with the initial divergence component of a normal gait in order to bring the current time's gait close to the normal gait, and the search objects of the current time's gait parameter have been searched for and determined to satisfy the boundary condition. Alternatively, however, the boundary condition of the current time's gait may be set such that the body position (the horizontal position and the vertical position) and the body velocity (the horizontal velocity and the vertical velocity) at the terminating end of the current time's gait substantially agree with the body position and the body velocity, respectively, at the beginning of the normal gait, and the search objects of the current time's gait parameter may be searched for and determined so that the boundary condition is satisfied.

Alternatively, the boundary condition may be set such that the weighted average values of the position of the total center-of-gravity of the robot 1 and the changing velocity thereof at the terminating end of the current time's gait substantially agree with the weighted average values at the beginning of the normal gait, and the search objects of the current time's gait parameter may be determined such that the boundary condition is satisfied.

Further, when determining a normal gait parameter, the aforesaid weighted mean values of the robot 1 or divergence components may be used as the search objects of a normal gait parameter to satisfy the boundary condition of the normal gait. Incidentally, a weighted mean value becomes equivalent to a divergence component (more precisely, proportional to a divergence component) by setting a predetermined weight if an absolute magnitude is ignored.

INDUSTRIAL APPLICABILITY

As is obvious from the above explanation, the gait generating system for a mobile robot in accordance with the present invention is useful in that it is capable of efficiently generating a gait that makes it possible to satisfy a predetermined boundary condition, while preventing divergence of the gait, and capable of generating a gait of a mobile robot, such as a biped mobile robot in particular, which inherently has low stability, while securing the stability of the mobile robot.

Figure 1:
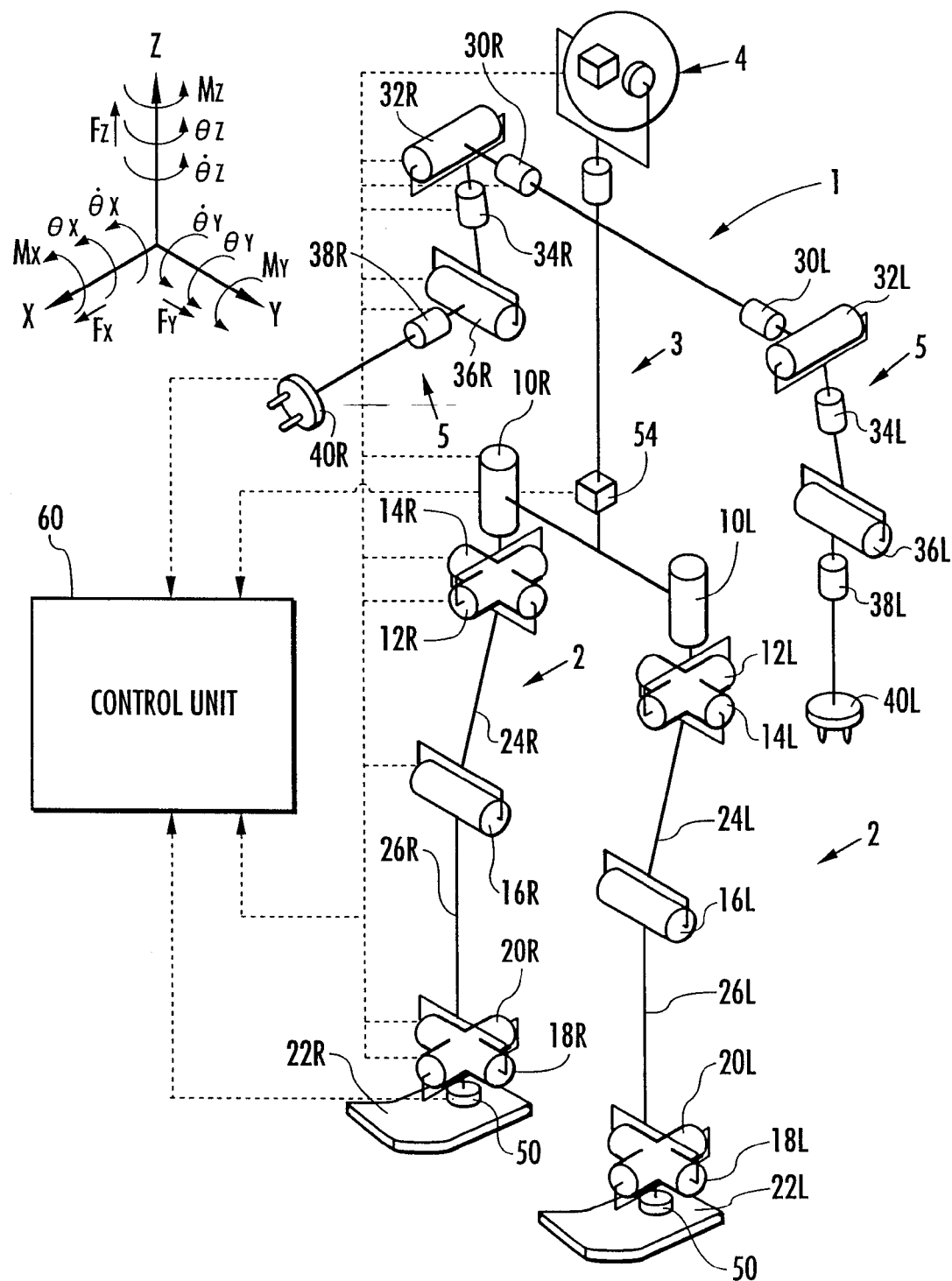
FIG. 1 is a diagram showing the overview of the entire construction of a mobile robot (a bipedal walking robot) to which an embodiment of the present invention is applied.
Figure 2:
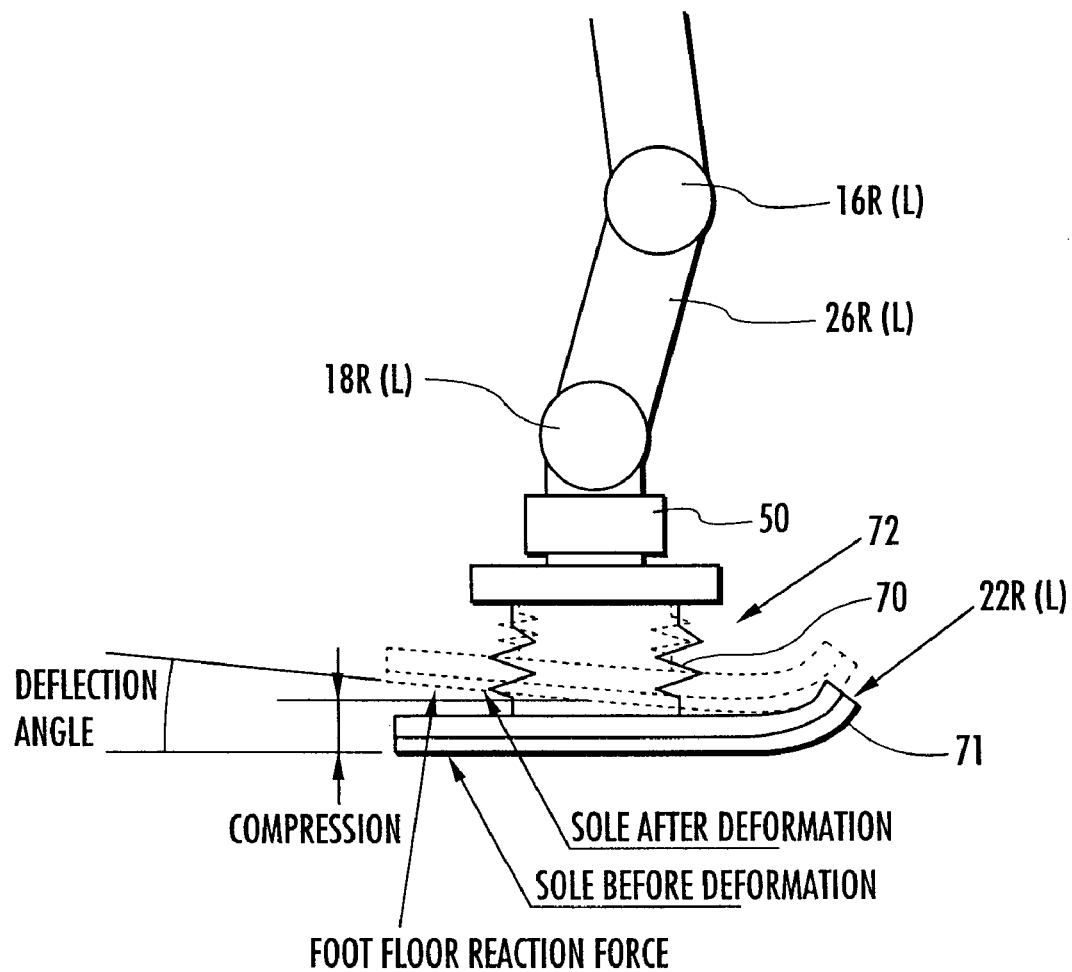
FIG. 2 is a side view showing the construction of a foot portion of each leg of the robot shown in FIG. 1.
Figure 3:
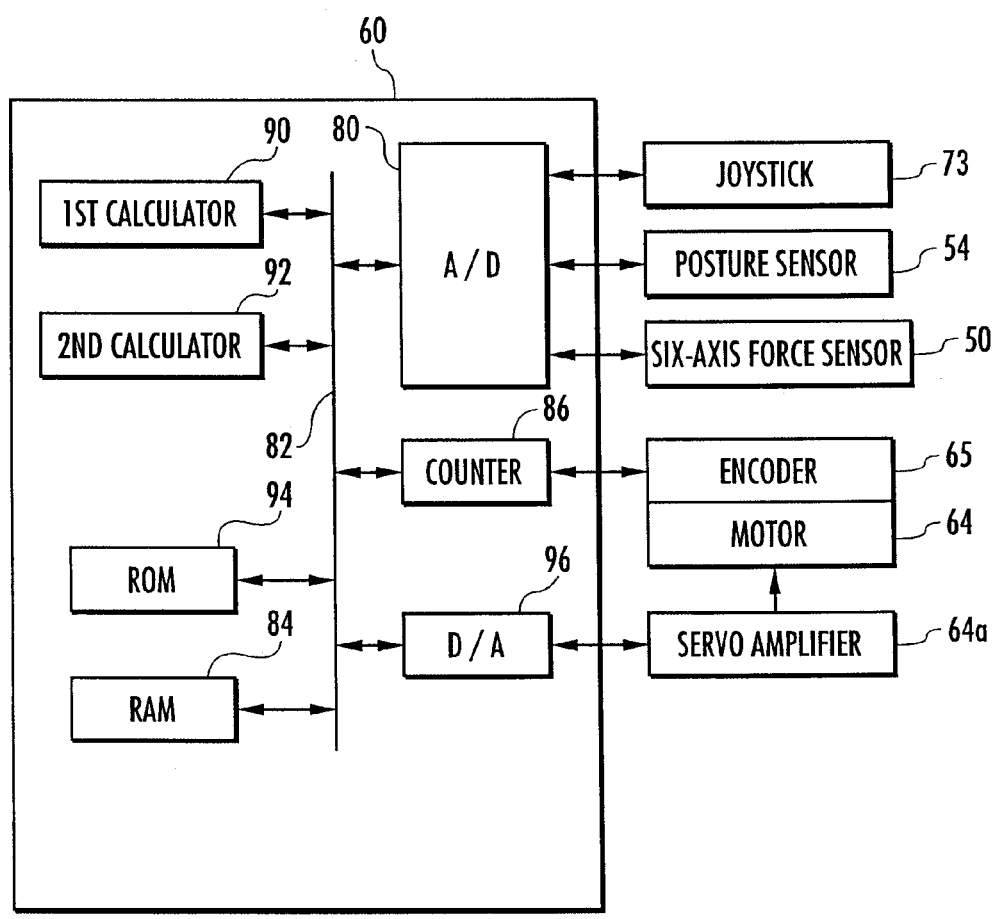
FIG. 3 is a block diagram showing the construction of a control unit provided in the robot shown in FIG. 1.
Figure 4:
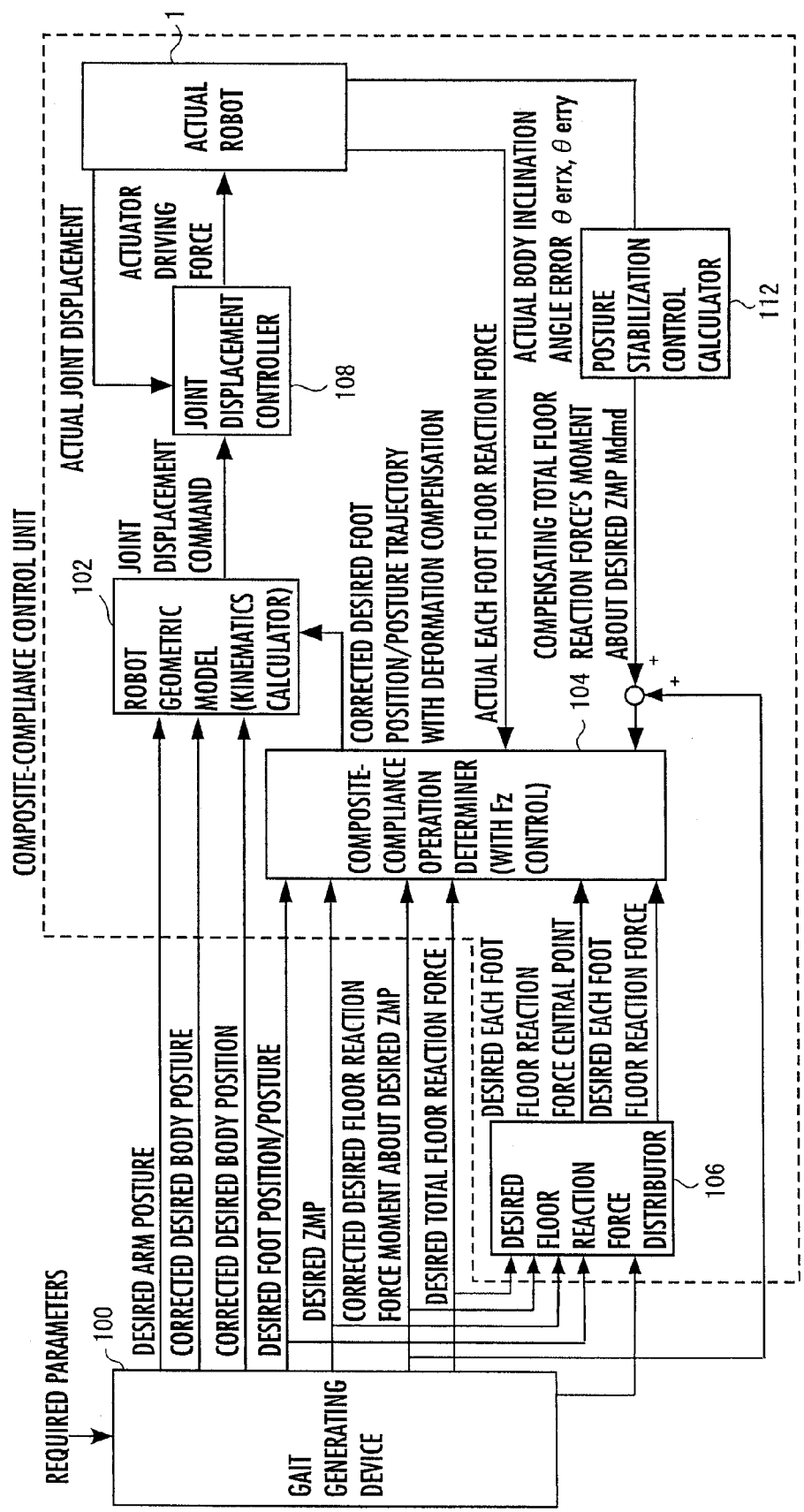
FIG. 4 is a block diagram showing the functional construction of the control unit shown in FIG. 3.
Figure 5:
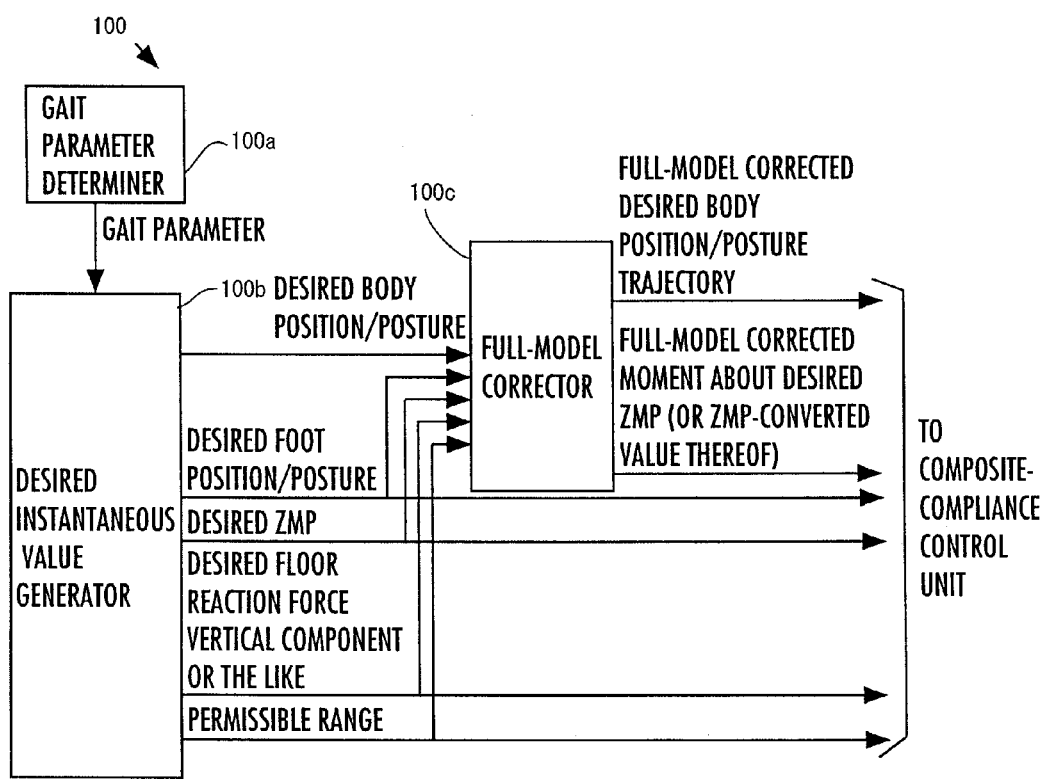
FIG. 5 is a block diagram showing the functions of a gait generating device shown in FIG. 4.
Figure 6A:
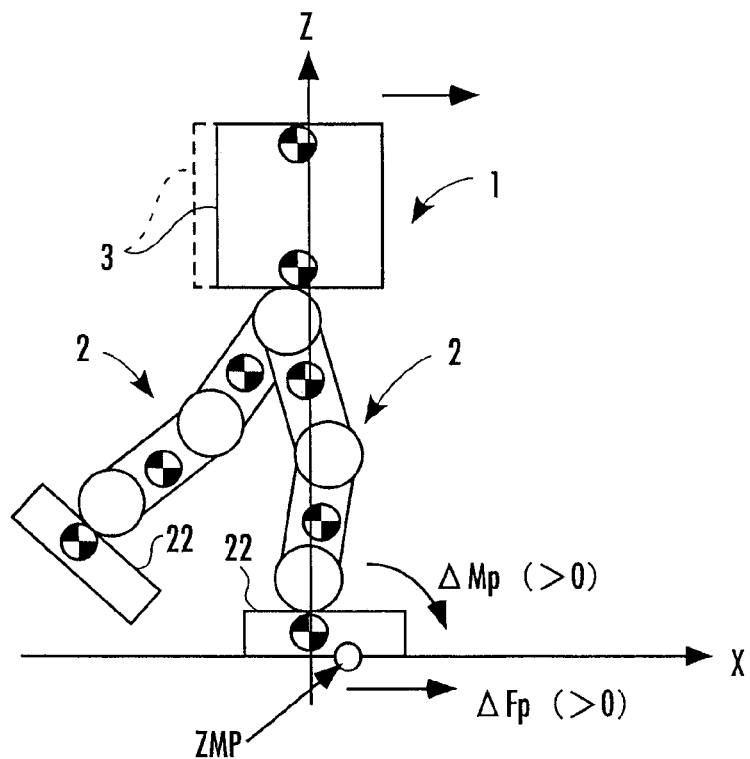
FIGS. 6(*a*) and (*b*) are diagrams for explaining the motion modes (a body translational mode and a body rotation mode), respectively, of the robot.
Figure 6B:
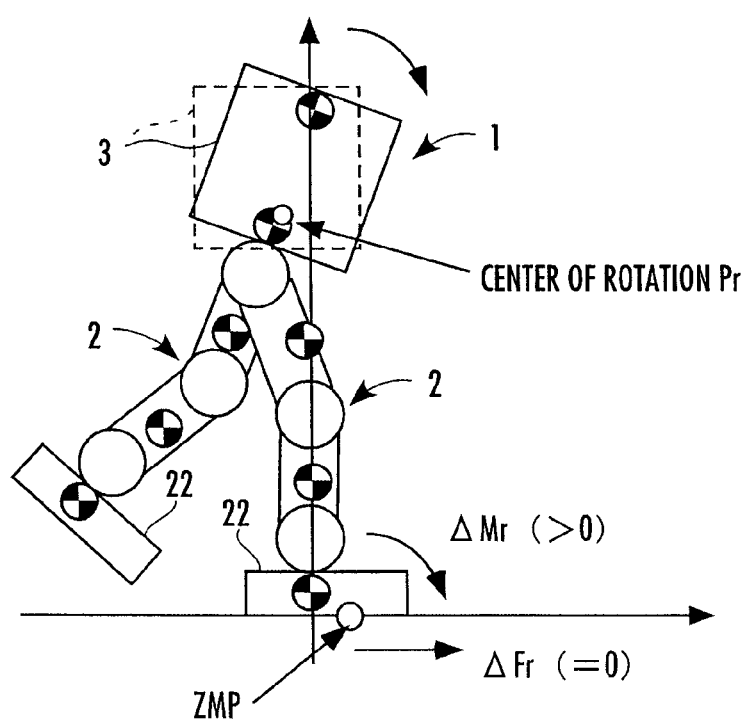
Figure 7:
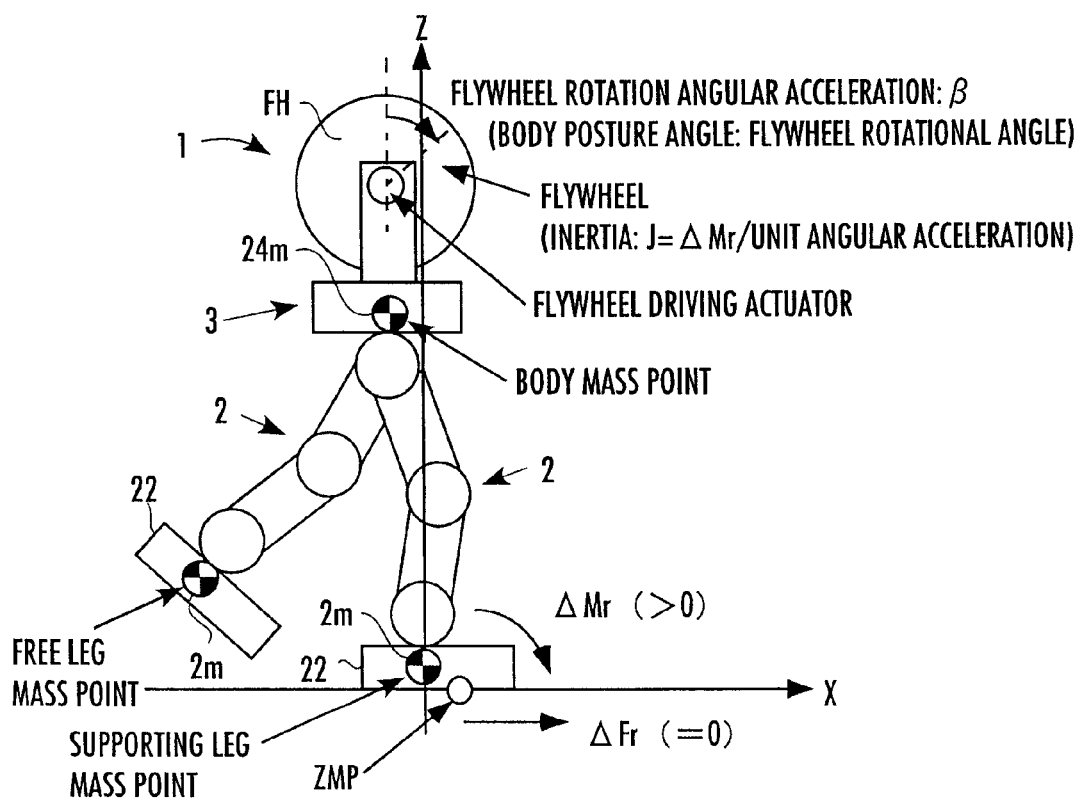
FIG. 7 is a diagram showing the structure of a dynamic model used for generating gaits.
Figure 8:
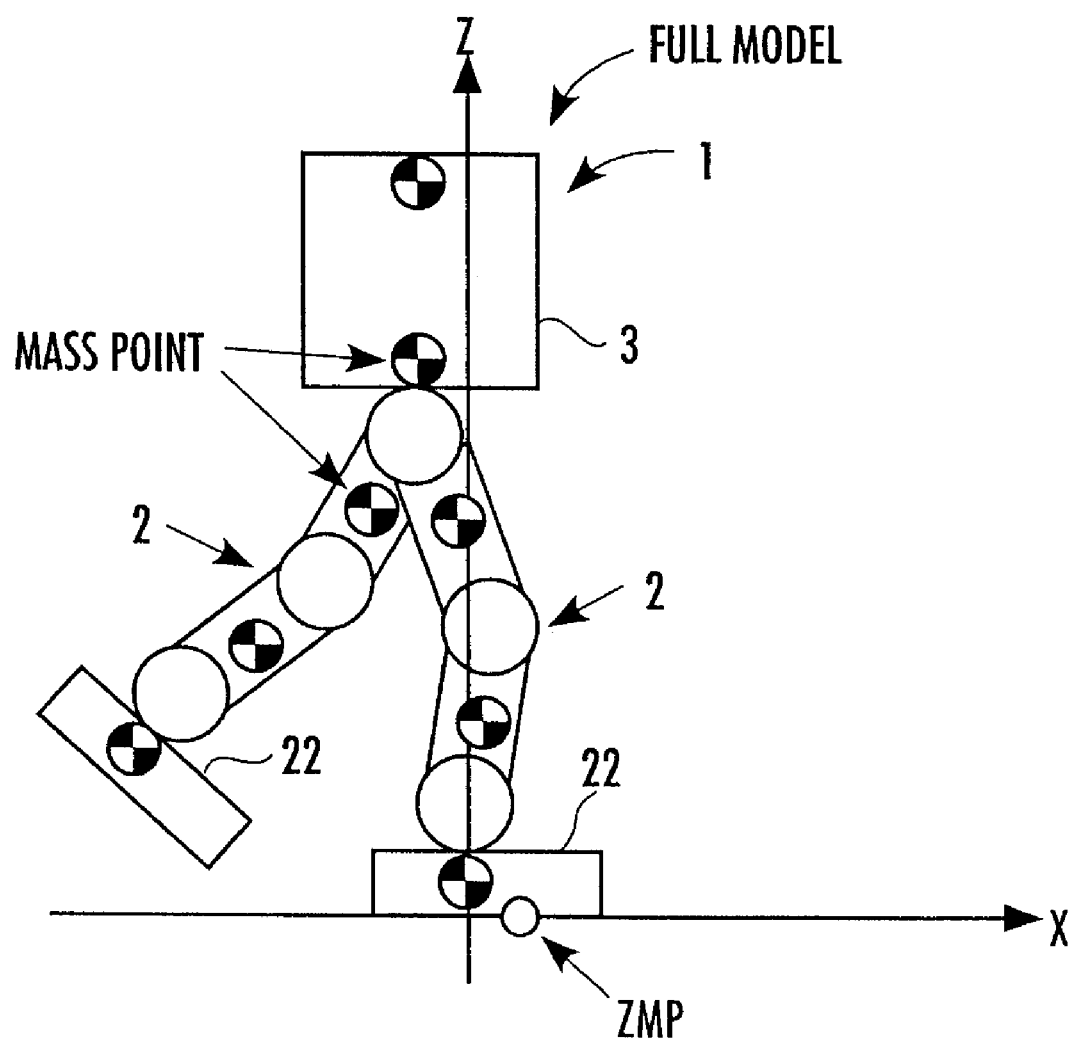
FIG. 8 is a block diagram showing the structure of a full model used for generating gaits.
Figure 9:
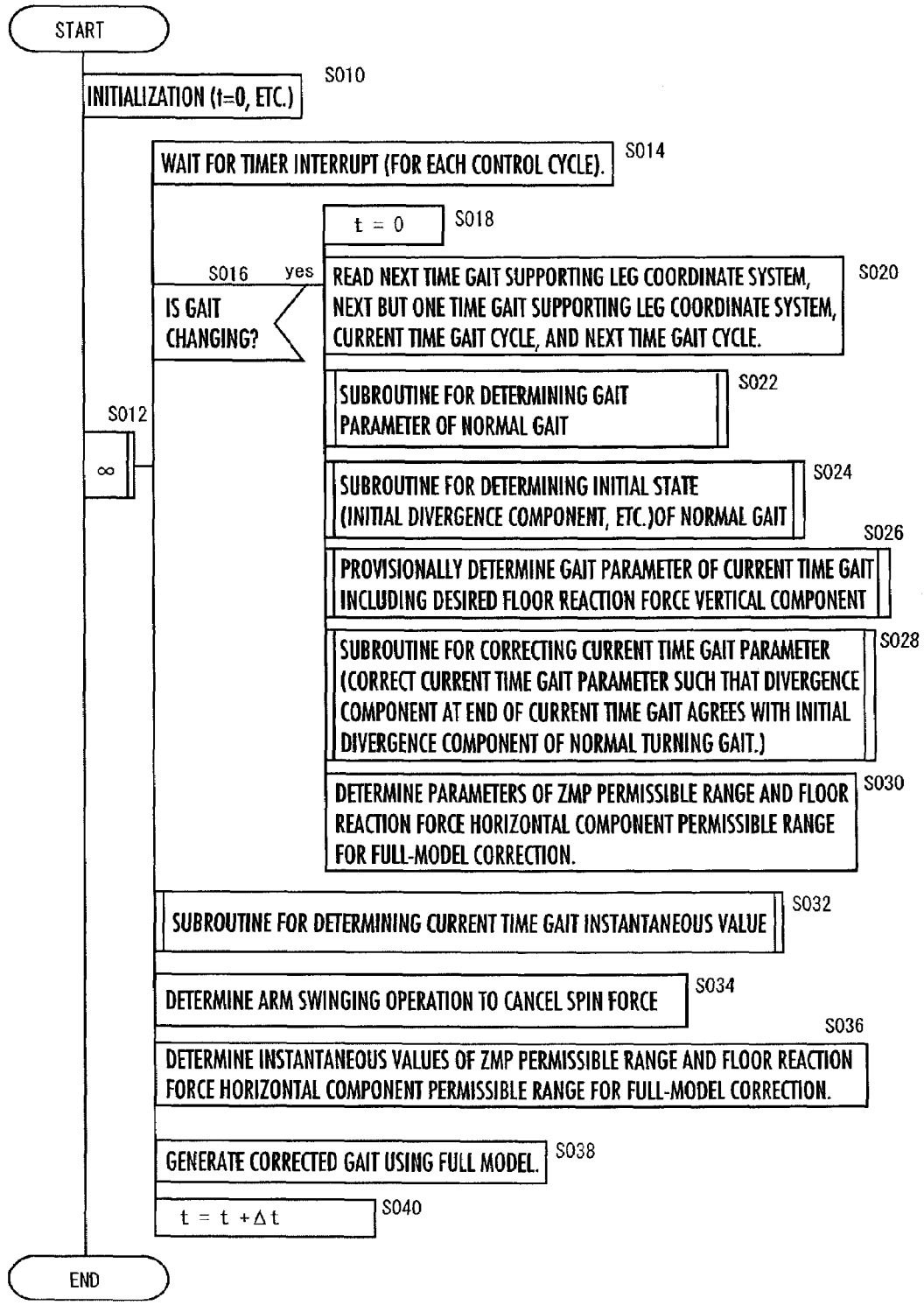
FIG. 9 is a flowchart showing the main routine processing of the gait generating device in the embodiment.
Figure 10:
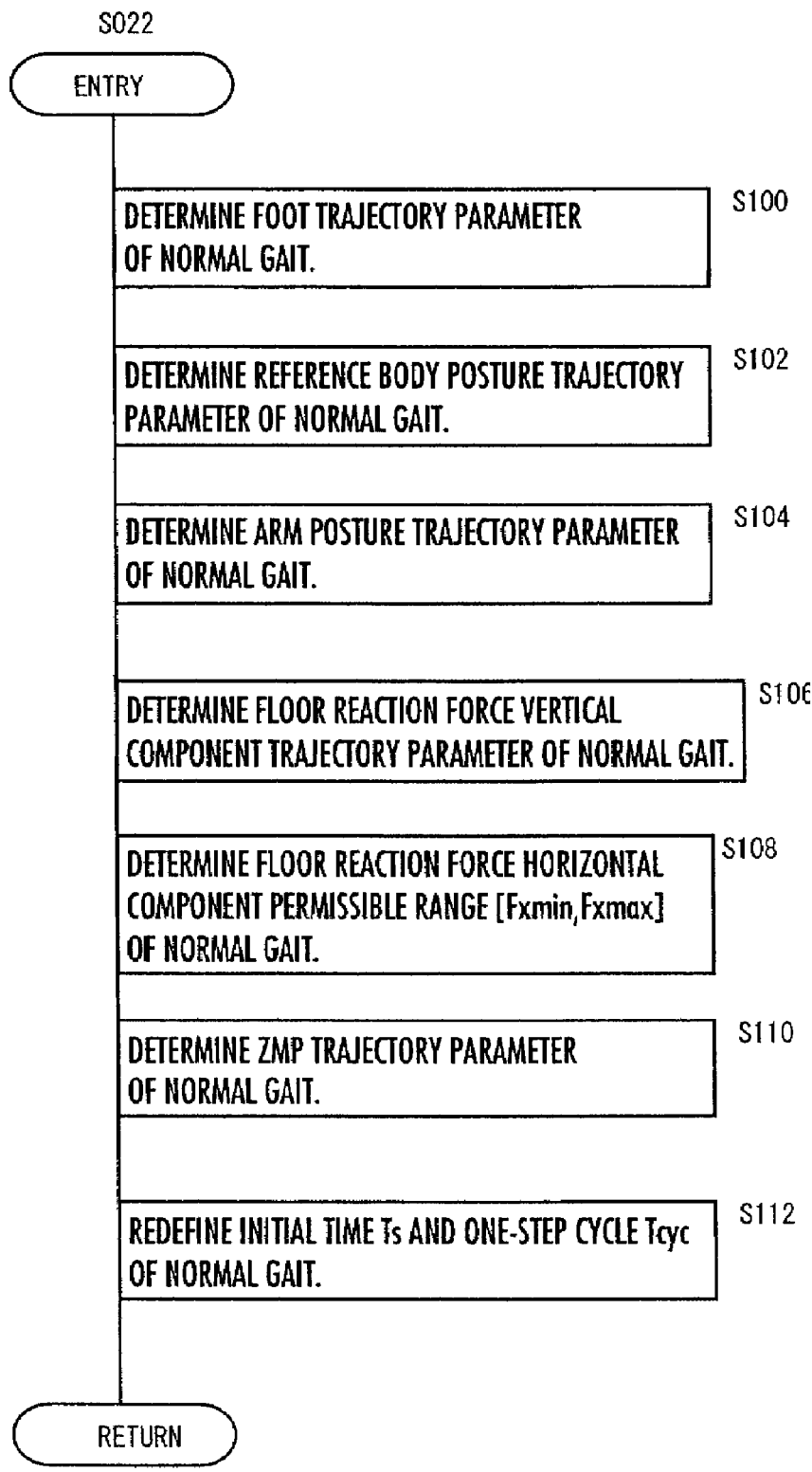
FIG. 10 is a flowchart showing the subroutine processing of FIG. 9.
Figure 11:
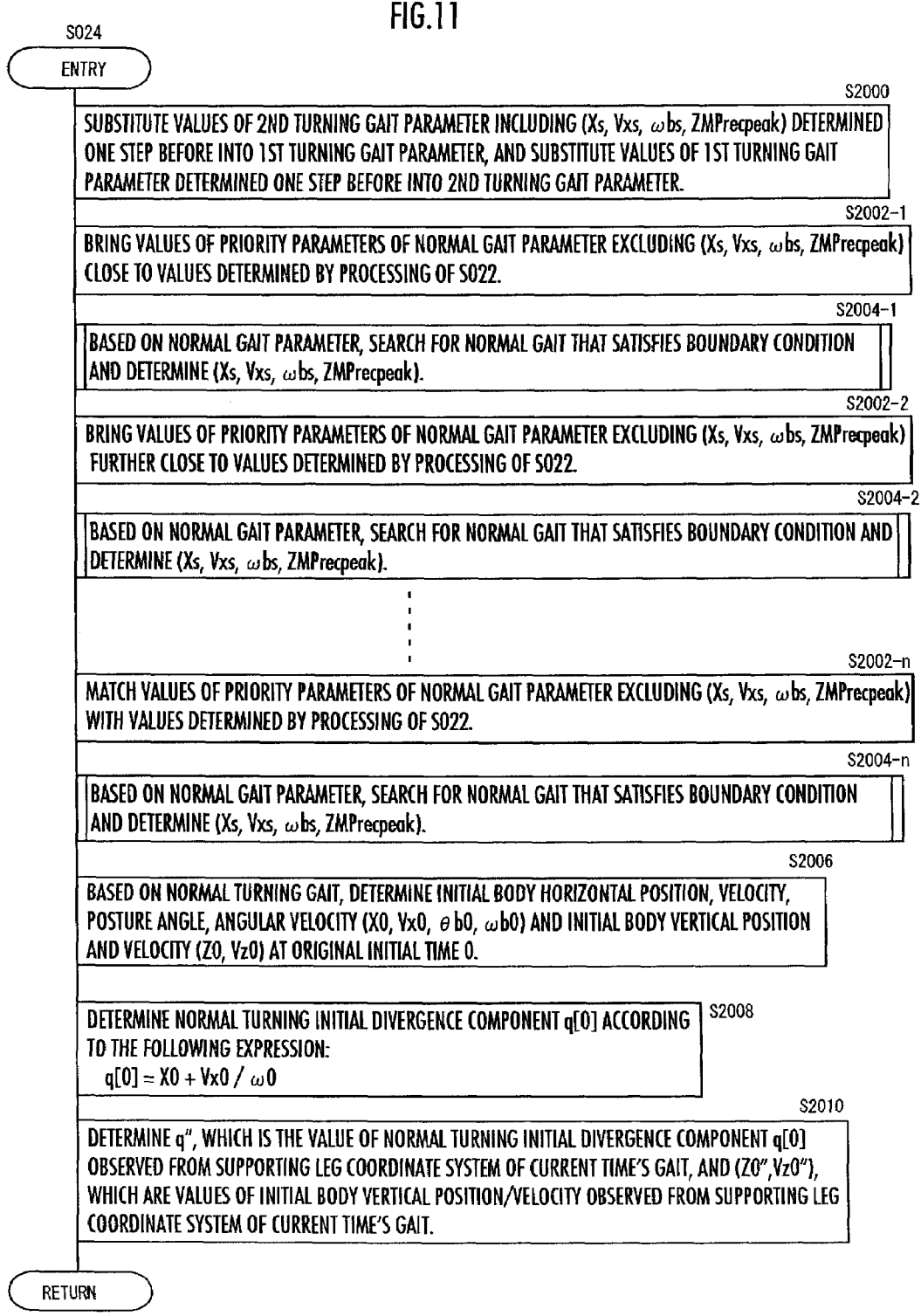
FIG. 11 is a flowchart showing the subroutine processing of FIG. 10.
Figure 12:
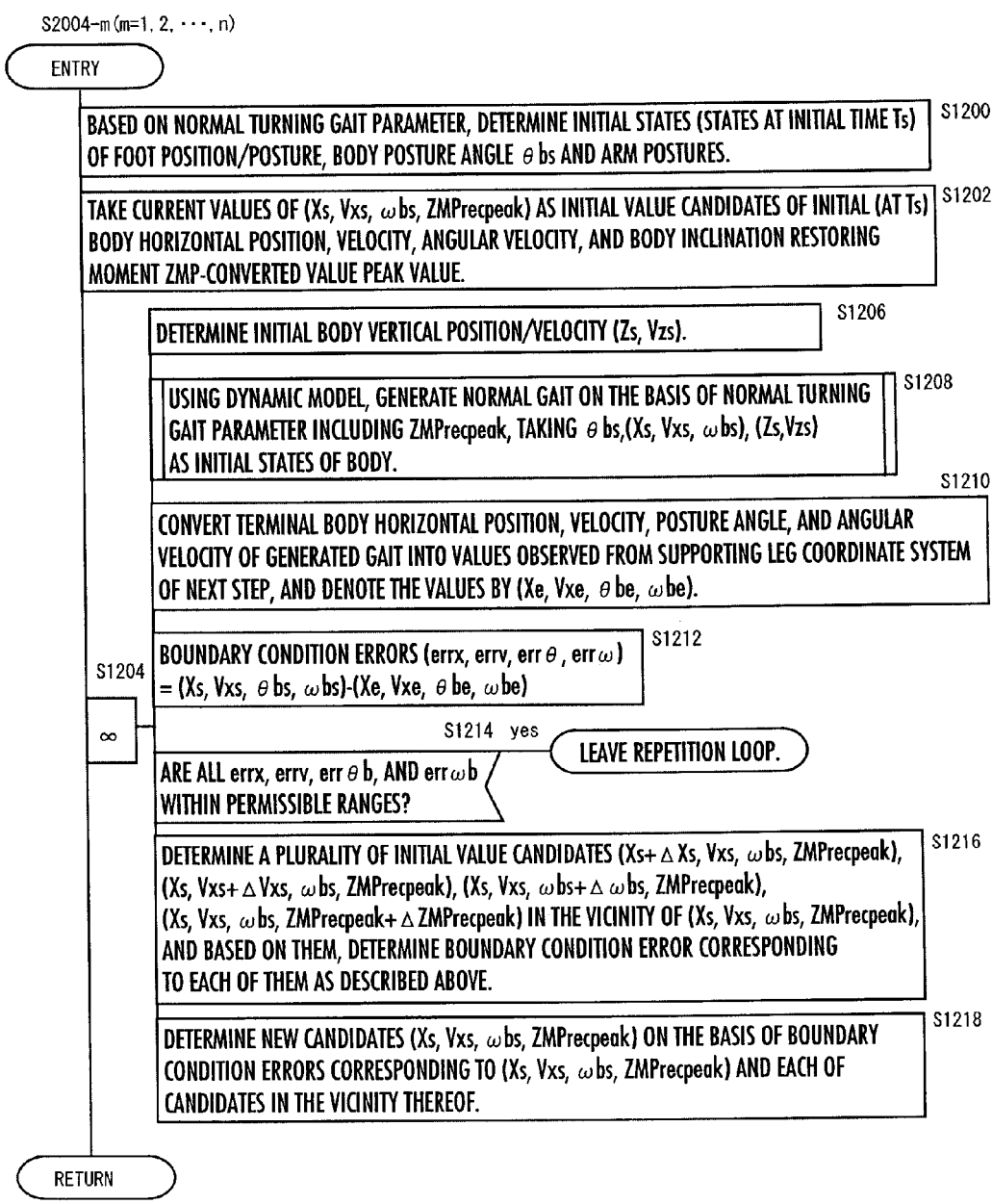
FIG. 12 is a flowchart showing the subroutine processing of FIG. 11.
Figure 13:
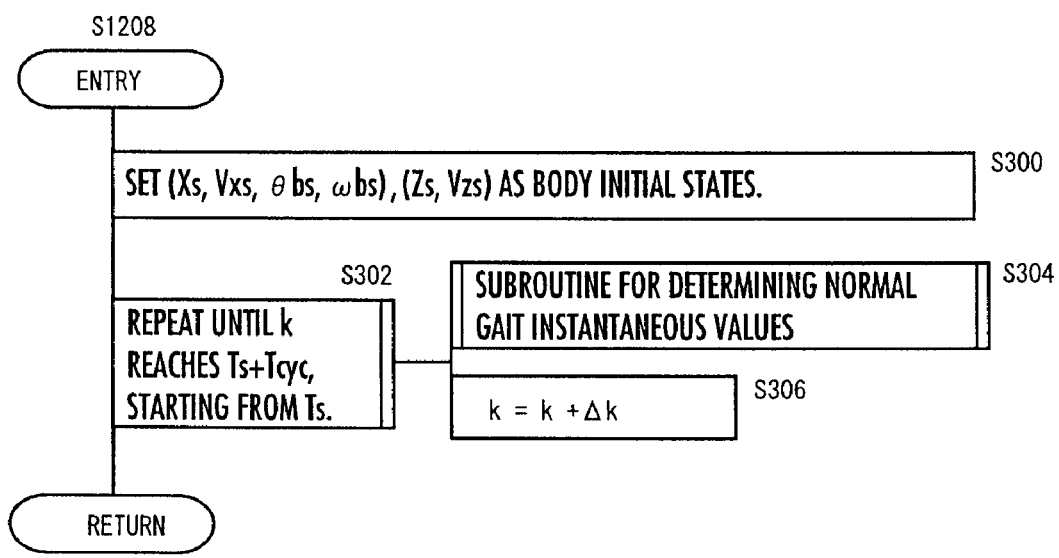
FIG. 13 is a flowchart showing the subroutine processing of FIG. 12.
Figure 14:
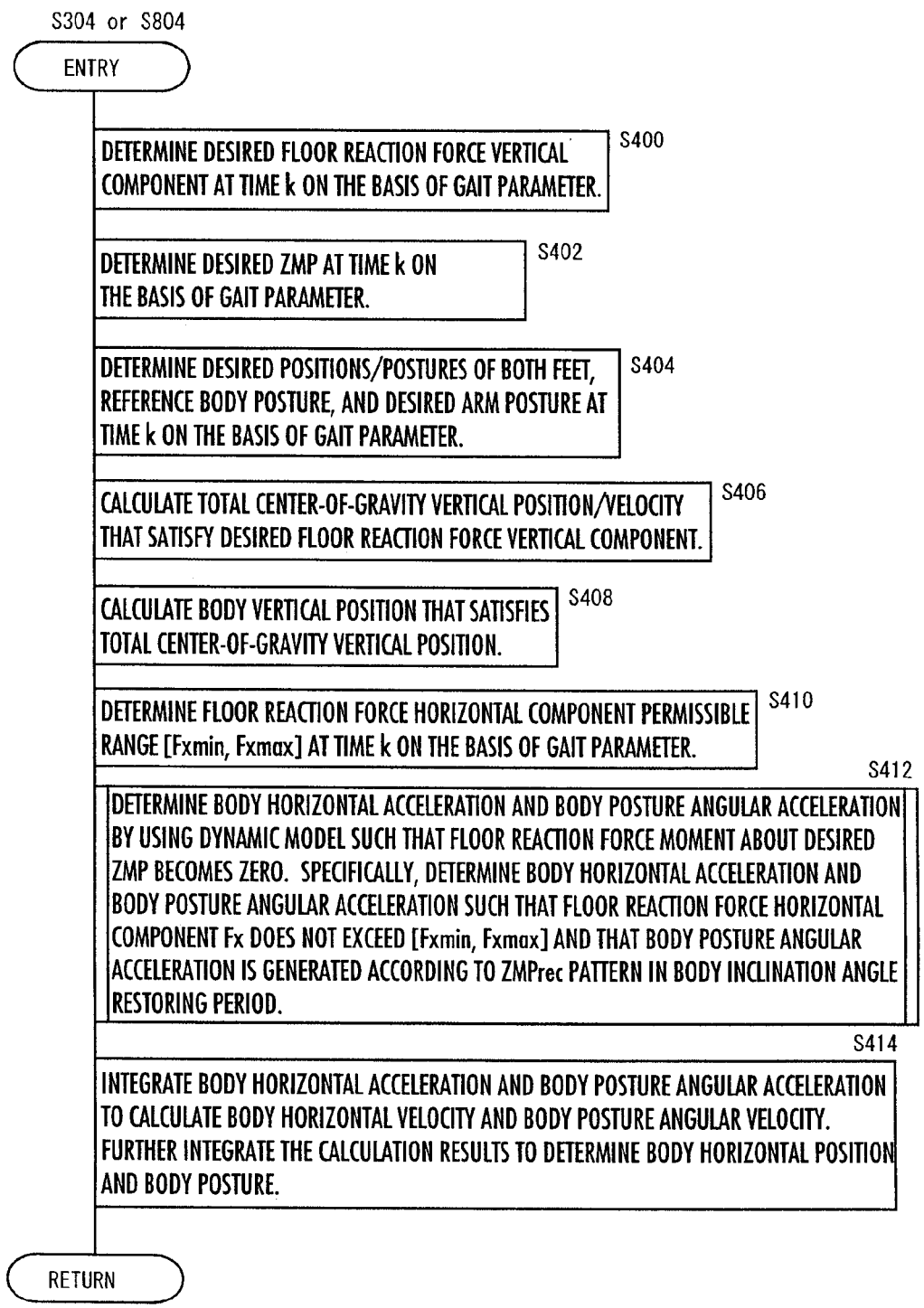
FIG. 14 is a flowchart showing the subroutine processing of FIG. 13.
Figure 15:
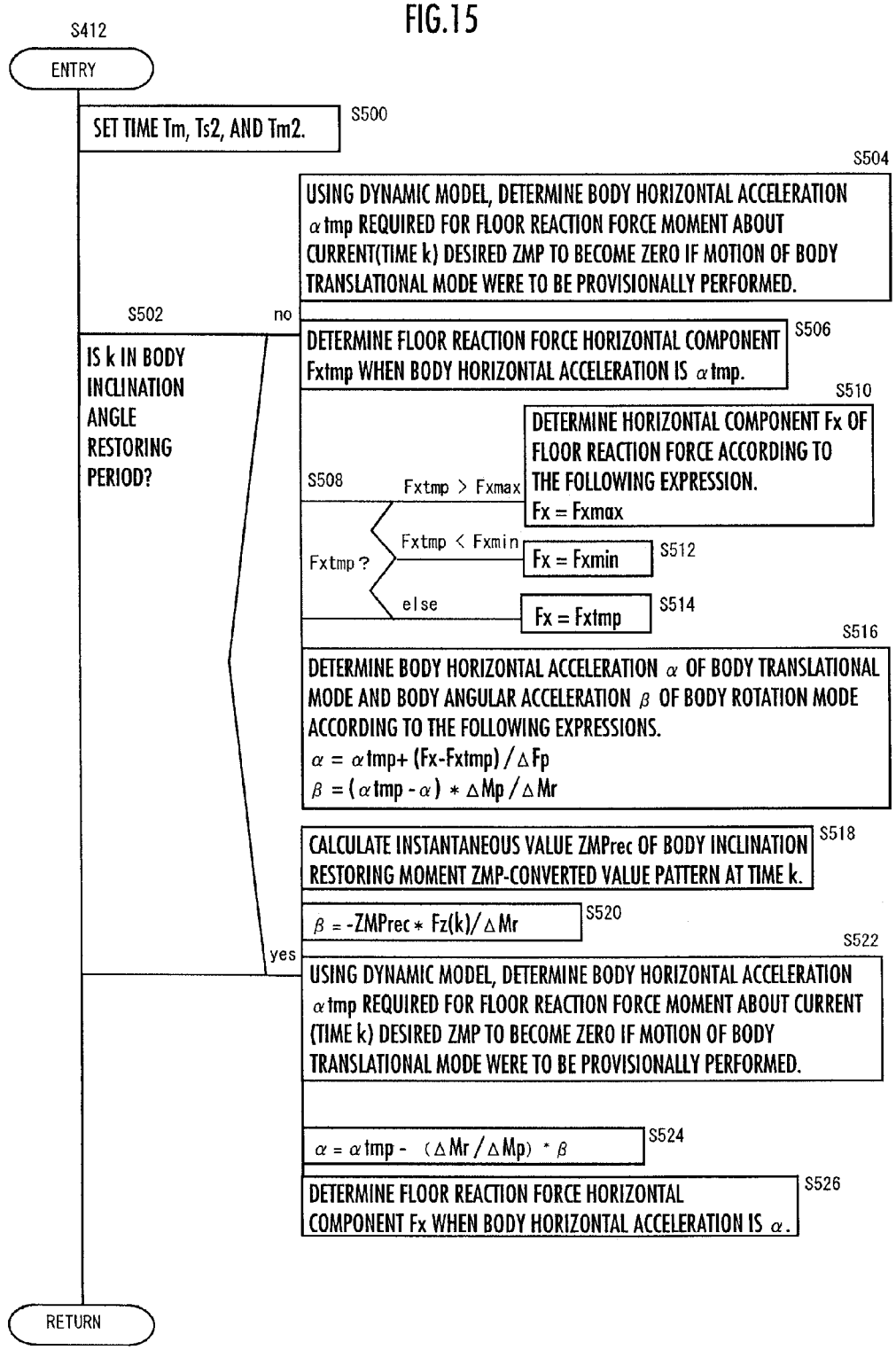
FIG. 15 is a flowchart showing the subroutine processing of FIG. 14.
Figure 16:
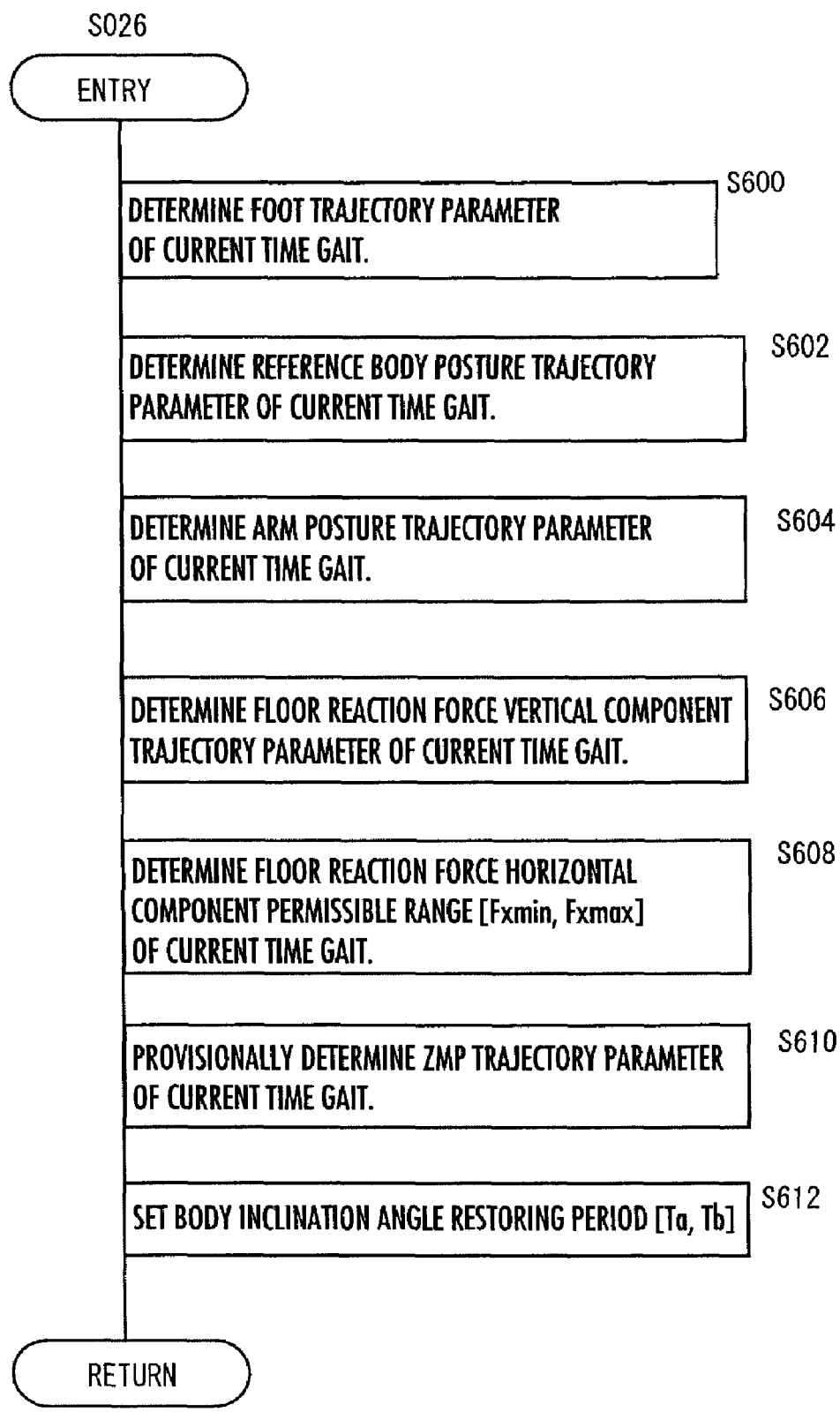
FIG. 16 is a flowchart showing the subroutine processing of FIG. 9.
Figure 17:
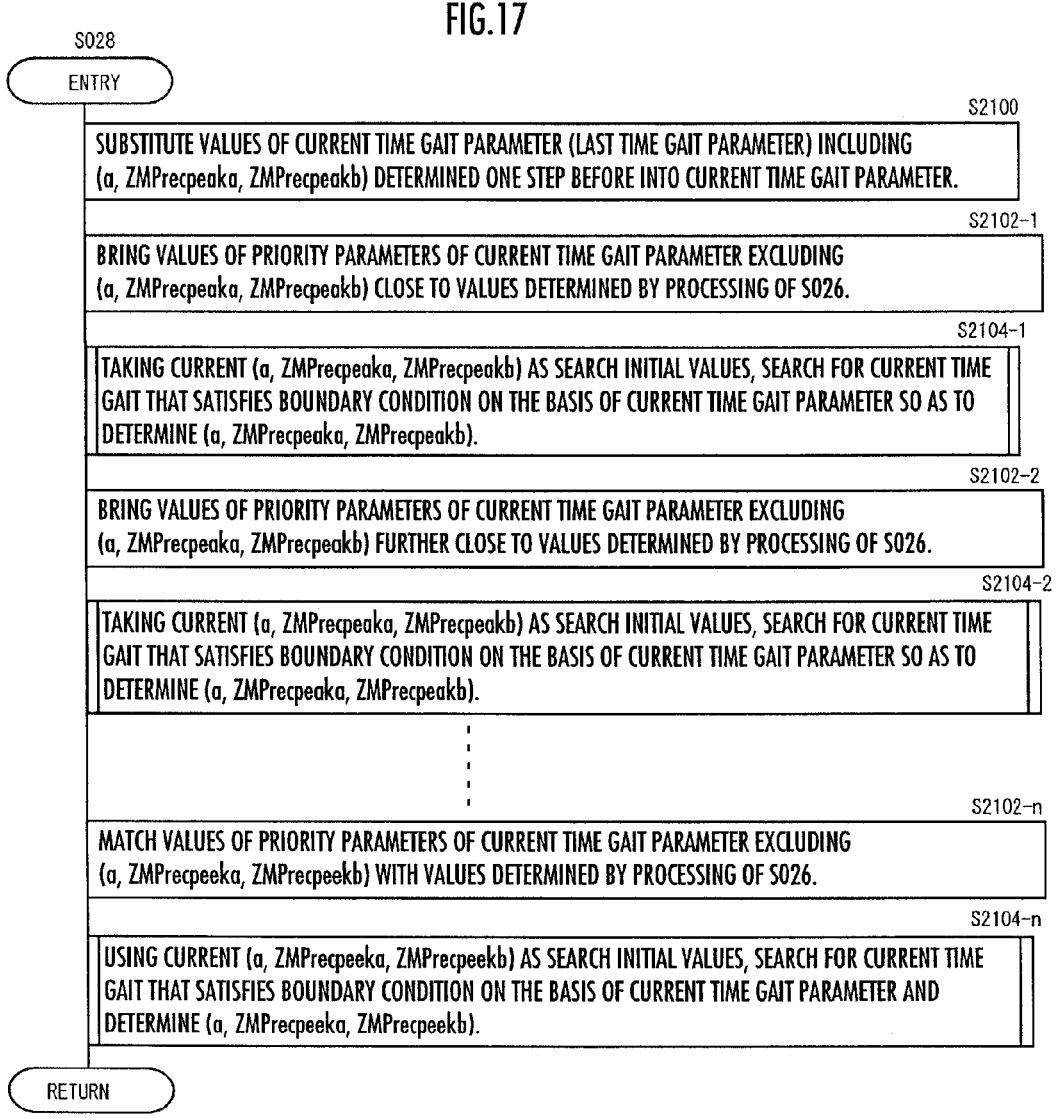
FIG. 17 is a flowchart showing the subroutine processing of FIG. 9.
Figure 18:
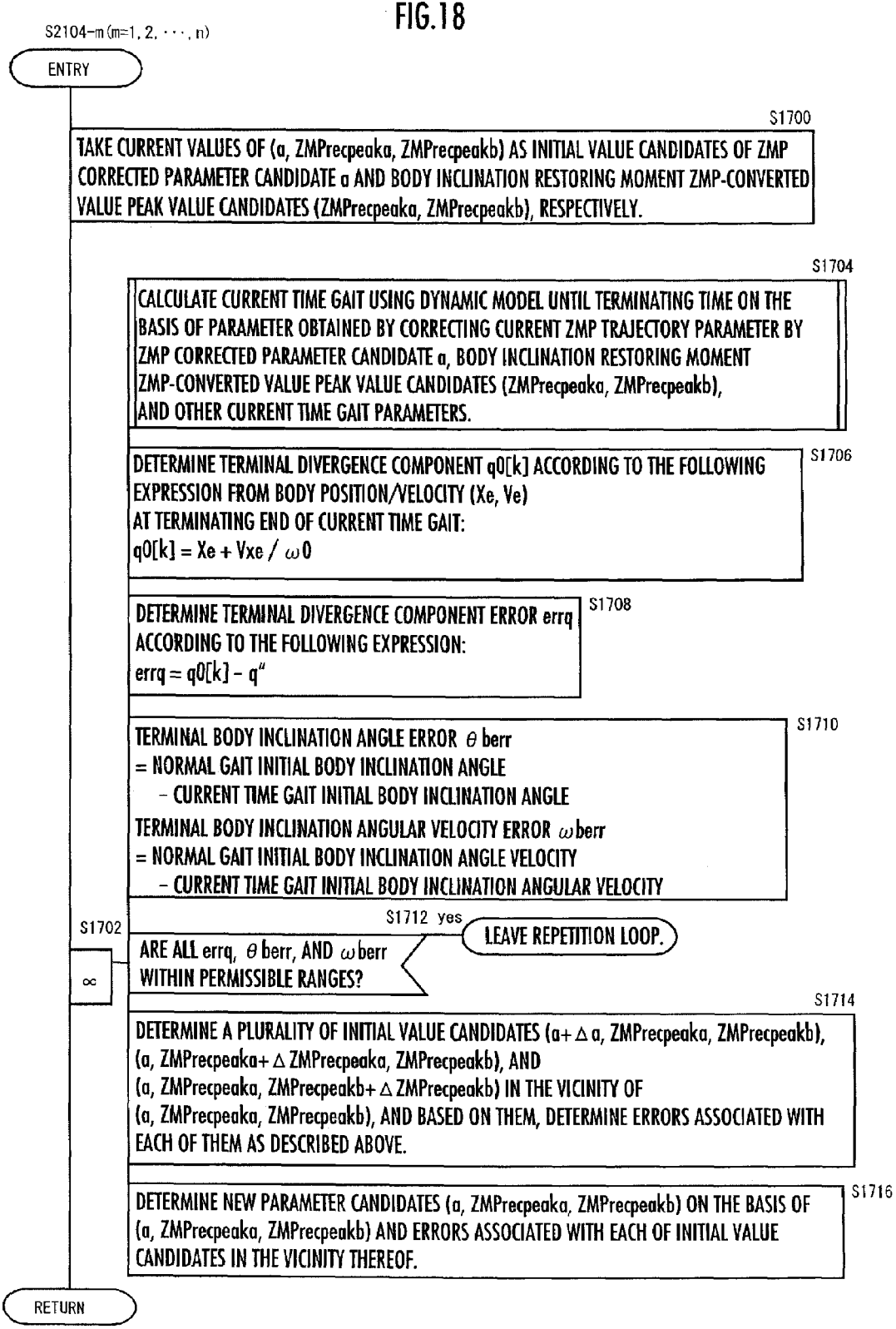
FIG. 18 is a flowchart showing the subroutine processing of FIG. 17.
Figure 19:
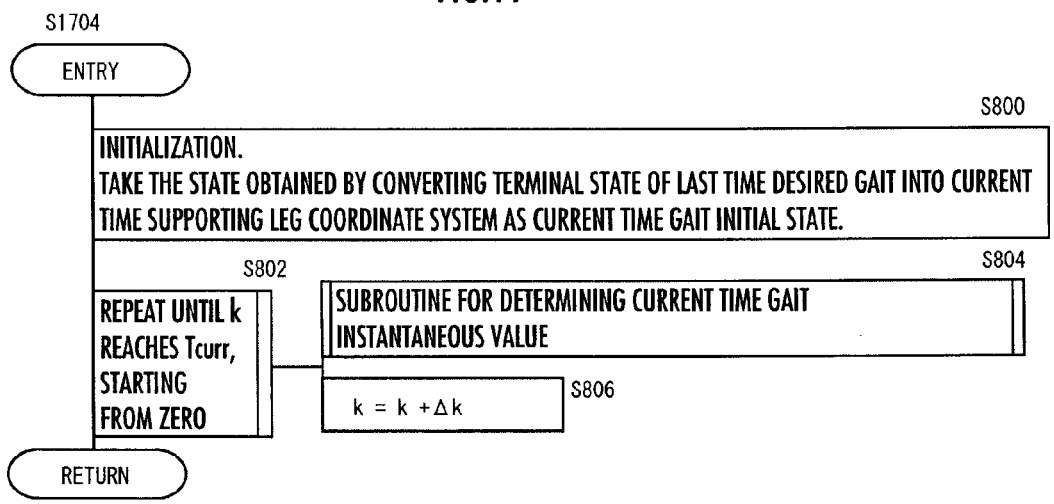
FIG. 19 is a flowchart showing the subroutine processing of FIG. 18.
Figure 20:
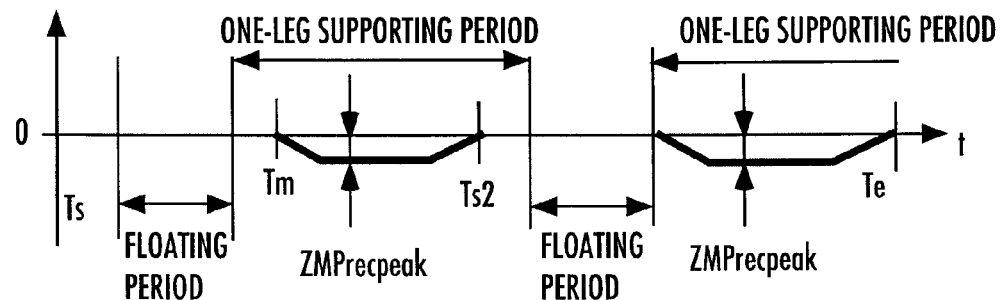
FIG. 20 is a graph showing examples of body inclination restoring moment ZMP-converted values in a normal gait.
Figure 21:
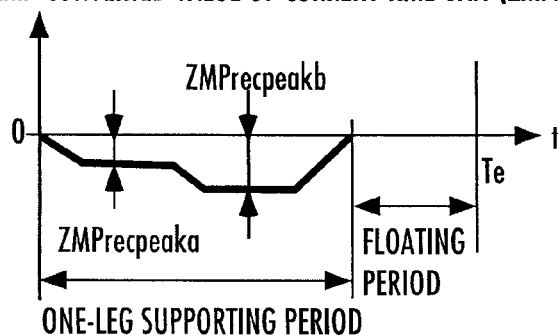
FIG. 21 is a graph showing examples of body inclination restoring moment ZMP-converted values in a current time's gait.
Figure 22:
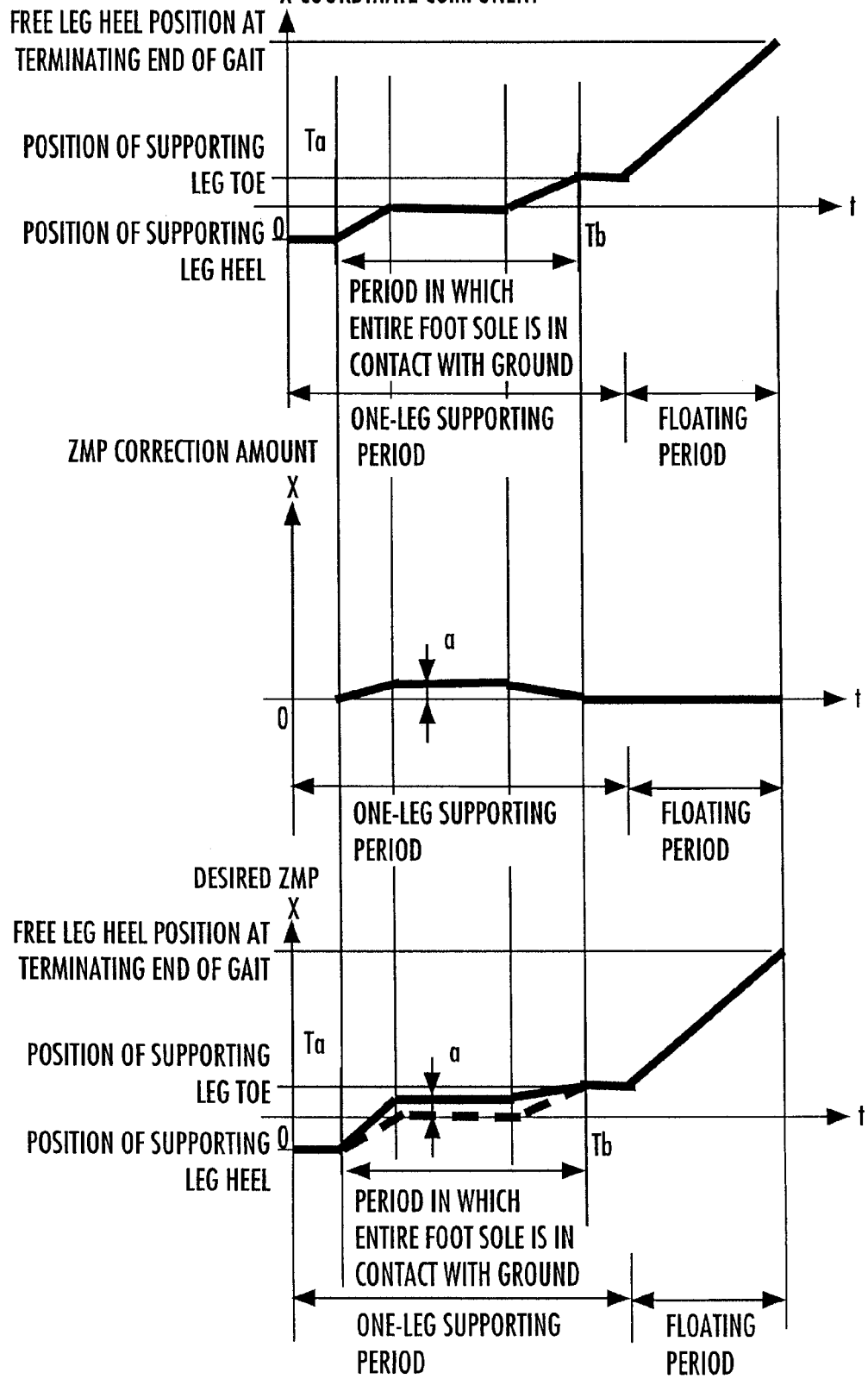
FIG. 22 is a graph showing examples of a provisional desired ZMP, a ZMP correction amount, and a desired ZMP in a current time's gait.

The invention claimed is:

1. A gait generating system for a mobile robot, the system determining a gait parameter, which is composed of a set of a plurality of parameters defining a gait of a mobile robot in a predetermined period, and generating a desired gait of the mobile robot in the predetermined period by using the determined gait parameter and a dynamic model of the mobile robot, comprising:

a control system having a gait generating device to generate the desired gait of the mobile robot, the gait generating device including:

a priority parameter required value determining means for determining a priority parameter required value, which is the value of a priority parameter to satisfy a requirement when the requirement related to the desired gait is given and a predetermined parameter out of the gait parameter is defined as the priority parameter while parameters except for the priority parameter are defined as non-priority parameters;

a base gait parameter setting means for setting, as a base gait parameter, either a gait parameter defining a reference gait of the mobile robot that is prepared beforehand or a gait parameter determined in the past so as to satisfy a predetermined boundary condition;

a priority parameter asymptotic means for updating the value of a priority parameter of the base gait parameter so as to cause the value to gradually approach the priority parameter required value in steps until the value agrees with the priority parameter required value; and a new gait parameter determining means for determining in an exploratory manner a new gait parameter each time the value of the priority parameter is updated by the priority parameter asymptotic means, the new gait parameter being a gait parameter that has a priority parameter of the updated value and that allows a gait satisfying the predetermined boundary condition to be generated by using the dynamic model, wherein if the number of updates of the value of a priority parameter by the priority parameter asymptotic means when the new gait parameter is newly determined is denoted by n (n: an integer satisfying n≧1), the value of the priority parameter obtained by n-th update processing is denoted by an n-th priority parameter updated value, a new gait parameter to be newly determined is denoted by an n-th new gait parameter, and the base gait parameter is denoted by a 0-th new gait parameter, then the new gait parameter determining means is a means that sets the value of a non-priority parameter to the value of the non-priority parameter of an (n−1)th new gait parameter, defines a gait parameter, in which the value of a priority parameter has been set to an n-th priority parameter updated value, as an initial search candidate gait parameter, and searches for the value of the search object parameter, which is a predetermined parameter among non-priority parameters of the initial search candidate gait parameter, such that the value satisfies the predetermined boundary condition, thereby determining an n-th new gait parameter, and the new gait parameter determined at the last update of the value of a priority parameter by the priority parameter asymptotic means is defined as the gait parameter defining the desired gait, and the desired gait is generated by using the new gait parameter and the dynamic model.

2. A gait generating system for a mobile robot, when generating a desired gait of a mobile robot in a predetermined period, the system determining a normal gait parameter, which is composed of a set of a plurality of parameters defining a normal gait, which is a virtual cyclic gait following the desired gait, and generating the desired gait such that the desired gait approximates a normal gait generated using the determined normal gait parameter and a dynamic model of the mobile robot, comprising:

a control system having a gait generating device to generate the desired gait of the mobile robot, the gait generating device including:

a priority parameter required value determining means for determining a priority parameter required value, which is the value of a priority parameter to satisfy a requirement, when the requirement related to a normal gait corresponding to the desired gait is input and a predetermined parameter out of the normal gait parameter is defined as the priority parameter while the parameters except for the priority parameter are defined as non-priority parameters;

a base normal gait parameter setting means for setting, as a base normal gait parameter, either a normal gait parameter defining a reference normal gait of the mobile robot that is prepared beforehand or a normal gait parameter determined in the past so as to satisfy a predetermined boundary condition;

a priority parameter asymptotic means for updating the value of a priority parameter of the base normal gait parameter so as to cause the value to gradually approach the priority parameter required value in steps until the value agrees with the priority parameter required value; and a new normal gait parameter searching means for determining in an exploratory manner, each time the value of the priority parameter is updated by the priority parameter asymptotic means, a new normal gait parameter, which is a normal gait parameter that has a priority parameter of the updated value and that allows a gait satisfying the predetermined boundary condition to be generated by using the dynamic model, wherein if the number of updates of the value of a priority parameter by the priority parameter asymptotic means when the new normal gait parameter is newly determined is denoted by n (n: an integer satisfying $n \geq 1$), the value of the priority parameter obtained by the n-th update is denoted by an n-th priority parameter updated value, a new normal gait parameter to be newly determined is denoted by an n-th new normal gait parameter, and the base normal gait parameter is denoted by a 0-th new normal gait parameter, then the new normal gait parameter searching means is a means that sets the value of a non-priority parameter to the value of the non-priority parameter of an (n−1) th new normal gait parameter, and defines a gait parameter, in which the value of a priority parameter has been set to an n-th priority parameter updated value, as an initial search candidate gait parameter, and searches for the value of a search object parameter, which is a predetermined parameter among non-priority parameters of the initial search candidate gait parameter such that the value satisfies the predetermined boundary condition, thereby determining an n-th new normal gait parameter, and the new normal gait parameter determined at the last update of the value of a priority parameter by the priority parameter asymptotic means is defined as the normal gait parameter of a normal gait for the desired gait, and the desired gait is generated such that the desired gait approximates a normal gait to be generated by using the normal gait parameter and the dynamic model.

3. The gait generating system for a mobile robot according to claim 1, wherein the total number of updates of the value of a priority parameter by the priority parameter asymptotic means is set on the basis of the difference between the value of a priority parameter of the base gait parameter and the priority parameter required value.

4. The gait generating system for a mobile robot according to claim 2, wherein the total number of updates of the value of a priority parameter by the priority parameter asymptotic means is set on the basis of the difference between the value of a priority parameter of the base normal gait parameter and the priority parameter required value.

5. gait generating system for a mobile robot according to claim 1, wherein the gait parameter includes a parameter that defines a desired ZMP trajectory out of the desired gait as the search object parameter.

6. The gait generating system for a mobile robot according to claim 2, wherein the normal gait parameter includes, as the search object parameter, a parameter that defines a predetermined state amount of a motion of a mobile robot at one end of the period of one cycle of the normal gait.

7. The gait generating system for a mobile robot according to claim 1, wherein the predetermined boundary condition includes a condition in that a predetermined state amount of a motion of a mobile robot at a gait boundary in the predetermined period agrees with the predetermined state amount of the motion of the mobile robot in an adjoining gait at the boundary.

8. The gait generating system for a mobile robot according to claim 1, wherein the predetermined boundary condition includes a condition in that a predetermined state amount of a motion of a mobile robot at the boundary on the terminating end of a gait in the predetermined period agrees with the predetermined state amount of the motion of the mobile robot in the normal gait determined as a virtual cyclic gait that is to follow the gait.

9. The gait generating system for a mobile robot according to claim 2, wherein the predetermined boundary condition includes a condition in that a predetermined state amount of a motion of a mobile body at the starting end of one cycle of the normal gait and that at the terminating end thereof agree with each other.

10. The gait generating system for a mobile robot according to claim 6, wherein the mobile robot is a legged mobile robot equipped with a plurality of legs extended from its body, and the predetermined state amount includes at least one of the position of the body of the robot, the velocity of the body, the posture angle of the body, the angular velocity of the posture angle of the body, the weighted mean values of the position and the velocity of the body, the position of the total center-of-gravity of the robot, the velocity of the total center-of-gravity, the weighted mean values of the position and the velocity of the total center-of-gravity, and a divergence component.

11. The gait generating system for a mobile robot according to claim 7, wherein the mobile robot is a legged mobile robot equipped with a plurality of legs extended from its body, and the predetermined state amount includes at least one of the position of the body of the robot, the velocity of the body, the posture angle of the body, the angular velocity of the posture angle of the body, the weighted mean values of the position and the velocity of the body, the position of the total center-of-gravity of the robot, the velocity of the total center-of-gravity, the weighted mean values of the position and the velocity of the total center-of-gravity, and a divergence component.

12. The gait generating system for a mobile robot according to claim 8, wherein the mobile robot is a legged mobile robot equipped with a plurality of legs extended from its body, and the predetermined state amount includes at least one of the position of the body of the robot, the velocity of the body, the posture angle of the body, the angular velocity of the posture angle of the body, the weighted mean values of the position and the velocity of the body, the position of the total center-of-gravity of the robot, the velocity of the total center-of-gravity, the weighted mean values of the position and the velocity of the total center-of-gravity, and a divergence component.

13. The gait generating system for a mobile robot according to claim 9, wherein the mobile robot is a legged mobile robot equipped with a plurality of legs extended from its body, and the predetermined state amount includes at least one of the position of the body of the robot, the velocity of the body, the posture angle of the body, the angular velocity of the posture angle of the body, the weighted mean values of the position and the velocity of the body, the position of the total center-of-gravity of the robot, the velocity of the total center-of-gravity, the weighted mean values of the position and the velocity of the total center-of-gravity, and a divergence component.

* * * * *

UNITED STATES PATENT AND TRADEMARK OFFICE
CERTIFICATE OF CORRECTION

PATENT NO. : 7,765,030 B2 Page 1 of 1
APPLICATION NO. : 10/597653
DATED : July 27, 2010
INVENTOR(S) : Takenaka et al.

It is certified that error appears in the above-identified patent and that said Letters Patent is hereby corrected as shown below:

On the Title Page, in Item (54) in Title, in Line 1, and Col. 1, Line 1, delete "GAIT GENERATOR FOR MOBILE ROBOT" and insert -- GAIT GENERATING SYSTEM FOR MOBILE ROBOT --

Signed and Sealed this

Twenty-sixth Day of October, 2010

David J. Kappos
*Director of the United States Patent and Trademark Office*